United States Patent [19]
Kojima et al.

[11] Patent Number: 4,949,444
[45] Date of Patent: Aug. 21, 1990

[54] MACHINE TOOL MACHINING METHOD

[75] Inventors: Hiroshi Kojima; Keikichi Sakata, both of Aichi; Seigo Watanabe, Gifu; Yukio Mitsukuchi, Aichi; Shuichi Hashimoto, Gifu; Choji Kato, Aichi; Mikiro Teshigawara, Aichi; Ryoichi Furuhashi, Aichi; Shoji Momoi, Gifu; Toshihiko Inoue, Aichi; Kazuki Uemura, Aichi; Katsushi Oshima, Aichi, all of Japan

[73] Assignee: Yamazaki Mazak Corporation, Aichi, Japan

[21] Appl. No.: 182,452

[22] Filed: Apr. 18, 1988

[30] Foreign Application Priority Data

| Apr. 17, 1987 | [JP] | Japan | 62-58205[U] |
| Apr. 28, 1987 | [JP] | Japan | 62-105439 |
| Apr. 28, 1987 | [JP] | Japan | 62-105441 |
| Apr. 28, 1987 | [JP] | Japan | 62-105442 |
| Apr. 28, 1987 | [JP] | Japan | 62-105443 |
| Apr. 28, 1987 | [JP] | Japan | 62-105444 |
| May 29, 1987 | [JP] | Japan | 62-134150 |
| May 29, 1987 | [JP] | Japan | 62-134151 |
| Jun. 23, 1987 | [JP] | Japan | 62-156054 |
| Jun. 23, 1987 | [JP] | Japan | 62-156055 |
| Jul. 24, 1987 | [JP] | Japan | 62-185006 |
| Sep. 25, 1987 | [JP] | Japan | 62-241521 |
| Oct. 13, 1987 | [JP] | Japan | 62-258012 |
| Dec. 24, 1987 | [JP] | Japan | 62-327652 |
| Dec. 24, 1987 | [JP] | Japan | 62-327654 |

[51] Int. Cl.$^5$ .............................................. B23B 7/04
[52] U.S. Cl. ................................... 29/27 R; 82/120; 82/129
[58] Field of Search ................... 29/27 R, 27 C, 33 J, 29/33 T, 564; 82/1.11, 124, 118, 147, 129, 159, 120, 121

[56] References Cited

U.S. PATENT DOCUMENTS

| 2,473,306 | 6/1949 | Schreiber | 82/124 |
| 2,611,290 | 9/1952 | Bullard, III | 82/129 |
| 3,990,133 | 11/1976 | Schalles et al. | 82/124 |
| 4,008,634 | 2/1977 | Flisch | 82/124 X |
| 4,151,765 | 5/1979 | Sevastakis | 82/1.11 |
| 4,404,727 | 9/1983 | Zankl | 82/124 X |
| 4,443,937 | 4/1984 | Dominici et al. | 29/564 |
| 4,457,193 | 7/1984 | Matthey | 29/564 X |
| 4,589,311 | 5/1986 | Link et al. | 82/124 |
| 4,612,832 | 9/1986 | Ushigoe et al. | 82/129 |
| 4,674,163 | 6/1987 | Nugier | 29/33 T |
| 4,719,676 | 1/1988 | Sansone | 82/124 X |
| 4,763,549 | 8/1988 | Hata et al. | 82/147 X |

FOREIGN PATENT DOCUMENTS

| 258955 | 8/1988 | Fed. Rep. of Germany | 82/129 |
| 51-14186 | 5/1976 | Japan . |
| 52-24393 | 2/1977 | Japan . |
| 56-139802 | 10/1981 | Japan . |
| 57-48402 | 3/1982 | Japan . |
| 58-28402 | 2/1983 | Japan . |
| 58-56701 | 4/1983 | Japan . |
| 58-186501 | 10/1983 | Japan . |
| 59-129601 | 7/1984 | Japan . |
| 59-176701 | 10/1984 | Japan . |
| 60-177801 | 9/1985 | Japan . |
| 60-232802 | 11/1985 | Japan . |
| 61-152301 | 7/1986 | Japan . |
| 62-102933 | 5/1987 | Japan . |
| 62-130101 | 6/1987 | Japan . |
| 62-152603 | 7/1987 | Japan . |
| 62-297001 | 12/1987 | Japan . |
| 2103529 | 2/1983 | United Kingdom | 82/124 |
| 2159450 | 12/1985 | United Kingdom | 82/124 |
| 2198677 | 6/1988 | United Kingdom | 82/129 |

*Primary Examiner*—William Briggs
*Attorney, Agent, or Firm*—Wenderoth, Lind & Ponack

[57] ABSTRACT

A complex machine tool has a single frame having a chip collecting space at a center portion thereof, first and second spindle stocks on the frame, relatively free to move and drive in a Z axis direction and holding the chip collecting space therebetween, workpiece spindles on the spindle stocks free to rotate and drive and facing each other, and tool rests. The tool rests have turrets and can assume various kinds of movement. Complicated and varied types of machining can be performed combining the rotation control of the workpiece spindles and the spindle stocks.

2 Claims, 67 Drawing Sheets

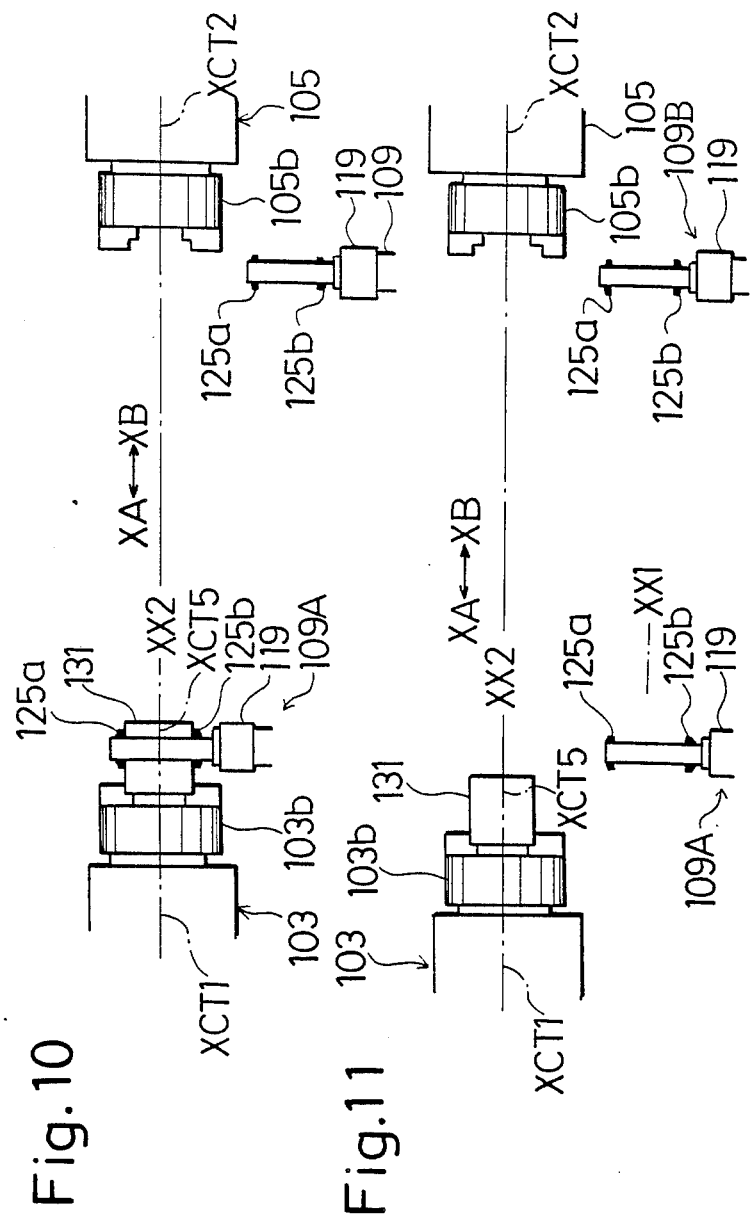

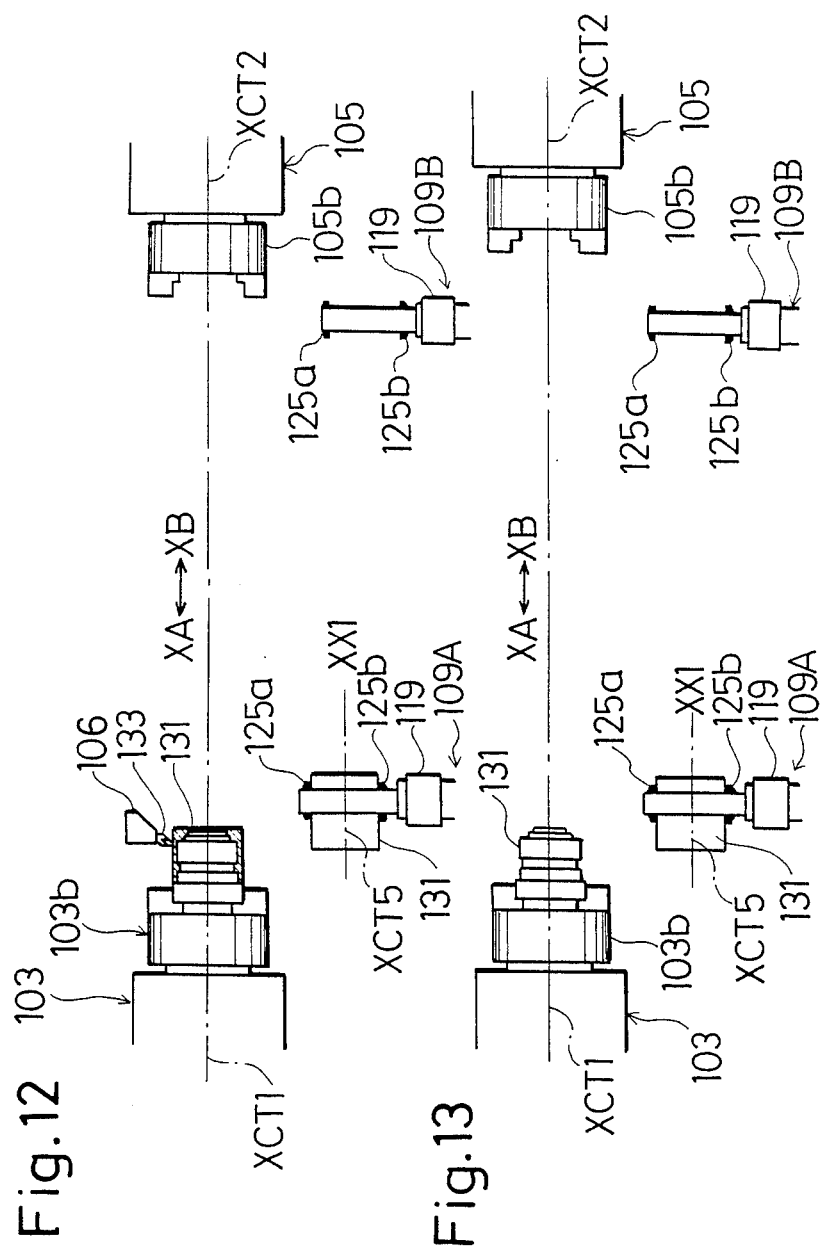

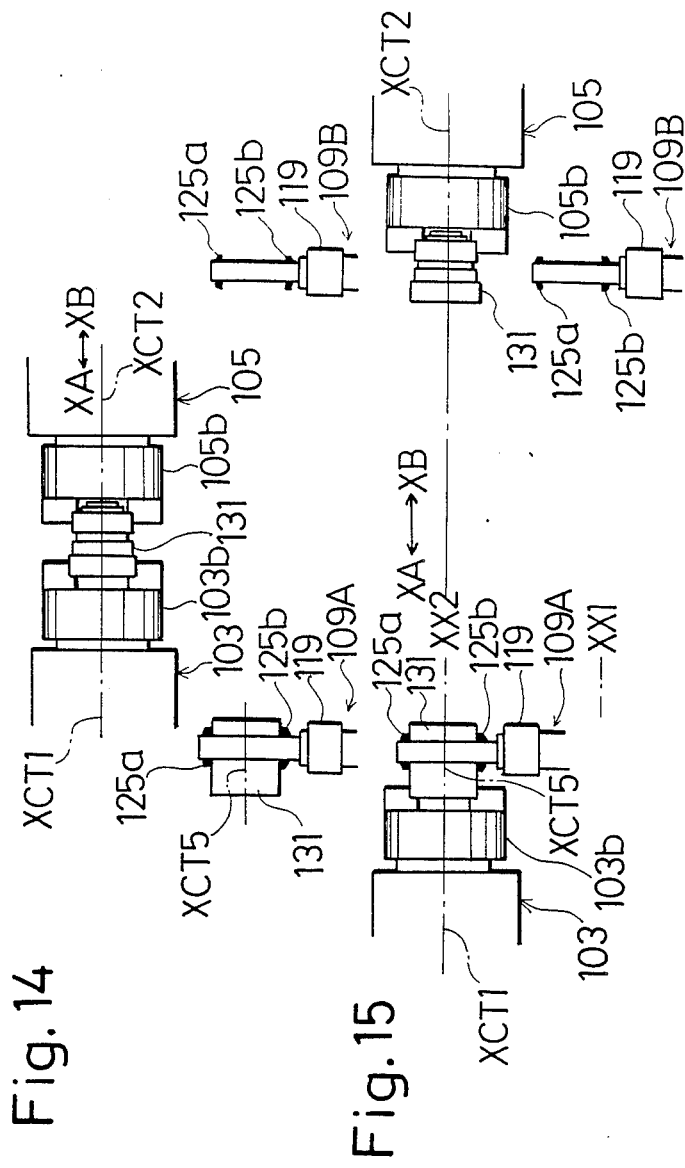

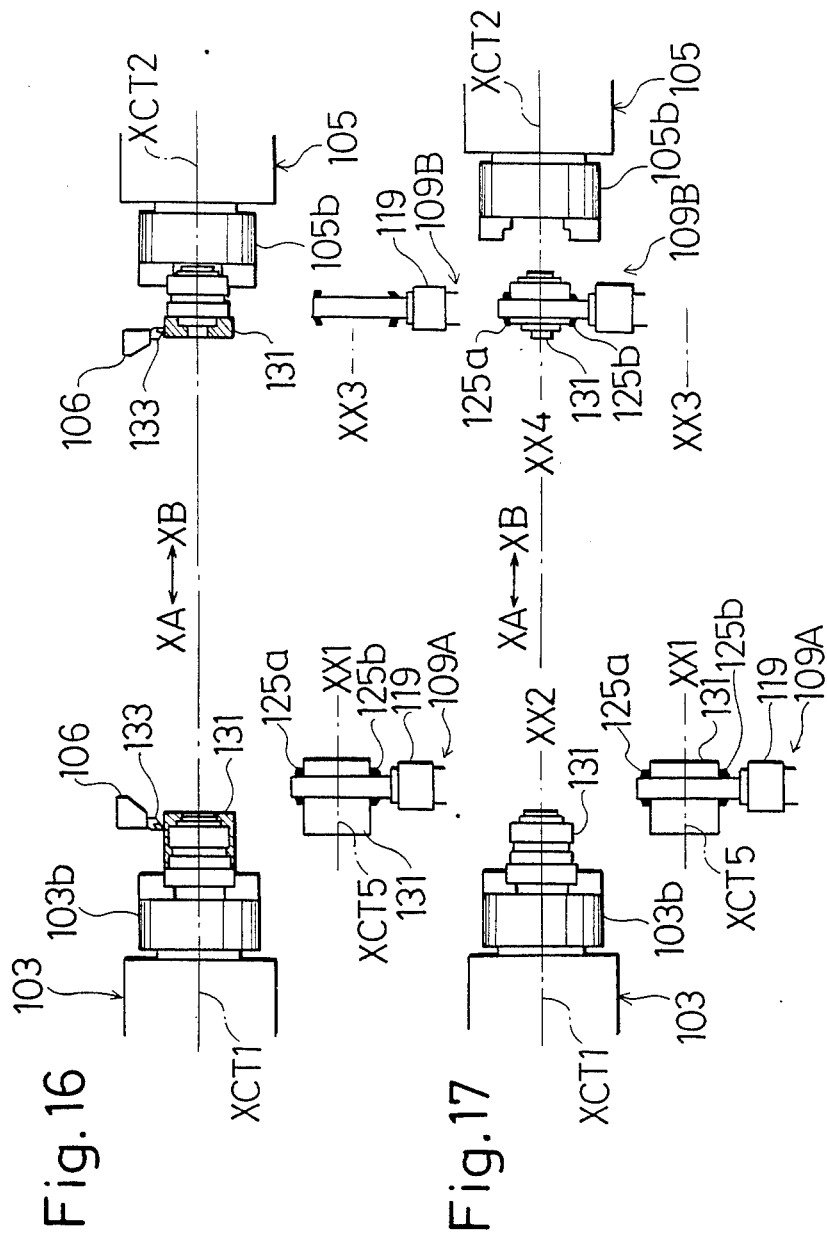

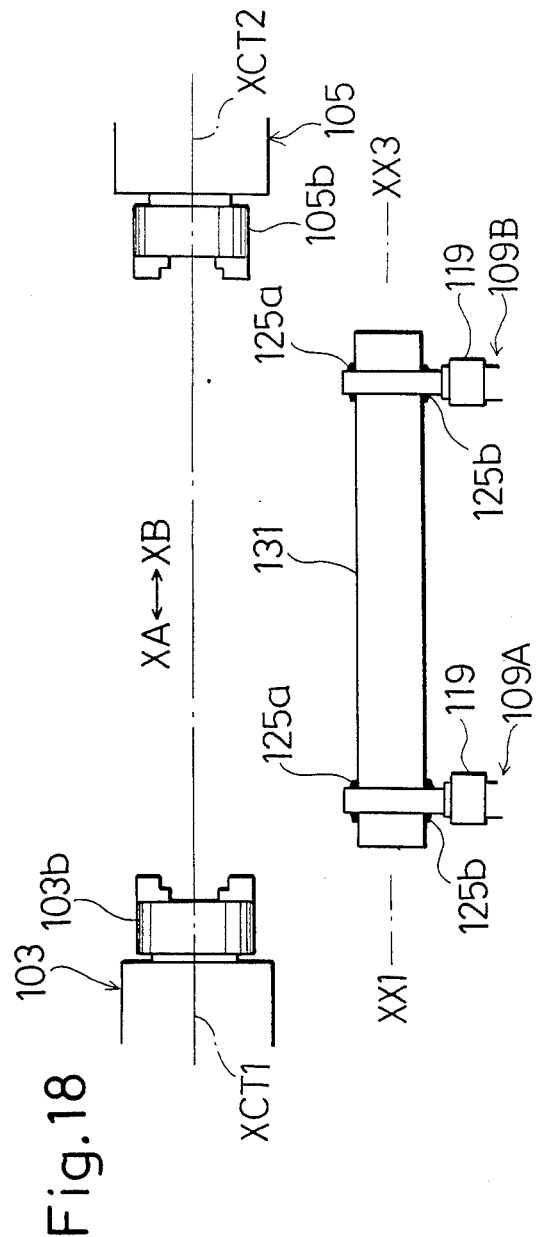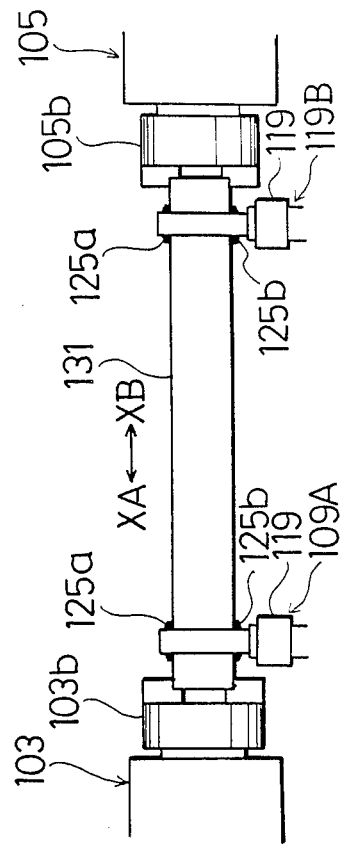
Fig.18
Fig.19

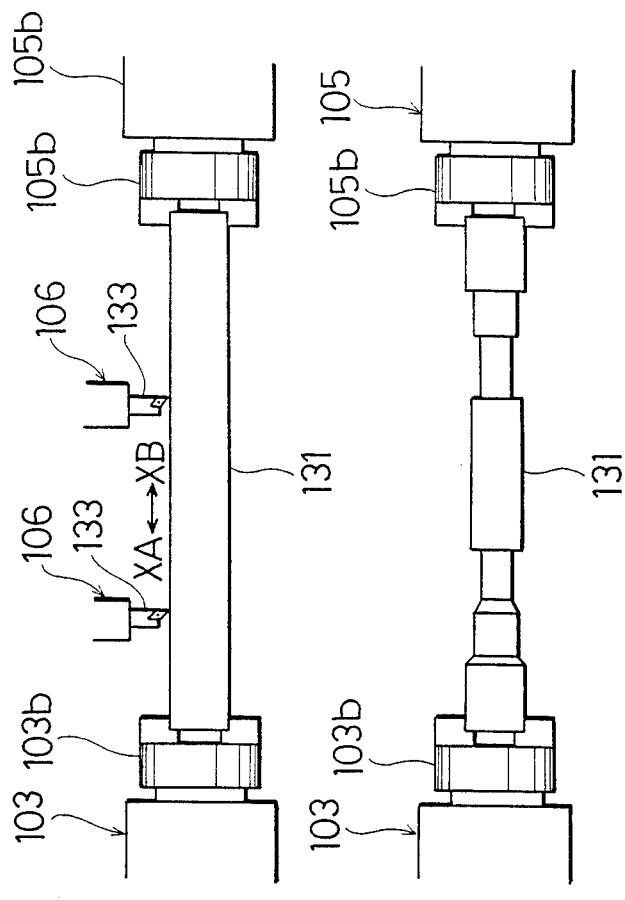

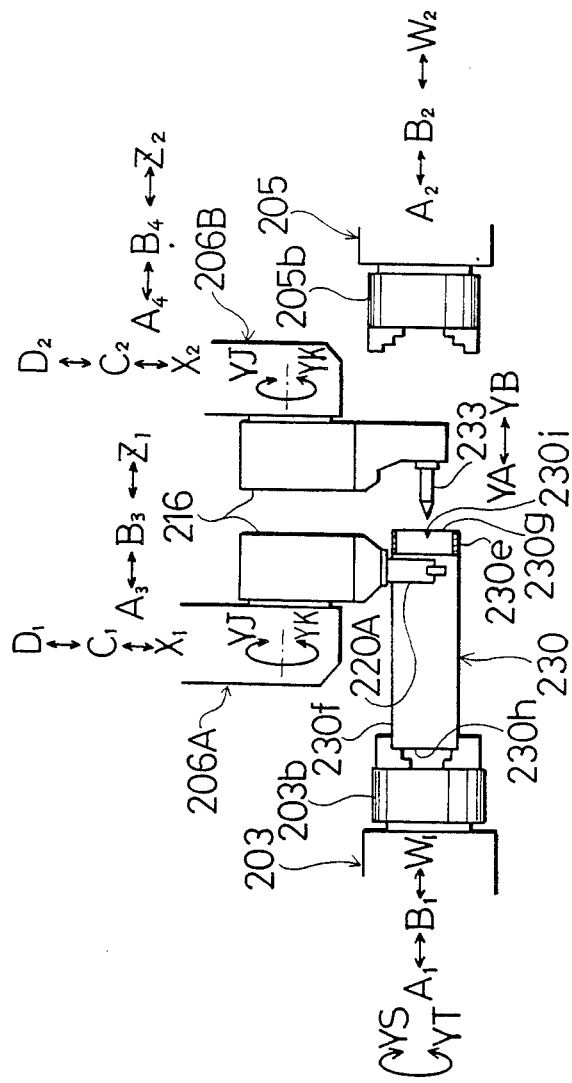

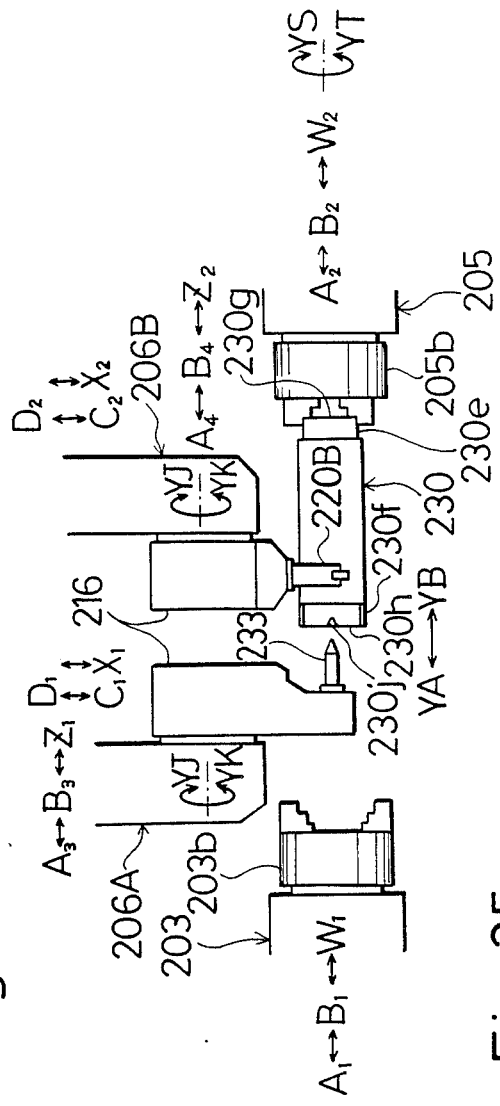
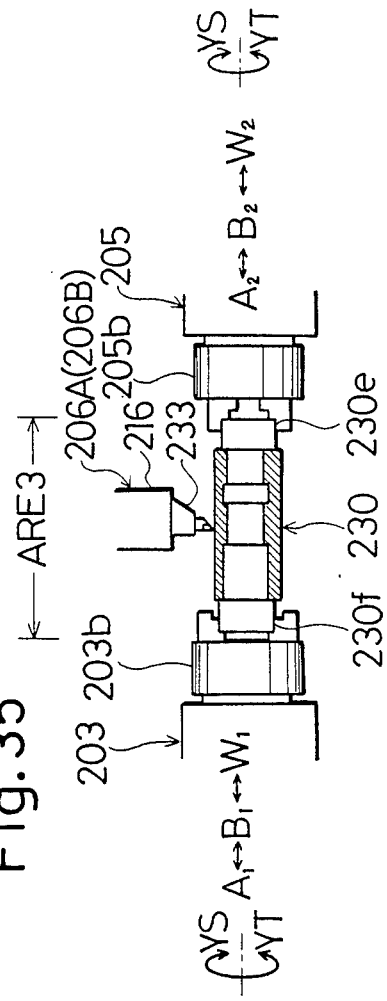
Fig. 34
Fig. 35

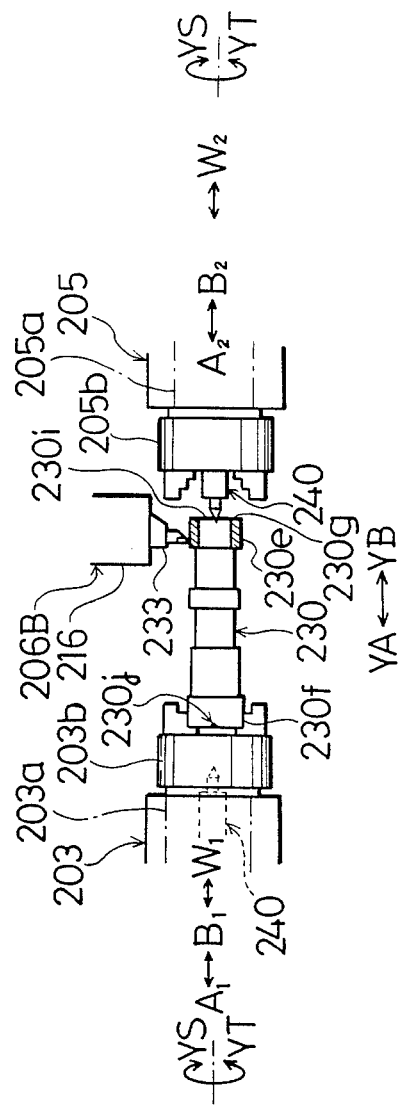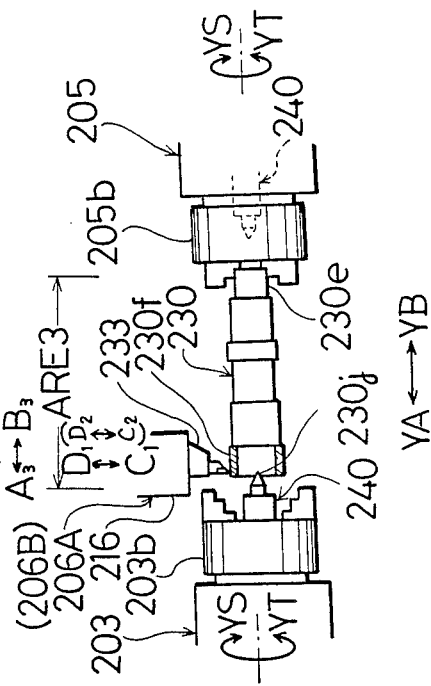
Fig.36
Fig.37

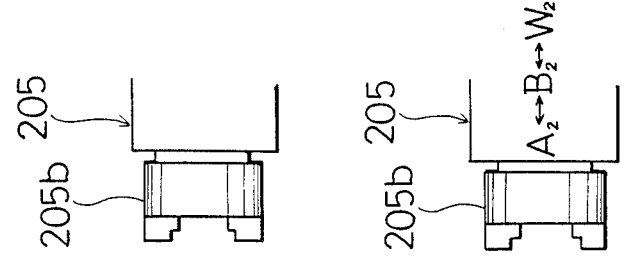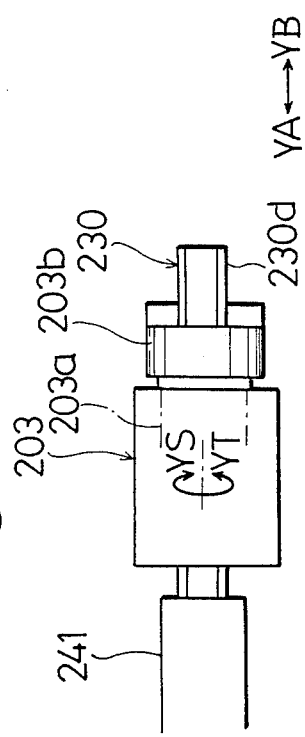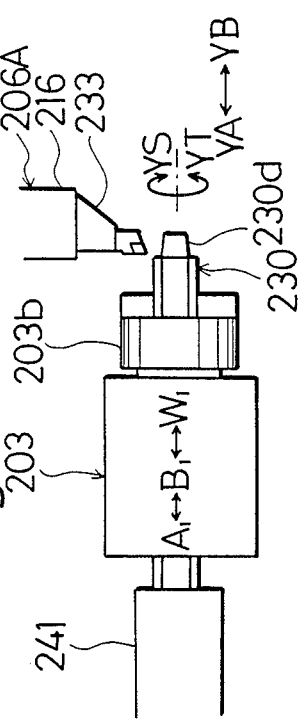

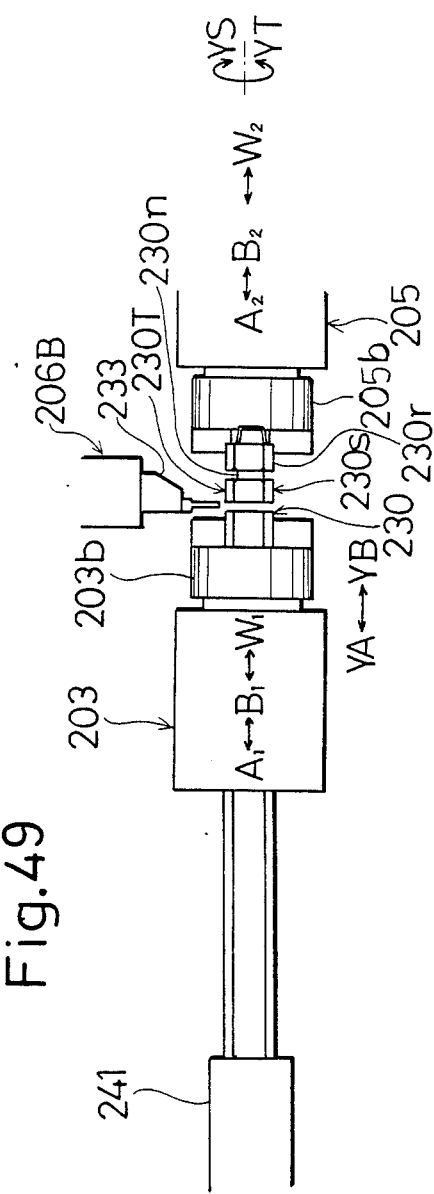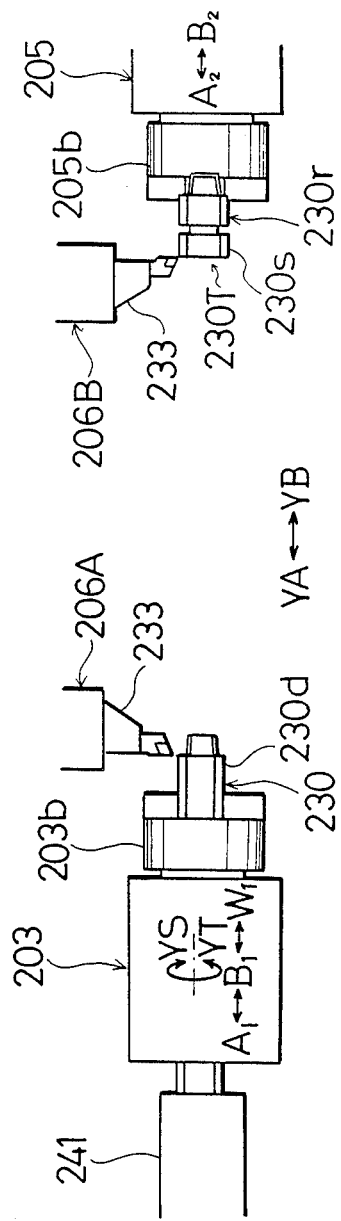

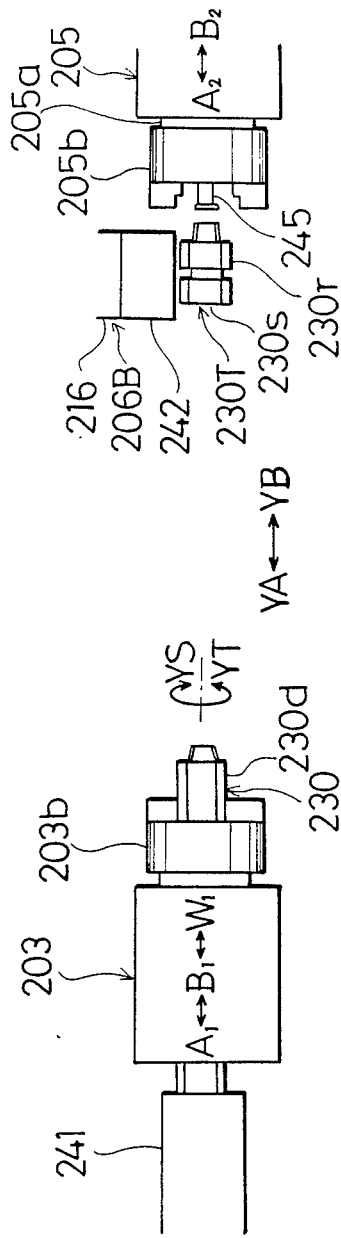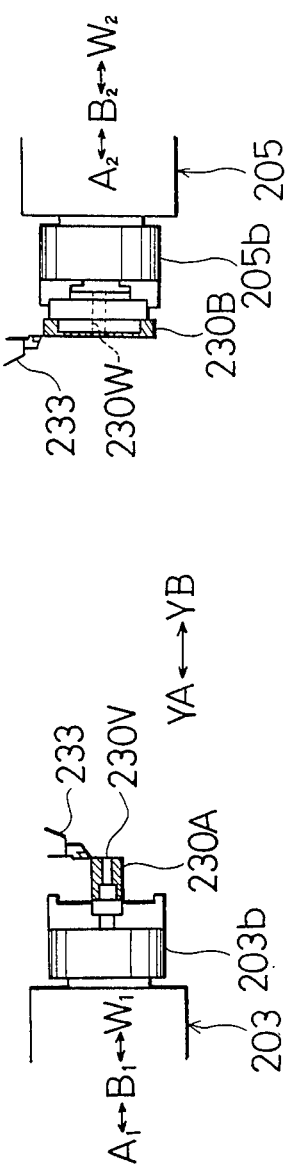

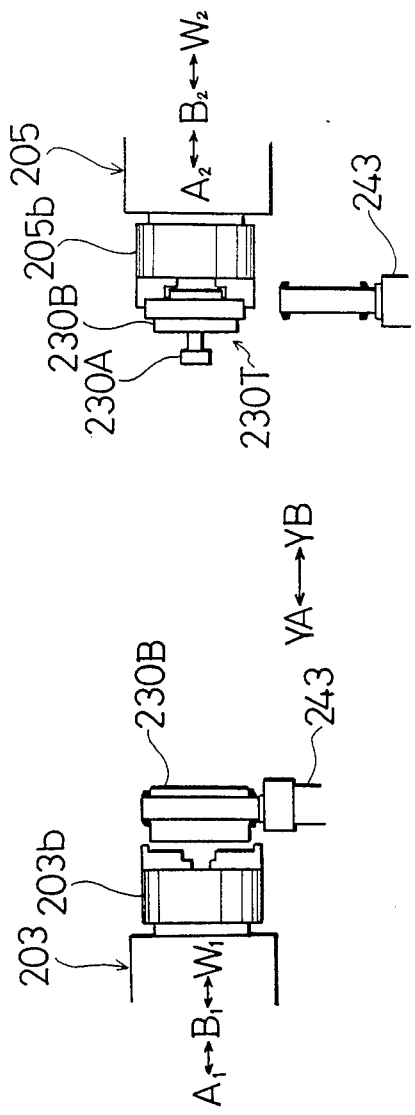

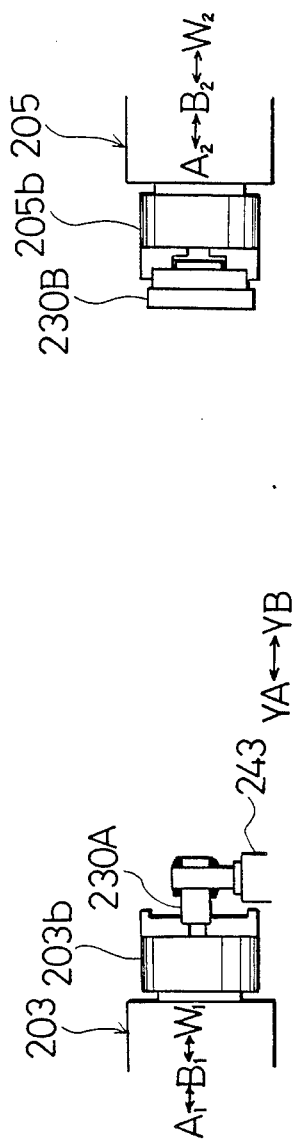
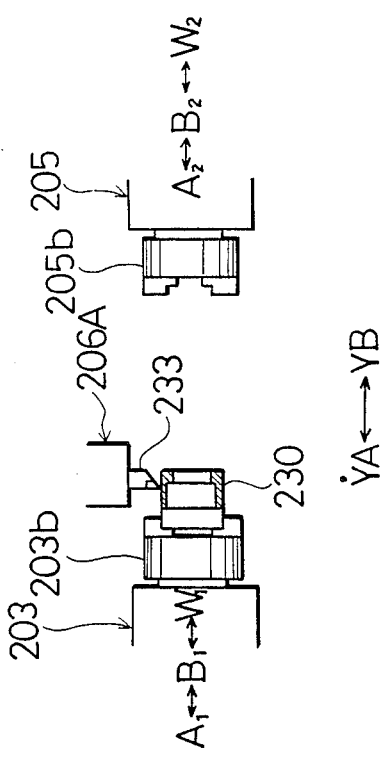
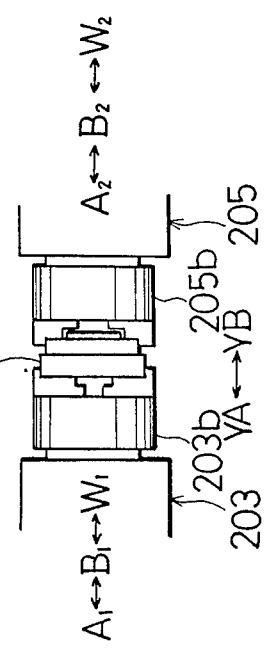
Fig. 58
Fig. 59
Fig. 57

YA ←→ YB

YA ←→ YB

YA ←→ YB

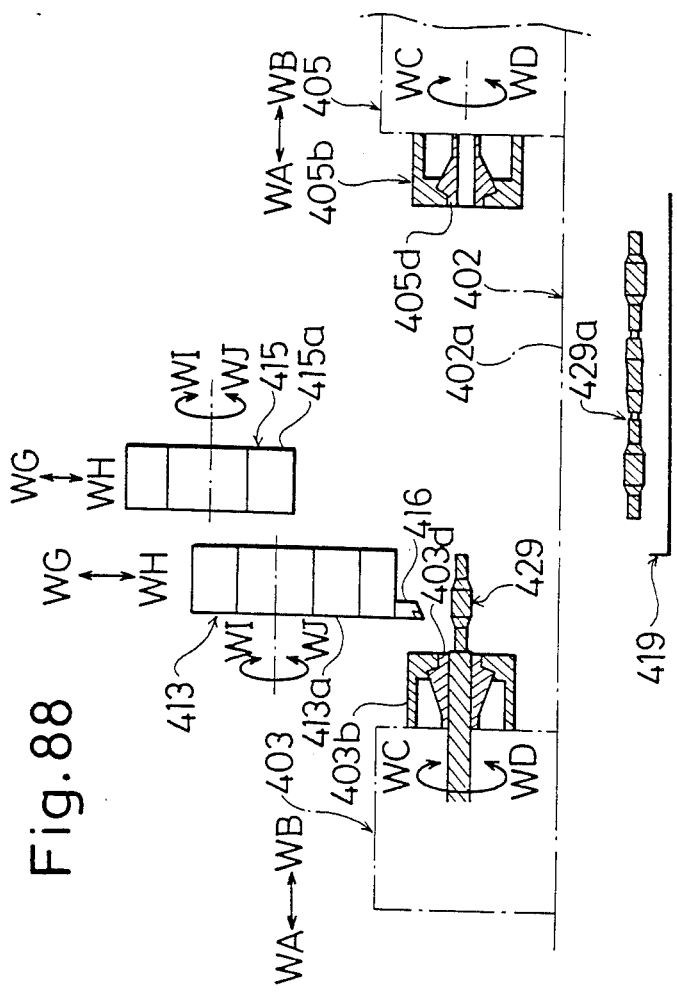
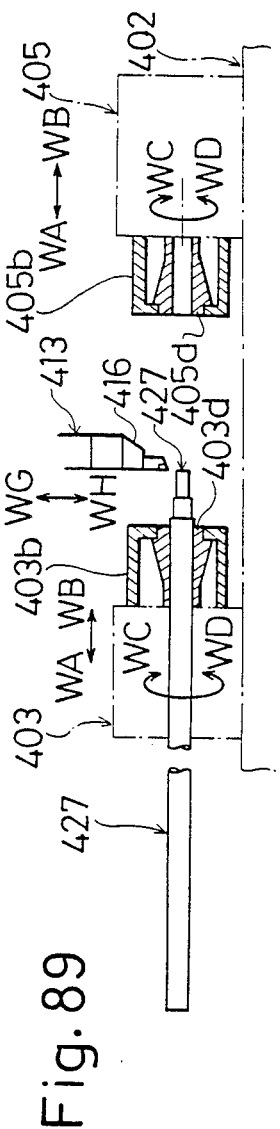
Fig. 88
Fig. 89

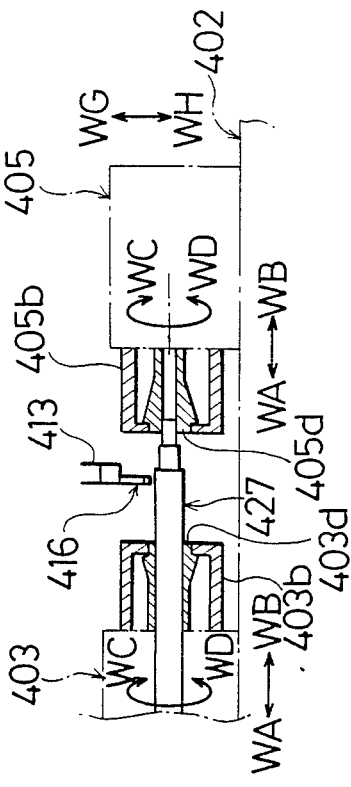
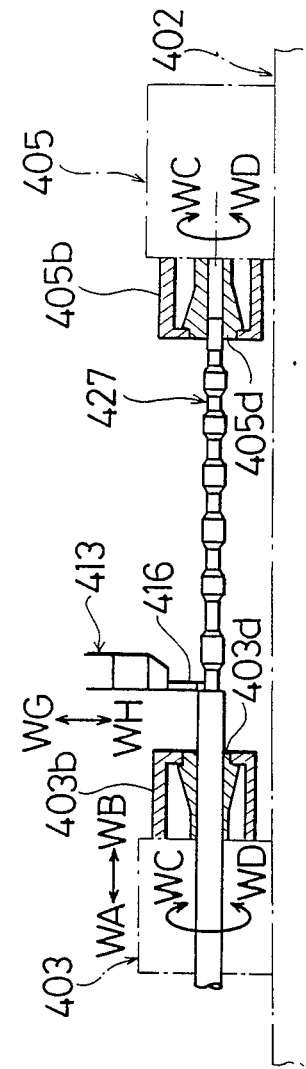
Fig. 90 (a)
Fig. 90 (b)

MACHINE TOOL MACHINING METHOD

BACKGROUND OF THE INVENTION

This invention relates to a complex machine tool having mutually facing workpiece spindles, provided with respective tool rests corresponding to the workpiece spindles.

In recent years, the machining operations of machine tools have been complicated and varied, and the efficiency demanded for machine tools in the future is going to be high.

In consideration of the above-described circumstances, the object of the present invention is to provide a complex machine tool which can execute complicated machining operations and machining methods using the machine tool.

SUMMARY OF THE INVENTION

The present invention provides tool rests independently disposed to be free to move and drive and corresponding to respective spindle stocks. Turrets on which one or more tools can be installed are provided on the inside of each tool rest, being free to index, rotate and drive at predetermined machining positions. The tool installation portion of each turret is provided to project in the further negative direction on an X axis in comparison with a portion of the tool rest positioned in the most negative direction of the X axis when the tool installation portion is indexed to a machining position.

According to the above-described arrangement of the machine tool a distance L between a tool installed in the turret and the workpiece spindle, as for example seen in FIG. 3, can be longer in comparison with when the turrets are installed to the outside of the tool rests and the tools are disposed at the outside of the tool rests, since the turrets are positioned to the inside of the tool rests. Furthermore, the minimum length of a workpiece able to be machined can be longer with the same machine dimension in the Z axis direction. Therefore, the machine dimension can be smaller if the maximum length of the workpiece is the same, and the machine can be made more compact.

Since a tool installation surface of the turret is positioned to project in the further negative direction of the X axis in comparison with the tool rest, the machining is performed on a workpiece by means of the tool by having the tool rotated on the turret and indexed at a machining position X1. Thereafter the tool rest is moved in the negative direction of the X axis. The tool to be used for machining always projects from the tool rest toward the workpiece side of the tool rest. Therefore, the machining can be sufficiently performed on the workpiece by the provision of a guide means of a short length, such as sliding surface. The guide means of the tool rest is disposed at a position which does not intercept the Z axis, in comparison with the tool rest, in which the tools are installed like the teeth of a comb. Accordingly, the problem of chips interfering with the guide means can be eliminated. Also, the chip collecting function can be smoothly performed, since a chip collecting spaced is not interrupted by the guide means.

The spindle stocks can also be provided to be free to move and drive in the Z axis direction, enabling the spindle stocks to be synchronously and asynchronously moved with respect to each other. Therefore varied machining operations can be performed, such as machining a long sized workpiece held between both of the spindle stocks.

A first workpiece handling means may be provided corresponding to the first spindle stock, and a second workpiece handling means may be provided corresponding to the second spindle stock. A first workpiece holding portion of the first workpiece handling means is movable only between a first waiting position and a first workpiece delivery position facing the first workpiece spindle. A second workpiece holding portion of the second workpiece handling means is moveable only between a second waiting position and a second workpiece delivery position facing the second workpiece spindle. A workpiece can be attached to the first spindle stock by having the workpiece held by the first workpiece holding portion of the first workpiece handling means. The first workpiece holding portion is then moved from the first waiting position to position the workpiece at a first workpiece delivery position X2. The first spindle stock is then moved to the workpiece in the Z axis direction to complete delivery of the workpiece to the first spindle stock. The workpiece can be detached from the second spindle stock by having the second workpiece holding portion of the second workpiece handling means positioned at the second workpiece delivery position. Thereafter the second spindle stock is moved together with the workpiece to the second workpiece holding portion positioned at the second workpiece delivery position in the Z axis direction to complete delivery of the workpiece to the second workpiece holding portion.

The workpiece can be fed from one spindle stock to the other spindle stock without the use of a handling robot or the like by having both spindle stocks approach each other by relative movement in the Z axis direction, and the workpiece held by one workpiece spindle is then delivered to the other workpiece spindle.

When machining a long sized workpiece the workpiece is held by each workpiece holding portion of both the first and the second workpiece handling means. The workpiece holding portions are then synchronously moved to position the workpiece between the spindle stocks. Furthermore, both spindle stocks are moved in the Z axis direction to approach the workpiece. In this way the workpiece can be held by both workpiece spindles.

When cutting-off machining of the workpieces being held by both the workpiece spindles is to be performed, the workpiece holding portions of the first and the second workpiece handling means are positioned at a first workpiece delivery position X2 and a second workpiece delivery position X4, respectively. The workpieces are rotatably held by the respective workpiece holding portions, and the workpieces can be cut off.

As a result, various movements, such as the attachment and detachment of various workpieces of the two spindle stocks, the holding of workpieces during cutting-off machining, and the like, can be performed by the first and/or the second workpiece handling means, which have no function of moving in the Z axis direction. Furthermore, since the workpiece can be directly delivered between the spindle stocks, it is not necessary for the workpiece handling means to have the function of moving in the Z axis direction. Therefore the control procedures and the arrangements of the handling means can be simplified.

Machining can be continued by having the workpiece delivered between the spindle stocks by means of a barfeeder, the machined workpiece being taken out only by the second handling means. As a result, a complex machine tool by which various workpiece machining operations can be performed can be provided. Furthermore, the handling means can easily hold the workpiece. The movement quantity of the spindle stocks in the Z axis direction is controlled by means of a machining program if the length of the workpiece to be machined varies. As a result, the movement of the workpiece handling means can be kept to a minimum, and the control of the workpiece handling means can be simplified in comparison with the earlier discussed workpiece handling means. Moreover, since the handling means do not move in the Z axis direction, an operator will not collide the handling means with other components and can machine the workpiece safely.

A workpiece supporting means, by which a workpiece may be rotatably supported, can be disposed on the tool rest. The workpiece can then be supported by the workpiece supporting means when the tool rest is moved and driven. Accordingly, it is not necessary to provide a separate center rest apparatus, or a sliding surface and a driving source for moving the center rest apparatus. When the workpiece supporting means is driven by means of a tool rotating drive mechanism of the tool rest, it is not necessary to provide independent drive sources for the workpiece supporting means. Therefore the center rest can be smaller and its structure can be simplified.

Furthermore, if the workpiece spindles are synchronously rotated, a workpiece can be delivered between the workpiece spindles without stopping the workpiece spindles, and the machining of along sized workpiece can be performed while supporting the workpiece between the workpiece spindles.

That is, a first routine of machining is performed with the workpiece held by the first workpiece spindle, and a second routine of machining is performed by having the machined workpiece, after the first routine, delivered to the second workpiece spindle, a synchronous rotating control means for the workpiece spindles being provided. When the machined workpiece, after the first routine, is delivered to the second workpiece spindle from the first workpiece spindle, the first workpiece spindle and the second workpiece spindle are rotated at the same rotation number by means of the synchronous rotating control means. Then the first and second workpiece spindles approach each other. The workpiece is then held by the second workpiece spindle. The holding relation between the workpiece and the first workpiece spindle is then released. With the above-described method, the second routine of machining can be immediately performed, the first and the second workpiece spindles being synchronously rotated without stopping their rotation, and the machined workpiece, after the first routine, being delivered to the second workpiece spindle from the first workpiece spindle in a rotating state. The machining time of the workpiece can thus be shortened.

Moreover, a spindle driving motor control means, by which the rotation of the spindle driving motors are controlled, is connected with the spindle driving motor of the first and the second workpiece spindles. When machining a long sized workpiece supported between the first and the second workpiece spindles, the spindle driving motor control means is driven, and one spindle driving motor of the spindle driving motors is rotated at a predetermined torque. At the same time, the other spindle driving motor is rotated and driven at a smaller torque than the predetermined torque. In this state a predetermined machining is performed on the workpiece. With the above-described arrangement, the rotation angular velocity quantity of the workpiece spindles is controlled by the spindle driving motor rotating and driving at the predetermined torque. The workpiece spindles are synchronously rotated at the rotation angular velocity quantity of the one spindle connected with the driving motor if the characteristics of the workpiece spindles (inertia, the characteristics of adjustable speed and the like) do not correspond with each other. As a result, harmful torsional torque is effectively prevented from acting on the workpiece being held between workpiece spindles, and the workpiece can be machined in this state.

The spindle driving motor control means, by which the rotation of the spindle driving motors is controlled, is connected with the spindle driving motors of the first and the second workpiece spindles. When machining, a workpiece is held between the workpiece spindles. Thereafter, when the spindle driving motors are energized in this state, the spindle driving motor control means is driven. One spindle driving motor holds itself and the other spindle driving motor is rotated at the predetermined torque. The self-holding of the one spindle driving motor is released, and the spindle driving motor is rotated at the predetermined torque. With the above-described method, since the workpiece spindles are driven by their respective spindle driving motors, the inertia of the spindle connected with the other spindle driving motor does not act on the workpiece. Therefore, excessive torsional torque can be effectively prevented from acting on the workpiece at the time of energizing.

Moreover, the first tool rest may be provided in a first movement area movable in the Z axis direction, and the second tool rest may be drivably provided in a second movement area, having a common movement area overlapping with the first movement area. With the above-described arrangement, the portion to be machined of a long sized workpiece is positioned at a position corresponding to the common movement area. The workpiece can then be machined by only the tool installed in the first or the second tool rest. At the same time, the machining of the long sized workpiece can be easily performed by having the portion to be machined moved in the common movement area. The portion of the workpiece positioned in the common movement area can be machined by means of the first or the second tool rest. Accordingly, it is not necessary to install the same tool in both the first and the second tool rests, and the tools can be more effectively installed in the tool rests. Since the control of machining is then also performed for only one tool rest, the machining program is more easily planned and executed.

A workpiece may be held by the first workpiece spindle. In this state, machining is performed on the workpiece. After the machining, the first and the second workpiece spindles are moved in a rotation angular control direction, such as a C-axis direction, and are positioned at predetermined delivery positions. At the same time, the first and the second workpiece spindles approach each other to hold the workpiece. Thereafter, the holding relation between the workpiece and the first workpiece spindle is released. The first and the second workpiece spindles are then separated from each other whereby the workpiece is held by the second workpiece spindle side of the machine. A predetermined machining is then performed on the workpiece. With the above-described method, the first and the second workpiece spindles are positioned at the delivery positions. In this state, the workpiece, being held at the first workpiece spindle side, can be directly delivered to the second workpiece spindle side with movement on the rotation angular control axis being restricted. As a result, the workpiece can be delivered to the second workpiece side from the first workpiece spindle side without generating a phase shift from a rotation angular control origin, such as a C-axis origin, and a milling machining operation and the like, accompanied by the rotation angular control, such as the C-axis control, can be accurately performed on the delivered workpiece.

Furthermore, a workpiece center rest means is installed on at least one of the first and the second tool rests. When machining a long sized workpiece, one end portion of the workpiece is held by the first or the second spindle stock with the workpiece spindle. At the same time, the workpiece is supported by the workpiece center rest means installed on the first or the second tool rest. If the other end portion of the workpiece is to be machined by means of a tool installed on the other tool rest, different from the tool rest supporting the above-described workpiece, the end portion of the workpiece is machined with the end portion of the long sized workpiece supported by the workpiece center rest means installed on the first or the second tool rest. As a result, it is not necessary to provide a workpiece center rest apparatus on the complex machine tool which would extend through the sliding surface or the like, and the machine tool does not become overly large and complicated. After one end portion of the long sized workpiece held by the first spindle stock is machined, the end portion of the workpiece is pulled out of the workpiece spindle, and can be machined by having the first and the second spindle stocks approach each other and the workpiece delivered to the second spindle stock side. As a result, both end portions of the long sized workpiece can be machined without inverting the workpiece, the efficiency of the operation can be improved and the amount of labor required reduced.

In addition, a workpiece can be held by the first spindle stock, and a first routine of machining performed thereon.

After the first routine, a first step is executed. That is, the second spindle stock is moved a predetermined distance toward the first spindle stock, and the workpiece is held by the first and the second spindle stocks.

In this state, a second step is then executed. That is, the workpiece is cut off while synchronously rotating the first and the second spindle stocks. The part cut off from the workpiece is held by the second spindle stock.

Furthermore, a third step is executed. That is, the second spindle stock is moved together with the part the predetermined distance to the original position separated from the first spindle stock.

In this state, a fourth step is executed. That is, the first routine of machining is performed on the workpiece being held by the first spindle stock. At the same time a fifth step is executed. That is, a second routine of machining is performed on the part being held by the second spindle stock.

Furthermore, the workpiece is fed a predetermined length from the first spindle stock during the first step through the fourth step. In the case of the above-described method, after the first routine, the part including the portion to which the first routine is finished is cut off from the other raw portion of the workpiece while being held by the second spindle stock. As a result, the first and the second routines of machining can be performed and parts of a predetermined shape can be successively made without requiring the intervention of an operator.

Moreover, a workpiece can be held by the first spindle stock, and a first routine of machining can be performed thereon. After the first routine, the second spindle stock is moved a predetermined distance toward the first spindle stock to hold the workpiece by the first and the second spindle stocks. In this state the holding relation between the first spindle stock and the workpiece is released. The second spindle stock is then moved a position distant the predetermined distance from the first spindle stock. The workpiece is then pulled out a length equal to the predetermined distance from the first spindle stock, and the workpiece is held by both the first and the second spindle stocks. Thereafter, the workpiece is cut off while the first and the second spindle stocks are synchronously rotated. The part cut off from the workpiece is held by the second stock. Furthermore, the second spindle stock is moved together with the part to a position separated the predetermined distance from the first spindle stock. The first routine of machining is then performed on the workpiece being held by the first spindle stock. At the same time, a second routine of machining is performed on the part being held by the second spindle stock. In the above-described method, in addition to the above-described effects, the workpiece can be cut off by having the predetermined length of the workpiece pulled out from the first spindle stock by the second spindle stock without using the barfeeder apparatus.

In the method comprising a first, a second, and a third step as described below, the first through the third steps are executed one time or more than one time. That is, the first step is as follows: after a predetermined machining is performed with a workpiece held by the first and the second spindle stocks, the holding relation between the second spindle stock and the workpiece is released. In this state the second spindle stock is moved toward the first spindle stock and the workpiece is again held by the first and the second spindle stocks. The second stop is as follows: when the workpiece is held by the first and the second spindle stocks, the holding relation between the first spindle stock and the workpiece is released. The second spindle stock is then moved together with the workpiece to a position distant a predetermined distance from the first spindle stock. The raw portion of the workpiece is thus pulled out a length equal to the predetermined distance from the first spindle stock. The third step is as follows: when the raw portion of the workpiece is pulled out the predetermined length from the first spindle stock, the pulled out raw portion of the workpiece is held between the first and the second spindle stocks. Then the machining is performed toward the raw portion. With the above-described method, the workpiece can be intermittently pulled out the predetermined length from the first spindle stock by means of the second spindle stock. As a result, the workpiece can be intermittently pulled out the predetermined length from the first spindle stock without using a specific apparatus, such as a barfeeder apparatus, and the raw portion of the workpiece which is pulled out can be machined by holding it between the first and the second spindle stocks.

In the machining of the third step, the portion to be machined is positioned near the first or the second workpiece spindle and in this state the machining is performed. With the above-described method, since the workpiece is always machined at a position adjacent to a workpiece spindle, the workpiece spindle holding the workpiece fills the role of a center rest. Therefore chattering or the like can be effectively prevented from being generated on the workpiece during the machining, and the machining accuracy can be improved.

A workpiece is held by a chuck installed on the first spindle stock so as not to rotate on the chuck and so as to be moveable in the Z axis direction. Furthermore, the second spindle stock is moved a predetermined distance toward the first spindle stock to hold the end portion of the workpiece. In this state the raw portion of the workpiece is pulled out from the first spindle stock with the second spindle stock, the second spindle stock moving together with the workpiece in the direction going away from the first spindle stock. The pulled out raw portion is then machined by means of the tool rest positioned at a position adjacent to the first spindle stock. With the above-described method, the raw portion can be machined at a position adjacent the first spindle stock by means of the tool rest, the raw portion of the workpiece being pulled out from the first spindle stock by means of the second spindle stock. Therefore the workpiece can be machined without using the barfeeder apparatus. Since the machining is performed at a position adjacent to the spindle stock, the chuck installed on the first spindle stock can fill the role of the center rest during the machining of the workpiece, and the machining can be performed with high accuracy without the center rest.

Different kinds of workpieces can be held by the workpiece spindles using the workpiece holding means. Predetermined machinings are performed on the workpieces to form connecting portions on the respective workpieces. After the machining, the first and the second spindle stocks are relatively moved together with the workpieces to approach each other. The workpieces are then assembled through the connecting portions. With the above-described method, connecting parts can be made such that workpieces are connected through connecting portions. As a result, the machining and assembly of certain kinds of workpieces can be automatically performed by one complex machine tool without requiring the assistance of an operator and without providing an assembly line for assembling the workpieces.

BRIEF DESCRIPTION OF THE DRAWINGS

FIGS. 9 through 17 are flow charts illustrating the machining of a workpiece by means of the complex machine tool as shown in FIG. 5;

FIGS. 18 through 23 are flow charts illustrating the machining of a long sized workpiece by means of the complex machine tool as shown in FIG. 5;

FIGS. 32 through 39 illustrate a process by which a machining is performed on a shaft shaped workpiece by means of the complex machine tool as shown in FIG. 25;

FIGS. 45 through 51 illustrate an example of a process by which connecting parts are successively made the complex machine tool as shown in FIG. 25;

FIGS. 52 through 58 illustrate another example of a process by which connecting parts are successively made by the complex machine tool as shown in FIG. 25;

FIGS. 59 through 63 illustrate an example of a process by which chucked workpiece machining is successively performed on one type of a workpiece by the complex machine tool as shown in FIG. 25;

FIGS. 82 through 88 illustrate a method which a long and slender sized shaft workpiece is machined by the complex machine tool as shown in FIG. 71;

FIGS. 89, 90A and 90B illustrate a method of barfeeder machining by the complex machine tool as shown in FIG. 71;

DESCRIPTION OF THE PREFERRED EMBODIMENT

The preferred embodiment of the present invention will now be described hereinafter with reference to the accompanying drawings.

FIG. 1 through FIG. 4 indicate a first embodiment of a complex machining machine tool.

Figure 1:
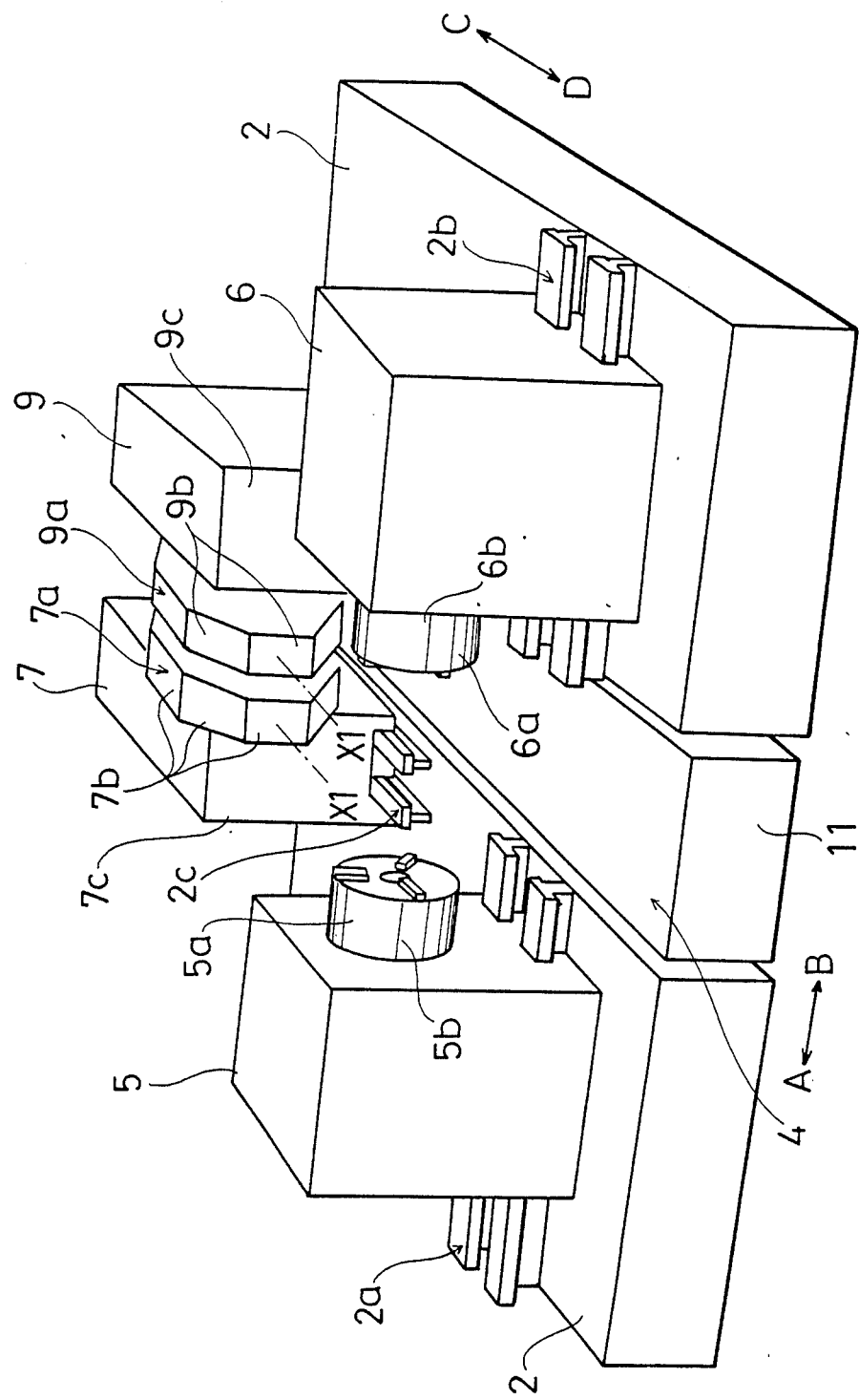
FIG. 1 is a perspective view showing a first embodiment of a complex machine tool according to the present invention.
Figure 2:
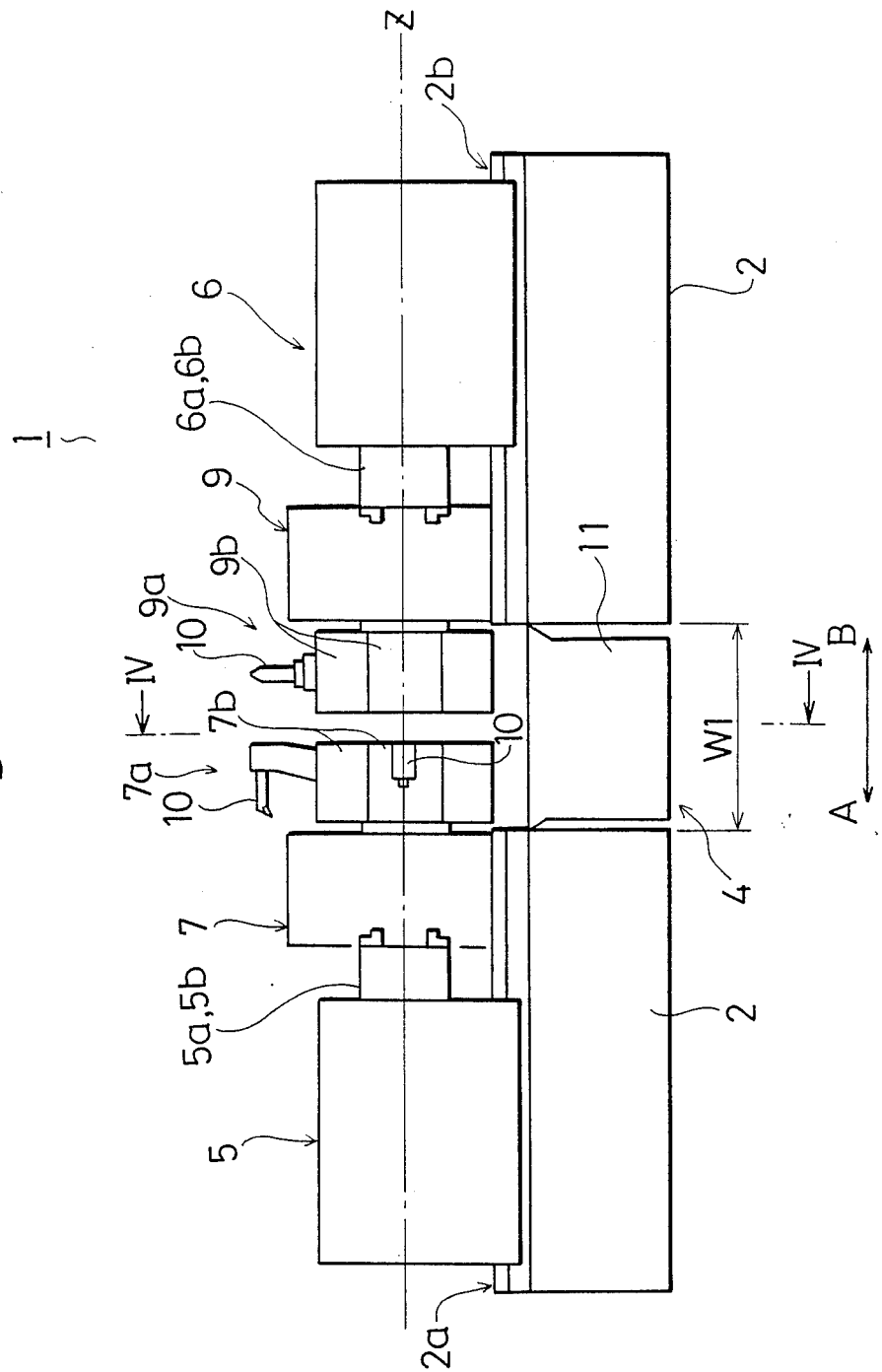
FIG. 2 is a front elevation of the complex machining machine tool of FIG. 1.
Figure 3:
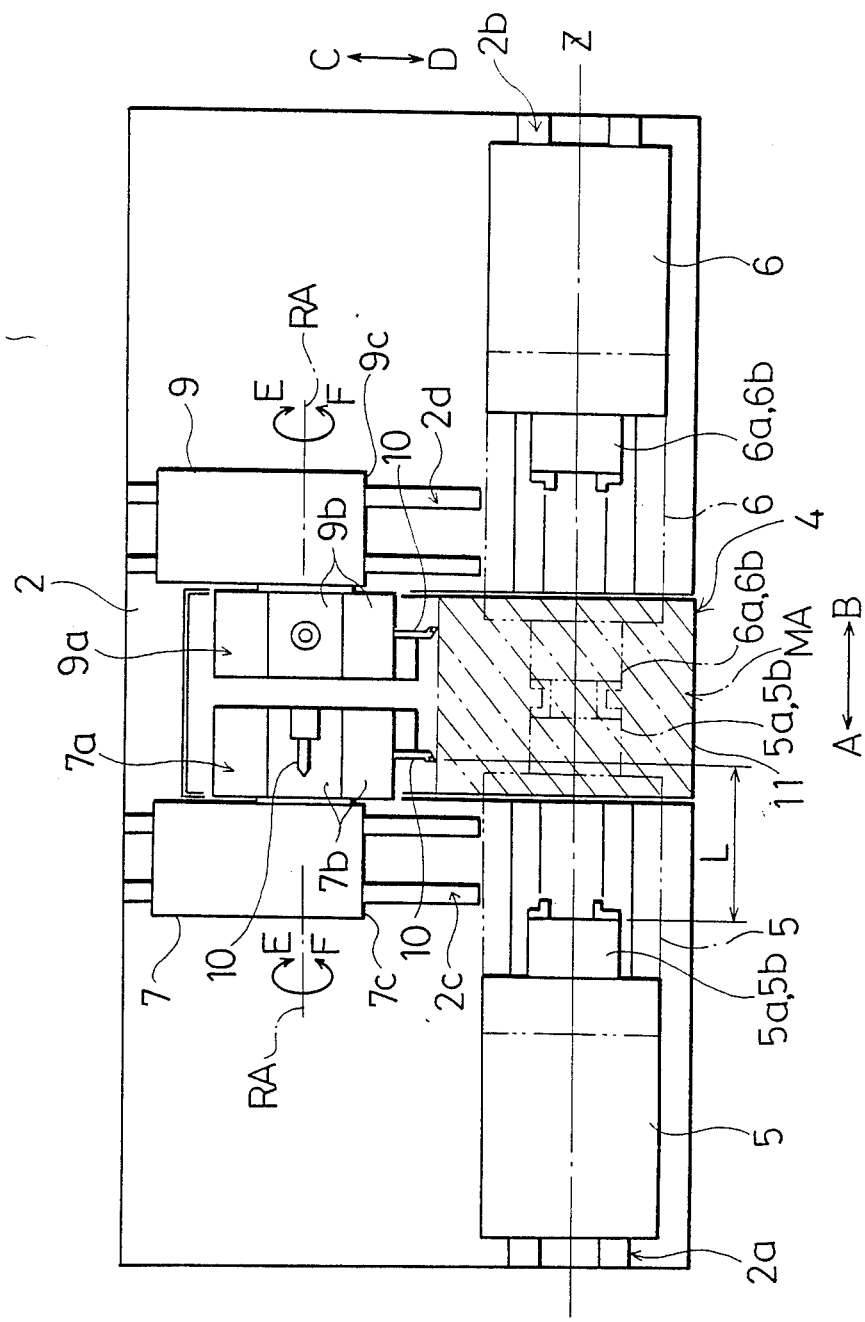
FIG. 3 is a top view of FIG. 2.

A complex machining machine tool 1 has a single frame 2 as shown in FIG. 1 through FIG. 3. At the center portion of a frame 2, a chip collecting space 4, having a width of W1, is formed in the direction of arrows C and D, shaped so as to nearly part the frame 2 in the right and left directions of FIG. 1. On both sides holding the chip collecting space 4 of the frame 2, guide rails 2a and 2b are separately formed in the direction of arrows A and B, that is, in a Z axis direction, respectively. On each of guide rails 2a and 2b is movably provided a respective spindle stock 5 or 6, movable in the direction of the arrows A and B along the guide rails 2a and 2b. At each of the spindle stocks 5 and 6, a workpiece spindle 5b or 6b, comprising a workpiece holding means, such as a chuck 5a, 6a or the like, is rotatably supported by a respective drive motor mounted in each of the spindle stocks 5 and 6. The workpiece spindles 5b and 6b are provided so as to face each other on the Z axis, and in such a manner that the centers of rotation correspond to each other, as shown in FIG. 3. More specifically, on the frame 2, guide rails 2c and 2d are formed so as to frame the chip collecting space 4 and face together in the X axis direction, perpendicular to the Z axis direction, that is, in the direction of the arrows C and D.

Figure 4:
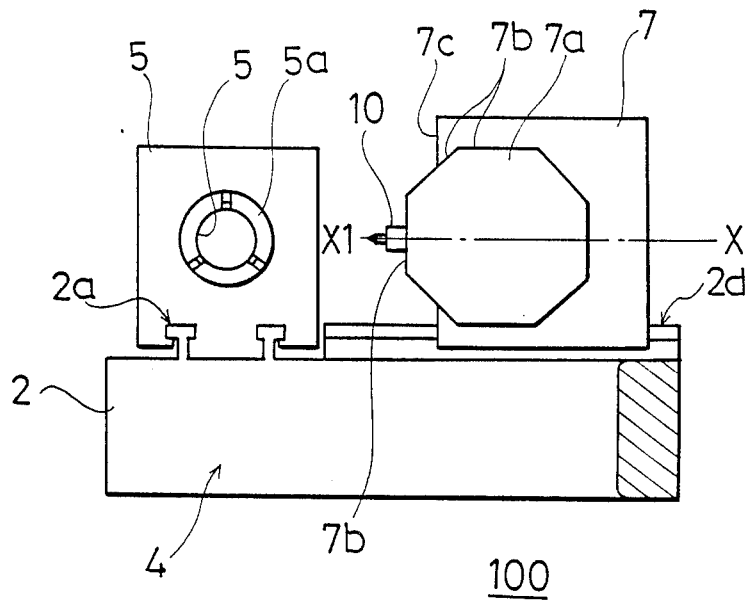
FIG. 4 is a sectional view along the line IV—IV of FIG. 2.

On each of the guide rails 2c and 2d is a respective tool rest 7 or 9, movably and drivably provided along the guide rails 2c and 2d only in the directions of arrows C and D. At each of tool rest 7 and 9 is provided a respective turret 7a or 9a, each turret being free to index and rotate on a rotation axis RA, so as to face in the same direction parallel with the Z axis as its center, in the directions of arrows E and F, as shown in FIG. 3. Each of turrets 7a and 9a is provided so as to project inside of the tool rests 7 and 9 in FIG. 3, that is, above the chip collecting space 4. More specifically, a tool installation surface 7b or 9b of the turrets 7a and 9a is provided so as to project in the negative direction on the X axis, that is, in the D direction, toward the front face of the tool rest 7c and 9c. The tool installation surfaces project in the negative direction on the X axis of the tool rests 7 and 9 the most when each tool installation surface 7b and 9b is positioned at a machining position X1, as shown in FIG. 1 and FIG. 4. With each tool installation surface 7b and 9b, a plurality of tools 10, such as a rotation tool and a turning tool and the like, are attached.

In the chip collecting space 4, a chip collecting bucket 11, as shown in FIG. 1, is provided so as to be capable of being inserted and pulled out in the direction of the arrows C and D of FIG. 3.

With the above-described constitution of the complex machining machine tool 1, when workpiece is machined using the complex machining machine tool 1, the workpiece to be machined is held by one of chucks 5a and 6a of the respective spindle stocks 5 and 6 or is held between the chucks 5a and 6a of the spindle stocks 5 and 6, as shown in FIG. 1 through FIG. 4. Thereafter, the workpiece spindle 5b or 6b is rotated with the X axis as its center. In the foregoing state, the spindle stock 5 or 6 is moved in the directions of arrows A and B along the guide rail 2a or 2b. The respective turret 7a or 9a of the tool rest 7 or 9 is rotated. Next, the tool installation surface 7b or 9b, on which is installed the tool 10 used for machining, is indexed and positioned at the predetermined machining position X1. At the time the tool 10 is indexed, the tool rest 7 or 9 is moved along the guide rail 2c or 2d in the direction of the arrows C and D, that is, in the X axis direction, to perform the predetermined machining on the workpiece which is installed on the workpiece spindle 5b or 6b.

When a workpiece is installed on each of the workpiece spindles 5b and 6b, each of the workpiece spindles 5b and 6b is driven and controlled independently. The rotating speed, feed rate and feed direction in the Z axis direction and the like are also driven and controlled such that each spindle stock 5 and 6 is independent. It is natural that the tool rest 7 or 9 on which is installed the tool 10 for machining of the workpiece is driven and controlled so as to be independent in the X axis direction. But it is obvious that the turret 7a or 9a projects its tool installation surface 7b or 9b above the chip collecting space 4 and that the turret 7a or 9a moves together with the tool rest 7 or 9 only in the X axis direction, as shown in FIG. 3. Therefore, the area that the tip of the tool 10, which is installed on the turret 7a or 9a, moves together with the movement of the upper space of the chip collecting space 4. Thus, the tool 10 naturally contacts a workpiece at a position projecting over the chip collecting space 4 to perform the machining. The chips produced immediately fall and are collected in the chip collecting space 4. The machining area MA in which the tool 10 contacts a workpiece to perform the machining is almost located on the chip collecting space 4 with respect to grade level, as shown in the hatched part of FIG. 3. Since the tool installation surface 7b or 9b projects from the front face 7c or 9c of the tool rest 7 or 9 in the negative direction on the X axis, that is, the arrow D direction, the machining movements are performed smoothly without interference of the workpiece by the tool rest 7 or 9 at the time of machining.

On the other hand, when the machining is performed such that a workpiece is held between both workpiece spindles 5b and 6b, the workpiece spindles 5b and 6b are synchronously rotated and driven. At the same time, the work piece spindles 5b and 6b are also synchronously moved in the direction of arrows A and B. In the foregoing state, the tool rests 7 and 9 are moved and controlled so as to be independent of each other in the directions of the arrows C and D to perform the machining to the workpiece by means of the turrets 7a and 9a.

Another embodiment of a complex machining machine tool will be described in FIG. 5 through FIG. 24.

Figure 5:
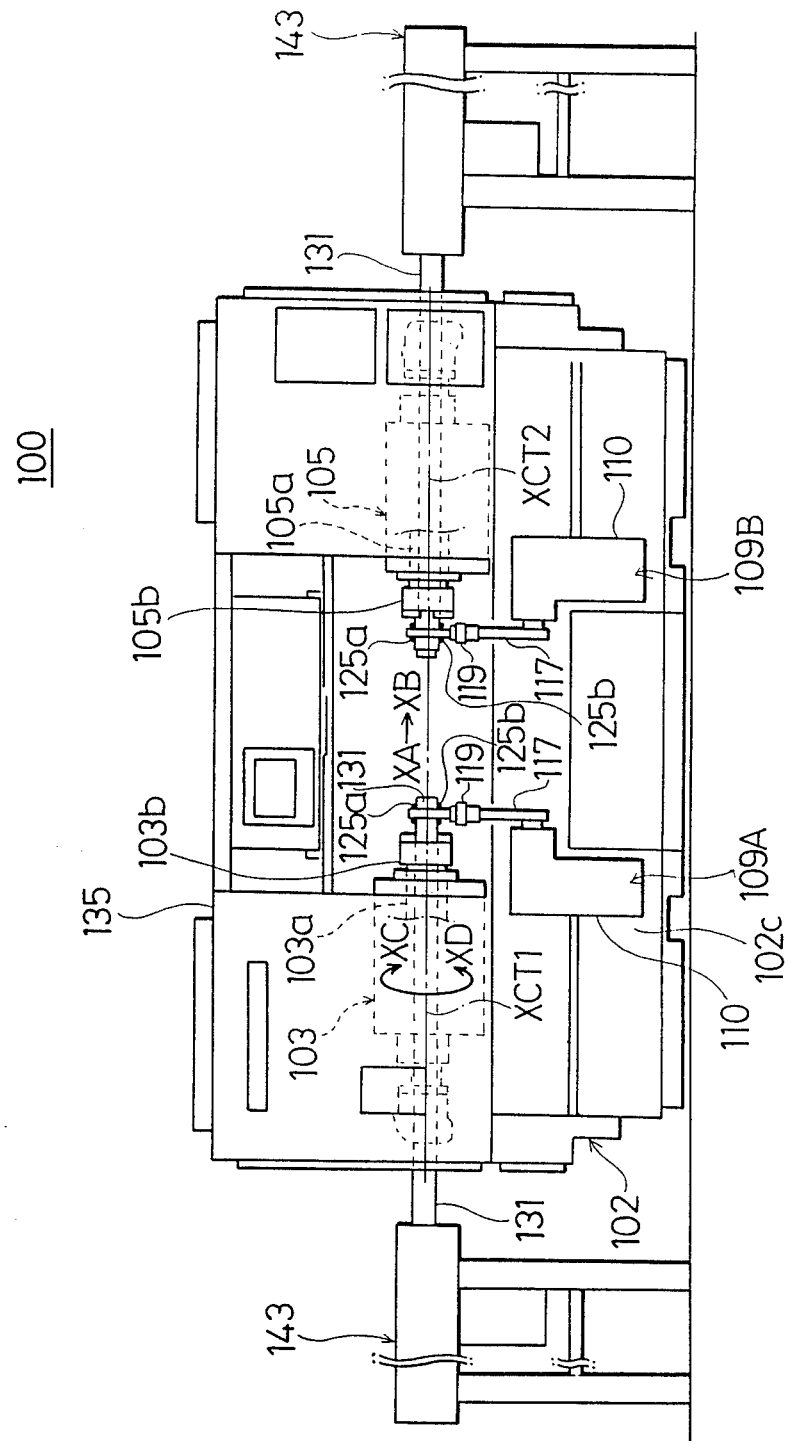
FIG. 5 is a front elevational view showing a second embodiment of a complex machine tool according to the present invention.

A complex machining machine tool 100 has a machine body 102, as shown in FIG. 5. On the machine body 102, spindle stocks 103 and 105 face each other so that shaft centers XCT1 and XCT2 of the spindles 103a and 105a correspond, as will be described later, and are movably and drivably disposed in the direction of arrows XA and XB (that is, in the Z axis direction). In the spindle stocks 103 and 105, each spindle 103a and 105 is rotatably and drivably mounted, with shaft centers XCT1 and XCT2 as their center, in the directions of arrows XC and XD, respectively. In the spindles 103a and 105a are installed chucks 103b and 105b, respectively.

Figure 6:
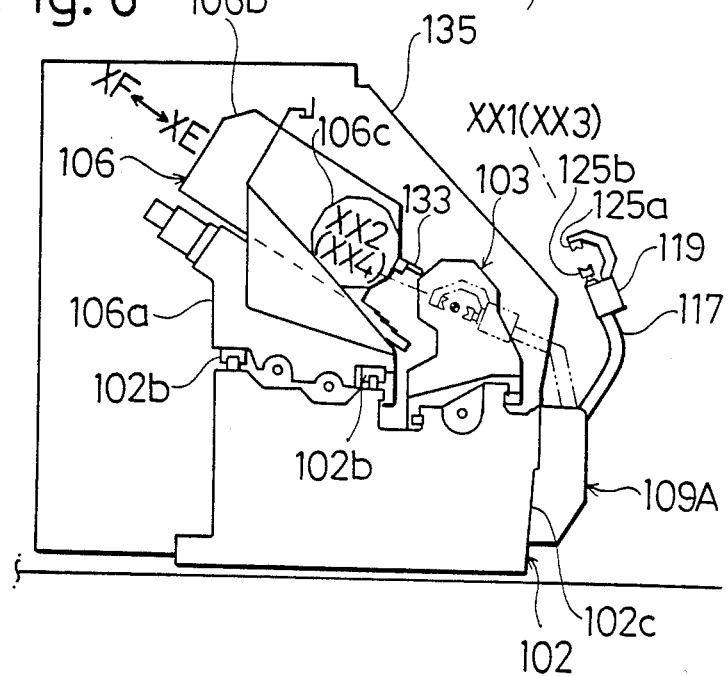
FIG. 6 is a left side elevation of FIG. 1.

On the machine body 102, two carriages (only one carriage is shown in FIG. 6), which constitute the tool rests 106, are provided so as to correspond with the spindles 103a and 105a and are movable and drivable through respective guide members 102b in the horizontal direction toward the sheet of the figure (that is, in the direction of arrows XA and XB of FIG. 5), as shown in FIG. 6, respectively. A carriage 106a, as shown in FIG. 6, has a main body of a tool rest 106b provided movably and drivably thereon in the direction of XE and XF, respectively. This direction is the vertical direction of arrows XA and XB, that is, the Z axis direction. With the body of the tool rest 106b is rotatably and drivably provided a tool installation portion 106c, a type of turret, enabling the installation of a plurality of tools.

Figure 7:
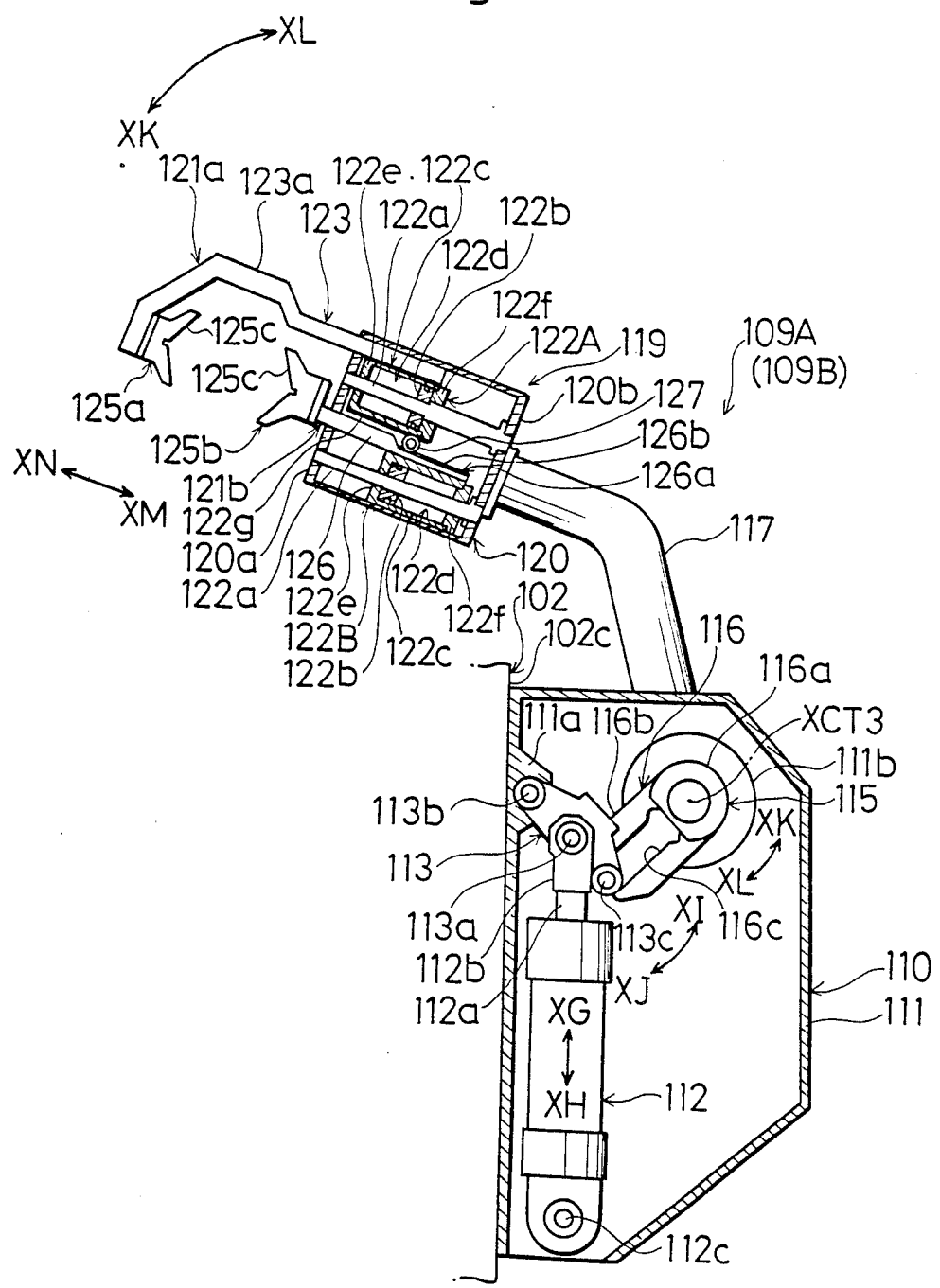
FIG. 7 is a front elevation showing a loading apparatus installed in the complex machine tool as shown in FIG. 5.

By the way, at the front surface 102c of the machine body 102 in FIG. 5 are installed two loading apparatus 109A and 109B adjacent the spindle stocks 103 and 105, respectively. The loading apparatus 109A and 109B have a body 110, an arm 117 and a hand 109. That is, on the front surface 102c of the machine body 102 as shown in FIG. 7, the body 110 is installed. The body 110 has a box-like casing 111. In the casing 111, an arm turning cylinder 112 is installed through a pin 112c. With the arm turning cylinder 112 is supported a rod 112a, which is free to project and to recede in the directions of arrows XG and XH. At the edge portion of the rod 112a in the figure, a connecting member 112b is installed. At the upper left hand portion of the arm turning cylinder in FIG. 7, a lever support portion 111a of the casing 111 is provided. With the lever support portion of 111a, a lever 113 is supported so as to be free to turn, through a pin 113b, in the directions of arrows XI and XJ. In the center portion of the lever 113 in FIG. 7, the connecting member 112b, which is installed in the rod 112a of the arm turning cylinder 112, is installed through the pin 113a. Furthermore, at the right edge portion of the lever 113 in the figure, a roller 113c is rotatably provided.

Figure 8:
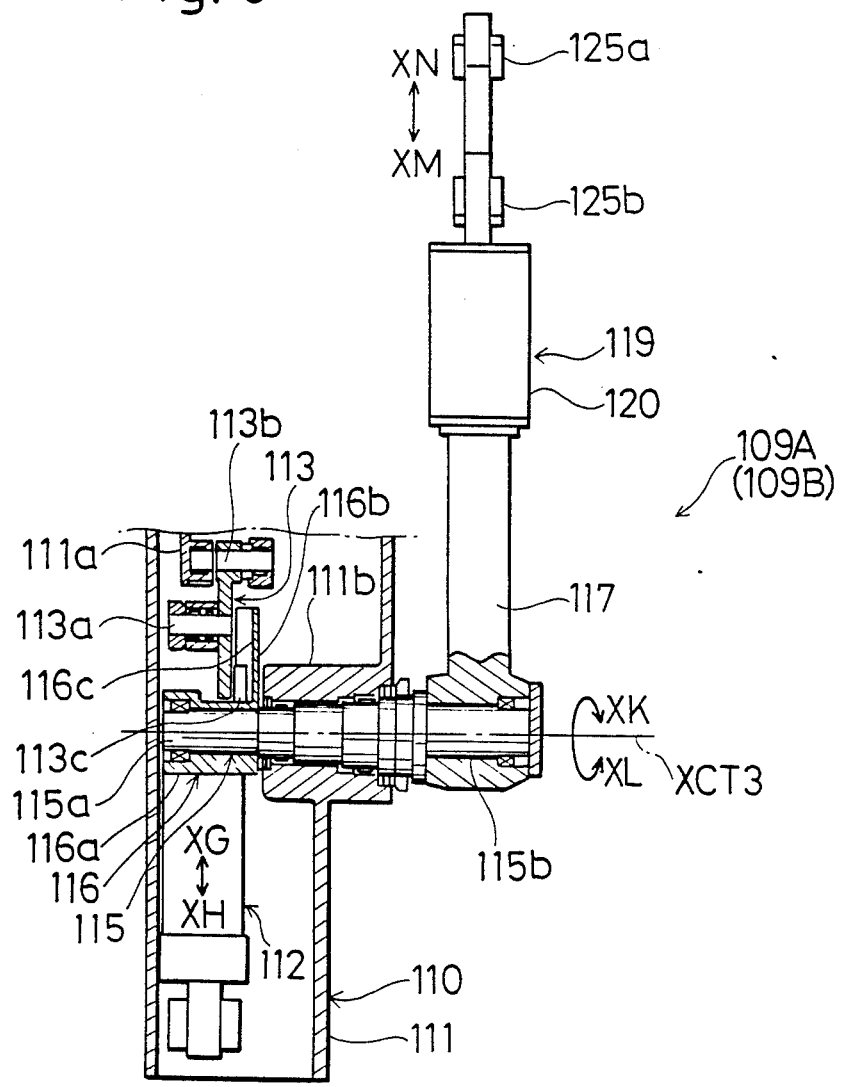
FIG. 8 is a partly sectional view showing an important feature of the loading apparatus of FIG. 7.

At the oblique portion to the right above the arm turning cylinder 112 in FIG. 7 is disposed a bearing portion 111b of the casing 111. An engaging shaft 115 in the bearing portion 111b, projects a right end portion 115b to the outside of the casing 111, as shown in FIG. 8, and is rotatably supported with the shaft center XCT3 of the shaft 115 as its center in the directions of arrows XK and XL. An engaging member 116 is installed through a boss portion 116a of the engaging member 116 with the left end portion 115a of the engaging shaft 115. A plate 116b of the engaging member 116 is provided so as to jut out in a right-angle direction toward the shaft center XCT3 of the engaging shaft 115. On the plate 116b is formed an engaging slot 116c. A roller 113c of the lever 113 is fitted in and engaged with the slot 116c so as to be free to turn.

At the right end portion 115b of the engaging shaft 115 in FIG. 8, the arm 117 is connected so as to be able to oscillate together with the engaging shaft 115 in the direction of arrows XK and XL. At the end of the arm 117 in FIG. 7 is provided the hand 119. The hand 119 has a box-like main frame 120. Clamp portions 121a and 121b for holding the workpiece are provided with the main frame 120. The clamp portions 121a and 121b have driving cylinders 122A and 122B and clamps 125a and 125b, respectively. The driving cylinders 122A and 122B are provided in the main frame 120. The driving cylinders 122A and 122B each have a support rod 122a, a piston 122b and a cylinder 122c. The support rods 122a of the driving cylinders 122A and 122B are provided in such a manner that the upper and lower portions of the support rod 122a in FIG. 7 are connected with an upper plate 120a and a lower plate 120b of the main frame 120, respectively. At the center portion of each support rod 122a is stationarily disposed the respective piston 122b. Furthermore, a cylinder 122c is slidably engaged with the support rod 122a and with the piston 122b on its surrounding inside surface, and is mounted so as to be free to move in the up and down directions in FIG. 7 along the support rod 122a. In the cylinders 122c is formed an oil chamber 122d in such a manner that the support rod 122a is covered. At a head portion 122e and a bottom portion 122f of each cylinder 122c, the pipes which are connected with the hydraulic apparatus (not shown) are connected in such a manner that pressurized oil is able to supply the oil chamber 122d. At the lower side surface of the cylinder 122c of the driving cylinder 122A in FIG. 7 are formed plurality of cogs 122g at predetermined intervals in the directions of arrows XM and XN. A rotatably mounted cog wheel 127 is meshed with these cogs 122g.

Furthermore, at the upper side surface of the cylinder 122c of the driving cylinder 122A in FIG. 7, a reverse J-form support bar 123 is movably mounted together with the cylinder 122c in the directions of arrows XM and XN. A bending portion 123a is formed on the support car 123 so as to project from the main body 120 in the arrow XN direction. At the top portion of the bending portion 123a in the figure is provided a clamp 125a. At the clamp 125a a workpiece holding portion 125c is formed in a V-form shape perpendicular to the paper surface in FIG. 7.

At the upper side surface of the cylinder 122c of the driving cylinder 122B in FIG. 7, a support bar 126 is movably provided together with the cylinder 122c in the directions of arrows XM and XN. With the support bar 126, a clamp 125b projects from the main body 120 in the direction as shown by arrow XN, and is disposed so as to face the clamp 125a. A workpiece holding portion 125c on the clamp 125b is formed in a V-form shape perpendicular to the paper surface in FIG. 7. At the right end portion of the support bar 126, which is inserted in the main body 120 in the figure, a stepped portion 126a is disposed facing the cog wheel 127. Plural cogs 126b are formed on the stepped portion 126a at predetermined intervals in the directions of arrows XM and XN. The cogs 126b are engaged with the cog wheel 127.

Furthermore, a cover 135 is provided to cover the main body 102 of the complex machining machine tool 100, as shown in FIG. 6. And, at both the right side and the left side of the complex machining machine tool 100 in FIG. 5, a bar feeder 143 is provided such that a bar shaped workpiece can be supplied to the chucks 103b and 105b through the spindles 103a and 105a, respectively.

With the above-described constitution of the complex machining machine tool 100, when a workpiece 131 is required to be machined, at first the workpiece 131 to be machined is installed in the chuck 103b by using the loading apparatus 109A of left hand in FIG. 5. To do this, the operator inserts the workpiece 131 between the clamps 125a and 125b of the hand 119, which is positioned at a waiting position XX1 as shown by full line in FIG. 6. In the foregoing state, the hydraulic apparatus (not shown) is driven to supply the inside of the cylinder 122c with the pressurized oil from the side of the bottom portion 122f of the driving cylinder 122A, as shown in FIG. 7, and to drain the pressure oil in the oil chamber 122d from the side of the head portion 122e. At the same time, the pressure oil is supplied from the side of the head portion 122e of the driving cylinder 122B to the inside of the cylinder 122c, and the pressure oil in the oil chamber 122d is drained from the side of the bottom portion 122f. Then the cylinder 122c of the driving cylinder 122A moves along the support rod 122a together with the support bar 123 in the direction as shown by the arrow XM. It is pushed down by the supplied pressurized oil and meshes with the cog wheel 127, and its inside surface in FIG. 7 is slidably contacted with the piston 122b. At the same time, the cylinder 122c of the driving cylinder 122B moves along the support rod 122a together with the support bar 126 in the direction as shown by the arrow XN in such a manner that it is pushed up by the supplied pressurized oil. The support bar 125 cog wheel 127 and its inside surface in FIG. 7 is slidably contacted with the piston 122b. Then the clamp 125a, which is installed on the support bar 122, moves in the direction as shown by the arrow XM in FIG. 7, and the clamp 125b, which is installed in the support bar 126, moves in the direction as shown by the arrow XN. Accordingly, the workpiece 131 is gripped and held by the clamps 125a and 125b. Each clamp 125a and 125b is synchronously moved in the directions of arrows XM and XN at equal speed because of the action of the cog wheel 127, the cogs 122g, and the cogs 126b. As a result, the workpiece 131 is accurately held at an intermediate position in the directions of arrows XM and XN of the clamps 125a and 125b.

Figure 9:
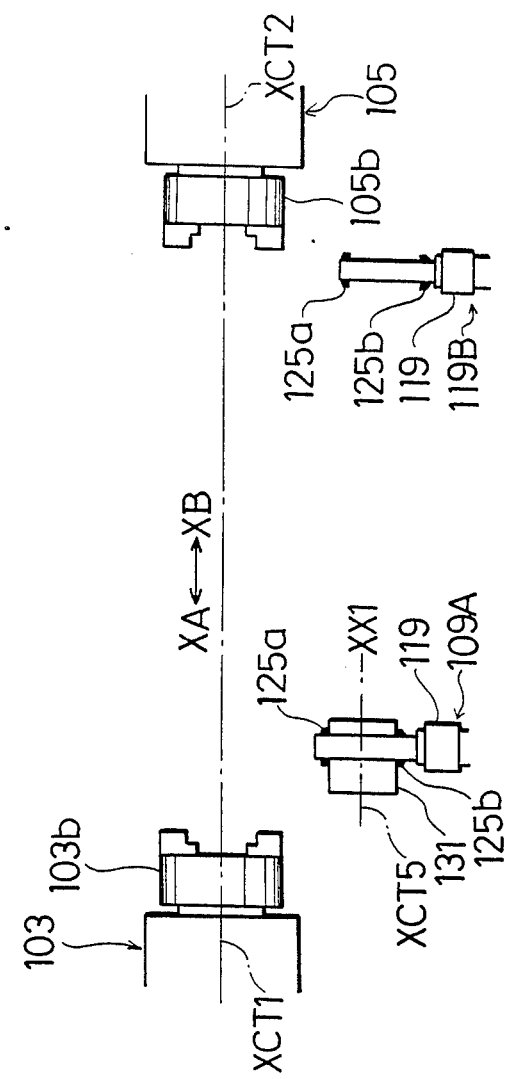

When the workpiece 131 is held by the loading apparatus 109A as shown in FIG. 9, the arm turning cylinder 112 of the loading apparatus 109A as shown in FIG. 7 is driven to retract the rod 112a together with the connecting member 112b in the direction as shown by the arrow XH, and to position the rod 112a at the position which is indicated by full lines in the figure. Then the lever 113 rotates and is pulled down by the connecting member 112b, with the pin 113b acting as its center in the direction as shown by the arrow XJ. When the lever 113 rotates in the direction as shown by the arrow XJ, the roller 113c, which is provided on the right end portion of the lever 113 in the figure, also rotates in the direction as shown by arrow XJ and moves to rotate in the engaging slot 116c in the engaging member 116. The engaging member 116 thus rotates, by being pushed and pressed downward by the roller 113c, together with the engaging shaft 115, with the shaft center CT3 of the shaft 115 as its center, in the direction as shown by the arrow XK. As a result, the hand 119 moves, because of the arm 117, in the direction as shown by the arrow XK, the workpiece 131 being held by the hand 119 and positioned at a workpiece delivery position XX2 facing the chuck 103b as shown in FIG. 10.

Next, when the chuck 103b is opened, the driving motor (not shown) for driving the spindle stock 103 in the Z axis direction (in the directions of arrows XA and XB) is driven at a lower torque to move the spindle stock 103 together with the chuck 103b toward the hand 119 in the direction as shown by arrow XB. Then the chuck 103b abuts against the left edge portion of the workpiece 131 held by the hand 119 in FIG. 10. Furthermore, the chuck 103b pushes the workpiece 131 in the direction as shown by the arrow XB. At this time, since the driving motor moving the spindle stock 103 in the direction as shown by the arrow XB is driven at a low torque, the force at which the spindle stock 103 pushes against the workpiece 131 via the chuck 103b in the direction as shown by the arrow XB is weak, so that the hand 119 and the like is not deformed by the pushing force.

In this way, when the workpiece 131 is pushed against the chuck 103b, the chuck 103b is closed, and the workpiece 131 is held by means of the chuck 103b. Thereafter, in this state, the pressurized oil is supplied to the inside of each cylinder 122c from the head portion 122e of the driving cylinder 122A, and the bottom portion 122f of the driving cylinder 122B, as shown in FIG. 7. At the same time, the pressurized oil which had been heretofore supplied to the inside of the cylinder 122c is drained through the bottom portion 122f of the driving cylinder 122B. Then the cylinder 122c of the driving cylinder 122A moves along the support rod 122a in the direction as shown by the arrow XN together with the support bar 123. The cylinder is pushed up by the pressurized oil which is supplied to the inside of the cylinder 122c, meshes with the cog wheel 127, and its inside surface is slidably contacted with the piston 122b. At the same time, the cylinder 122c of the driving cylinder 122B moves along the support rod 122a in the direction as shown by the arrow XM together with the support bar 126. The cylinder is pushed down by the supplied pressurized oil, meshes with the cog wheel 127, and its inside surface is slidably contacted with the piston 122b. The clamps 125a and 125b are thus synchronously opened and moved in the directions of arrows XN and XM so that the holding relation between the workpiece 131 and the clamps 125a and 125b is released.

In this way, when the workpiece 131 is held with the chuck 103b as shown in FIG. 10, and the holding relation between the workpiece 131 and the hand 119 of the loading apparatus 109A is released, the driving motor for driving the spindle stock 103 in the Z axis direction is driven to move the spindle stock 103 a predetermined distance together with the chuck 103b in the direction going away from the hand 119, that is, in the direction as shown by the arrow XA. Furthermore, in this state the arm turning cylinder 112 as shown in FIG. 7 is driven, and the rod 112a is projected together with the connecting member 112b in the direction as shown by the arrow XG. Then the lever 113 turns with the pin 113b as its center, in the direction as shown by the arrow XI, due to being pushed by the connecting member 112b. When the lever 113 turns in the direction as shown by the arrow XI, the roller 113c of the lever 113 also turns in the direction as shown by the arrow XI while rotating in the engaging slot 116c of the engaging member 116. The engaging member 116 then rotates together with the engaging shaft 115, with the shaft center XCT3 of the shaft 115 as its center, in the direction as shown by the arrow XL, being pushed toward the upper portion of the figure by the roller 113c. As a result, the hand 119 is moved by the arm 117 in the direction as shown by the arrow XL, and is positioned at the waiting position XX1 as shown in full lines in FIG. 11.

Next, the chuck 103b, as shown in FIG. 12, is rotated together with the workpiece 131. In this state, the machining of a first routine is performed on the workpiece 131 by means of a tool 133 in such a manner that the tool rest 106 corresponding to the spindle 103a is moved and driven together with the tool 133 in the direction as shown by the arrow XE in FIG. 6 and in the directions as shown by the arrows XA and XB (Z axis direction) in FIG. 5 appropriately. During the machining, a workpiece 131 to be machined next is supplied by the hand 119 of the loading apparatus 109A as shown in FIG. 12.

In this way, as shown at the left in FIG. 13, when the first routine is performed toward the workpiece 131, the spindle stock 103 is moved a predetermined distance together with the chuck 103b in the direction as shown by the arrow XB. At the same time, the spindle stock 105 is moved a predetermined distance in the direction as shown by the arrow XA with the chuck 105b in an open state. By this, the spindle stocks 103 and 105 become close to each other. Then the right end portion of the workpiece 131, which is held by the chuck 103b, and to which the first routine finished in FIG. 14, is inserted in to the chuck 105b. The chuck 105 is then closed and the right end portion of the workpiece 131, as seen in the figure, is held. The chuck 103b is opened to release the holding relation between the chuck 103b and the workpiece 131. In this state the spindle stock 103 is moved a predetermined distance together with the chuck 103b in the direction as shown by the arrow XA, as shown in FIG. 15. The spindle stock 105 is moved a predetermined distance, with the workpiece 131 held by the chuck 105b, in the direction as shown by the arrow XB, to finish the delivery of the workpiece 131 between the spindle stocks 103 and 105.

Thereafter the chuck 105b is rotated together with the workpiece 131, and a tool rest 106 corresponding to the spindle 105a is moved and driven together with a tool 133 in the direction as shown by the arrow XE in FIG. 6 and in the directions as shown by the arrows XA and XB (Z axis direction) in FIG. 5. In this way, a second routine of the machining is performed toward the workpiece 131 by means of a tool 133, as shown in FIG. 6. During this time, another workpiece 131 is supplied to the chuck 103b of the spindle stock 103 by means of the loading apparatus 109A in order to perform the first routine of the machining on the workpiece 131, as shown in FIG. 15.

In this way, when the second routine of the machining is performed on the workpiece 131 held by the chuck 105b, the arm turning cylinder 112 of the loading apparatus 109B is driven to retract the rod 112a in the direction as shown by the arrow XH. As a result, the arm 117 is moved together with the hand 119 in the direction as shown by the arrow XK to position the hand at the workpiece delivery position XX4 facing the chuck 105b, as shown in FIG. 17. In this state, the spindle stock 105 is moved and driven in the direction as shown by the arrow XA such that the workpiece 131, after the machining, is held by the chuck 105b. The workpiece 131 is then positioned at a position between the clamps 125a and 125b of the hand 119, and the clamps 125a and 125b are closed to hold the workpiece 131. Next, the holding relation between the workpiece 131 and the chuck 105b is released. In this state, the spindle stock 105 is moved together with the chuck 105b in the direction as shown by the arrow XB. The hand 119 is then turned and driven, together with the workpiece 131 and after the machining, in the direction as shown by the arrow XL in FIG. 7, to position the hand of the waiting position XX3, as shown in full lines in FIG. 6. In this state, the holding relation between the workpiece 131 and the hand 119 of the loading apparatus 109B is released, and the workpiece 131 is detached from the hand 119.

In the above-described embodiment, when the delivery of the workpiece 131 between the spindle stocks 103 and 105 is performed, it had been mentioned that the spindle stock 103 is moved in the direction as shown by the arrow XB, and the spindle stock 105 is moved in the direction as shown by the arrow XA, respectively, so that the spindle stocks 103 and 105 approach each other. However, this method of approach of the two spindle stocks 103 and 105 is not critical. Any method of approach is available as long as these spindle stocks 103 and 105 are able to approach each other without inconvenience. For example, it may be that spindle stocks 103 and 105 approach each other to perform the delivery of the workpiece 131 such that only the spindle stock 105 is moved toward the spindle stock 103 in the direction as shown by the arrow XA, and the spindle stock 103 is not moved in the Z axis directions (directions as shown by the arrows XA and XB). On the contrary, it may be that the spindle stocks 103 and 105 approach each other such that the spindle stock 103 only is moved toward the spindle stock 105 in the direction as shown by the arrow XB, and the spindle stock 105 is not moved in the Z axis directions.

In particular, in the case of the machining of a long-sized workpiece 131, the loading apparatus 109A and 109B are positioned at waiting positions XX1 and XX3 to adjust each hand 119, as shown in FIG. 18. In this state, the workpiece 131 is held by both the hands 119 and 119. The spindle stock 103 is moved in the direction as shown by the arrow XA and the spindle stock 105 is moved in the direction as shown by the arrow XB so as to be able to supply the workpiece 131 between the chucks 103b and 105b. The interval between the chucks 103b and 105b is made wider, by the predetermined distance, than the length of the workpiece 131 in the directions as shown by the arrows XA and XB. Next, in this state, each arm 117 of the loading apparatus 109A and 109B, as shown in FIG. 7, is synchronously turned and driven together with the hands 119 in the direction as shown by the arrow XK.

The hands 119 are then positioned at a position facing each chuck 103b and 105b of the spindle stocks 103 and 105, as shown in FIG. 19. The workpiece 131, which is held by the hands 119, is thus positioned between the chucks 103b and 105b. In this state, the spindle stock 103 is moved together with the chuck 103b in the direction as shown by the arrow XB and the spindle 105 is moved together with the chuck 105b in the direction as shown by the arrow XA. The workpiece 131 is then held by being gripped by the chucks 103b and 105b. Next, the clamps 125a and 125b of each hand 119 of the loading apparatus 109A and 109B are opened to release the holding relation between the hands 119 and the workpiece 131. Furthermore, in this state, both arms 117 of the loading apparatus 109A and 109B, as shown in FIG. 7, are turned and driven together with the hands 119 in the direction as shown by the arrow XL to be returned to the waiting positions XX1 and XX3, as shown in FIG. 18.

In this way, when the long-sized workpiece 131 is held by the chucks 103b and 105b, the chucks 103b and 105b are synchronously rotated together with the workpiece 131. Next, in this state, the tool rests 106, as shown in FIG. 6, are moved and driven in the directions as shown by the arrows XE and XF and the arrows XA and XB as shown in FIG. 5 to machine the workpiece 131 in a predetermined shape by a tool 133, such as a bit, which is installed in each tool rest 106 as shown in FIG. 20.

Figures 22, 23:
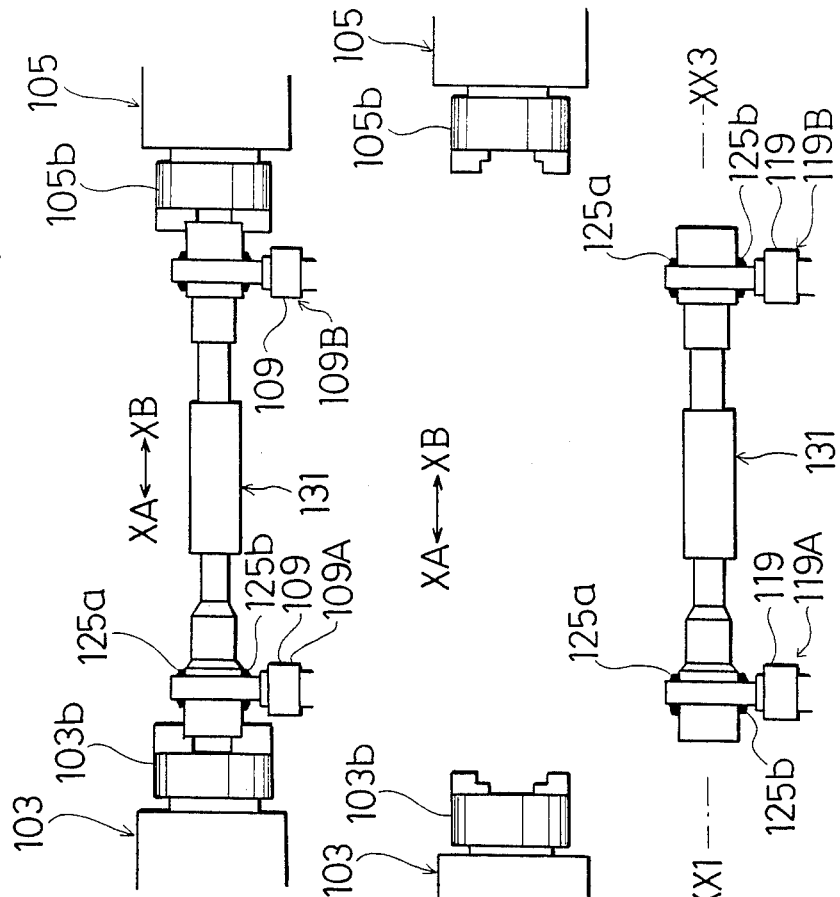

When the long-sized workpiece 131 is machined in the predetermined shape as shown in FIG. 21, the workpiece 131, after the machining, is held by each hand 119 of the loading apparatus 109A and 109B, as shown in FIG. 22. Furthermore, in this state the spindle stock 103 is moved in the direction as shown by the arrow XA and the spindle stock 105 is moved in the direction as shown by the arrow XB to retract from the workpiece 131. Next, each hand 119 of the loading apparatus 109A and 109B are synchronously turned and driven together with the workpiece 131 in the direction as shown by the arrow XL, as shown in FIG. 7, to position the workpiece 131 at the waiting positions XX1 and XX3 as shown in FIG. 23. In this state the holding relation between each hand 119 and the workpiece 131 is released, and the workpiece 131 is carried to a predetermined location by removing the workpiece 131.

Figure 24:
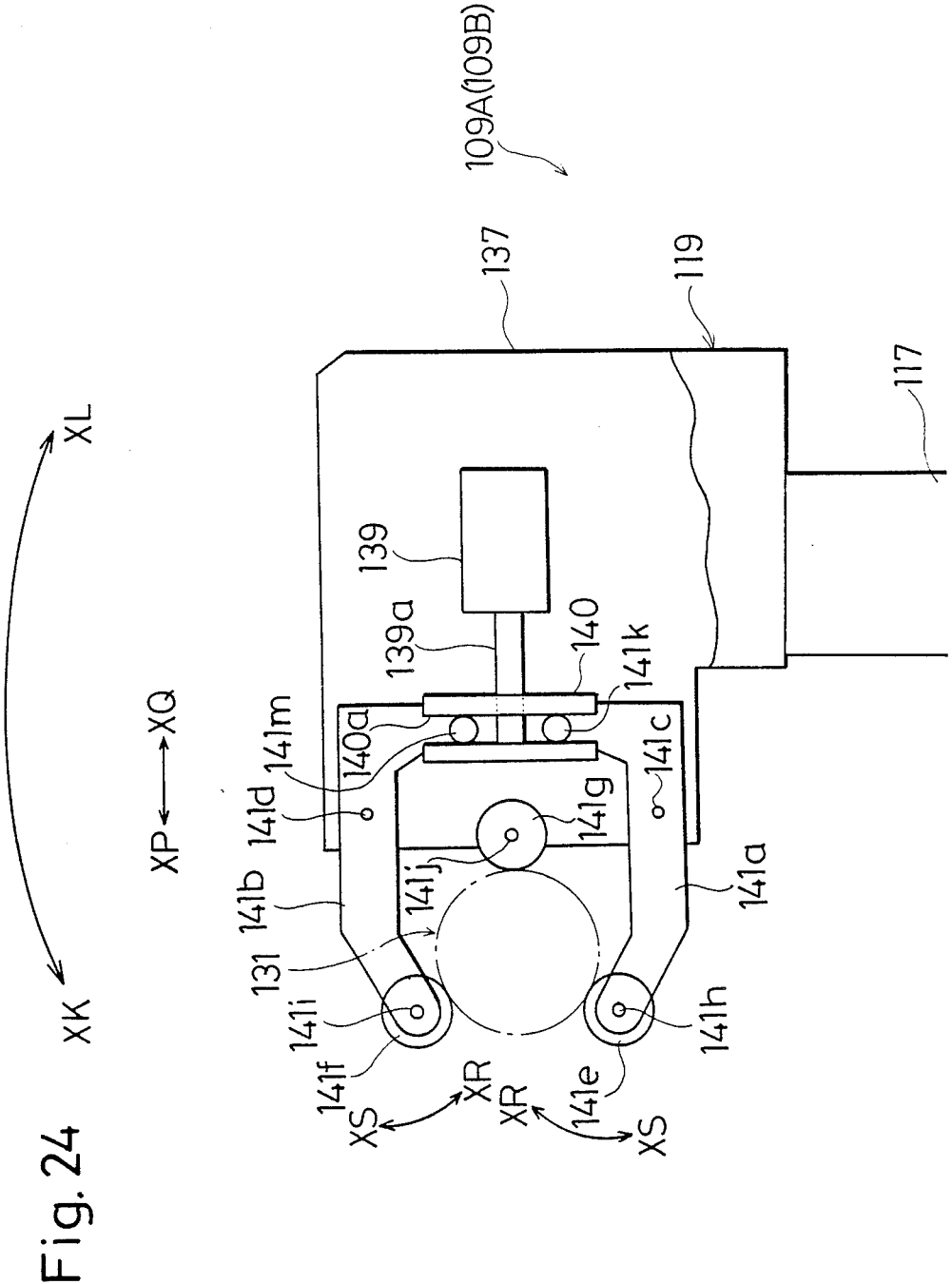
FIG. 24 shows another example of a hand of loading apparatus.

In the above-described embodiment, it has been mentioned that the clamps 125a and 125b have workpiece holding portions 125c formed in a V-shape, are free to open, close and drive with the hand 119, as shown in FIG. 7, and the workpiece 131 is held by being gripped between each workpiece holding portion 125c of the clamps 125a and 125b. Of course, this specific structure is not critical; any appropriate structure is available if the hand 119 can surely hold the workpiece 131. For example, it may be that rollers are rotatably provided as the hand 119 at the front edge portion of the clamp, as shown in FIG. 24. Hereinafter, the hand 119 having rollers will be explained on the basis of FIG. 24.

The hand 119 has a main body 137 which is provided at a top portion of the arm 117, as shown in FIG. 24. In the main body 137, a driving cylinder 139 is provided. A rod 139a is supported on the driving cylinder 139 so as to be free to project and recede in the right and left directions in the figure, that is, in the directions as shown by the arrows XP and XQ. At the top portion of the rod 139a is installed an engaging member 140. At the engaging member 140 is formed a slot 140a. In the slot 140a, rollers 141k, 141m, which are rotatably supported by two clamps 141a, 141b as described later, are fitted so as to be free to slide and engage with the slot 140a. The clamps 141a and 141b are free to turn on the main body 137 through pin connections 141c and 141d in the directions as shown by arrows XR and XS. At each top portion of the clamps 141a and 141b are rotatably provided rollers 141e and 141f on pins 141h and 141i. A roller 141g is rotatably disposed on the main body 137, as shown in FIG. 24, by a pin 141j. The left edge portion of the roller 141g in the figure is projected from the main body 117 in the direction as shown by an arrow XP.

A barfeeder machining operation is able to be performed on a workpiece 131, which is a bar-shaped workpiece, making use of the loading apparatus 109A and 109b having the hands 119 as described before and the barfeeders 143 disposed at the right and left sides of the complex machining machine tool 100 in FIG. 5.

When performing a barfeeder machining operation, at first the spindle stocks 103 and 105 as shown in FIG. 5 are moved and driven in the directions as shown by the arrows XA and XB, respectively. The chuck 103b is positioned at the predetermined distance from the hand 119 of the loading apparatus 109A in the direction as shown by the arrow XA. Similarly, the chuck 105b is positioned at the predetermined distance from the hand 119 of the loading apparatus 109B in the direction as shown by the arrow XB. In this state, the barfeeders 143 as shown in FIG. 5 are driven to deliver workpieces 131 to the chucks 103b and 105b through each of spindles 103a and 105a. The workpieces 131 project their respective ends a predetermined length from the chuck 103b in the direction as shown by the arrow XB and a predetermined length the chuck 105b in the direction as shown by the arrow XA.

Next, the spindles 103a and 105a are rotated and driven, respectively, to rotate the workpieces 131 with the chucks 103b and 105b. At the same time, each tool rest 106, as shown in FIG. 6, is moved and driven together with the tool 133 in the direction as shown by the arrows XA and XB, and in the direction as shown by the arrows XE and XF, to machine the outside cylindrical portions of the workpieces 131, as shown in FIG. 5.

At the time that the machining of the workpieces 131 is finished, the workpieces 131 are cut off, such that the machined portion of the workpieces 131 are apart from the other raw portions. To do this, at first the spindle stock 103 is moved together with the workpiece 131 in the directions as shown by the arrows XA and XB and the spindle stock 105 is moved together with the workpiece 131 in the directions as shown by the arrows XA and XB. Thereafter, each machined portion of the workpieces 131 is positioned at a position facing each respective hand 119 of the loading apparatus 109A and 109B. Each tool rest 106, as shown in FIG. 6, is moved and driven together with the cutting-off tool 133 in the direction perpendicular to the paper surface of the figure, that is, in the direction as shown by the arrows XA and XB in FIG. 5, to position each tool 133 at a position facing the portion of the workpieces 131 to be cut.

Next, the driving cylinder 139 of each hand 119, as shown in FIG. 24, is driven to project the rods 139a together with the engaging members 140 in the direction as shown by the arrow XP, respectively. Then the clamps 141a and 141b of the hands 119 turn in the directions as shown by the arrows XS and are opened, with the pins 141c and 141d as their centers, because of the rollers 141k and 141m and the slot 140a of the engaging member 140 being pushed by the rod 139a.

Each arm 117 of the loading apparatus 109A and 109B is then turned and driven together with the hands 119 in the direction as shown by the arrow XK to make each machined portion of the workpieces 131, as shown in FIG. 5, fit in and engage between the clamps 141a and 141b of each hand 119. The driving cylinder 139 of each hand 119, as shown in FIG. 24, is driven to make each rod 139a, together with its engaging member 140, retract in the direction as shown by the arrow XQ. Then the clamps 141a and 141b turn, with the pins 141c and 141d as their center, each roller 141k and 141m and the slot 140a of the engaging member 140 being pulled by the rod 139a in the direction as shown by the arrow XR. Each roller 141e and 141f of the clamps 141a and 141b then connects with the top end portion of the respective workpieces 131. Furthermore, each workpiece 131 is pushed toward the roller 141g to be gripped between the rollers 141e, 141f and 141g.

In this way, when each machined portion of the workpieces 131 is supported by its respective hand 119, the spindles 103a and 105a, as shown in FIG. 5, are rotated and driven together with the workpieces 131. At the same time, the tool rests 106 are fed, together with the cutting-off tools 133, in the direction as shown by the arrow XE in FIG. 6 to cut off the workpieces 131, so that each machined portion of the workpieces 131 is separated from the remaining raw portion. Since the workpieces 131 are rotatably supported by the rollers 141e, 141f and 141g of each hand 119 as shown in FIG. 24, the hands 119 do not prevent the rotation of the spindles 103a and 105a, and the cutting-off operation of each workpiece 131 is performed without inconvenience. And, since the machined portion of each workpiece 131 is supported by the hand 119 in such a manner that the movement in the directions as shown by the arrows XA and the XB is restricted, the machined portion does not fall from the hand 119.

When the machined portion of each workpiece 131 is cut off, each arm 117 of the loading apparatus 109A and 109B, as shown in FIG. 24, is turned and driven in the direction as shown by the arrow XL such that the machined portions of the workpieces 131 are supported with the hands 119, and the hands 119 are positioned at the waiting positions XX1 and XX3, as shown in FIG. 6. Next, the clamps 141a and 141b of each hand 119 of the loading apparatus 109A and 109B is opened. The supporting relation between the hands 119 and the machined portion of the workpieces 131 is then released. The machined portion is then removed from each hand 119 and carried to some predetermined location.

When the machined portion of each workpiece 131 is taken away, the bar feeders 143 as shown in FIG. 5, are driven. Thereafter, the workpieces 131 are supplied to the chucks 103b and 105b through the spindles 103a and 105a to continue the predetermined barfeeder machining.

In the above-described embodiment, there had been mentioned the case where the workpiece 131, after the first routine, and being held by the chuck 103b, is delivered to the side of the spindle stock 105 such that the spindle stocks 103 and 105 approach each other by moving in the Z axis direction.

However, in the method of delivery of the workpiece 131, the above case is not critical. Any method is available if the workpiece 131 is able to be surely delivered from the side of the spindle stock 103 to the side of the spindle stock 105. For example, when the workpiece 131 is a bar-shaped workpiece, and the machining is performed while the workpiece 131 is supplied to the chuck 103b by the barfeeder 143, as shown on the left hand side in FIG. 5, the holding relation between the workpiece 131 and the chuck 103b is released after the first routine. In this state the barfeeder 143 is driven to move the workpiece 131 in the direction as shown by the arrow XB. The end portion of the workpiece 131 is then inserted in chuck 105b. In this state the workpiece 131 is held by the chucks 103b and 105b in such a manner that the chucks 103b and 105b are closed. The predetermined portion of the workpiece 131 between the chucks 103b and 105b is then cut off by cutting-off tool 133, as described before, and the machining of the second routine is performed on the workpiece 131 held by the chuck 105b after the cutting. Furthermore, the workpiece 131 after the second routine is removed and carried to the predetermined location from the chuck 105b, making use of the hand 119 of the loading apparatus 109B.

The delivery of the workpiece 131 may also be performed as follows. After the first routine, the holding relation between the chuck 103b and the workpiece 131 is released. The workpiece 131 is then held by the hand 119 of the loading apparatus 109B. Furthermore, in this state, the spindle stock 103 is moved in the direction as shown by the arrow XA in FIG. 5 to pull the raw portion of the workpiece 131 out of the chuck 103b. Next, the holding relation between the workpiece 131 and the hand 119 is released. The spindle 105 is then moved in the direction as shown by the arrow XA. The top edge portion of the workpiece 131 is held by the chuck 105b to cut off the workpiece 131. In this way the method of the delivery of the workpiece 131 is completed.

Another embodiment of a complex machining machine tool will be described in FIG. 25 through FIG. 70.

Figure 25:
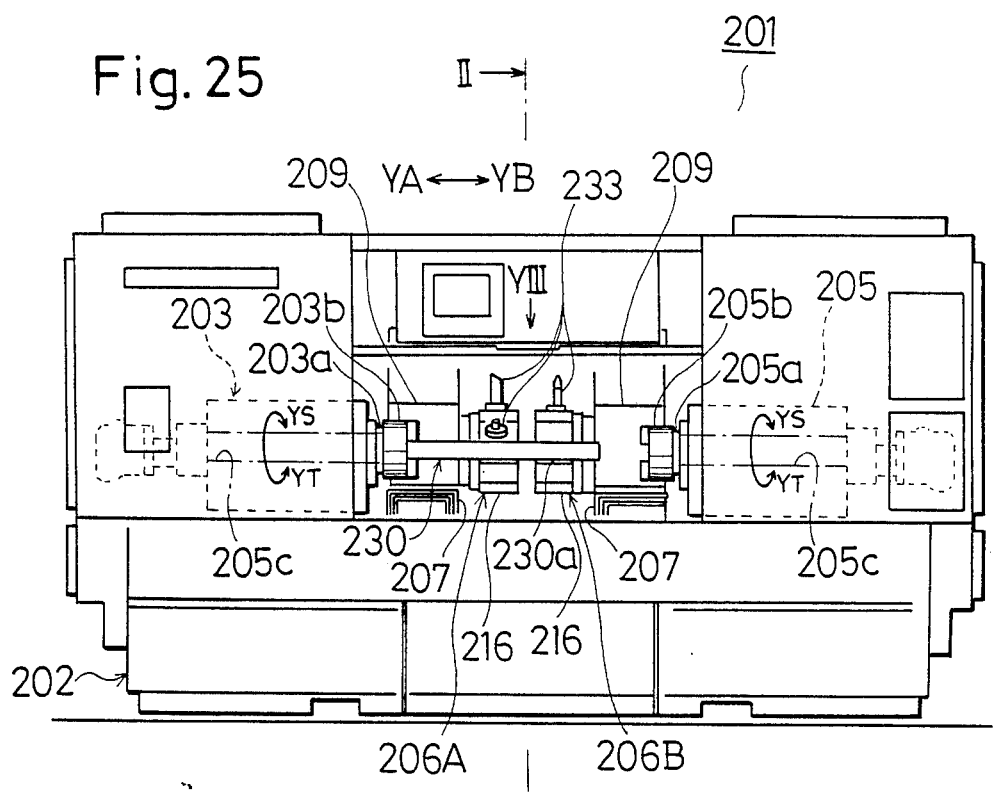
FIG. 25 is a front elevation showing a third embodiment of a complex machine tool according to the present invention.
Figure 27:
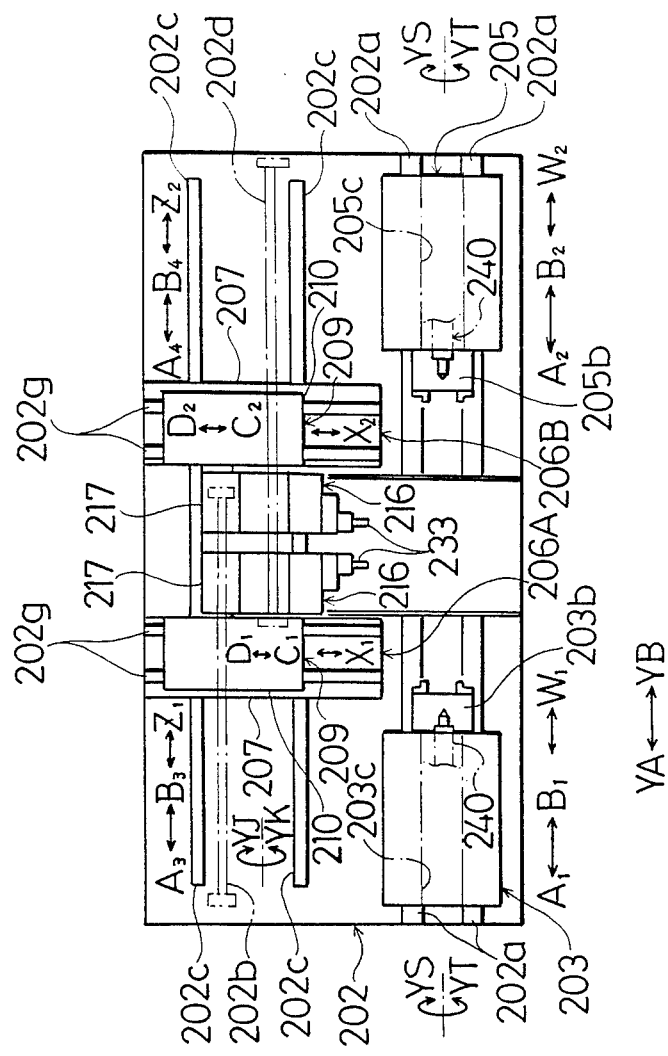
FIG. 27 is a view seen by the arrow YIII of FIG. 25.

A complex machining machine tool 201 has a machine body 202 as shown in FIG. 25. On the machine body 202, spindle stocks 203 and 205 mutually oppose each other. The spindle stocks 203 and 205 are movably and drivably provided on guide rails 202a, as shown in FIG. 27, in the directions as shown by arrows $A_1$ and $B_1$ (that is, in the $W_1$ axis direction) and in the direction as shown by arrows $A_2$ and $B_2$ (that is, in the $W_2$ axis direction). Each direction is parallel to the direction as shown by arrows YA and YB. Spindles 203a and 205a are rotatably and drivably provided on the spindle stocks 203 and 205 in the directions as shown by arrows YS and YT, as shown in FIG. 24, respectively. Chucks 203b and 205b are installed on the spindles 203a and 205a. Through holes 203c and 205c are formed in the spindles 203a and 205a penetrating the spindles 203a and 205a in the directions as shown by arrows YA and YB. In the through holes 203c and 205c of the spindles 203a and 205a and chucks 203b and 205b are movably disposed centers 240 in the directions as shown by the arrows YA and YB, as shown in FIG. 27.

Figure 26:
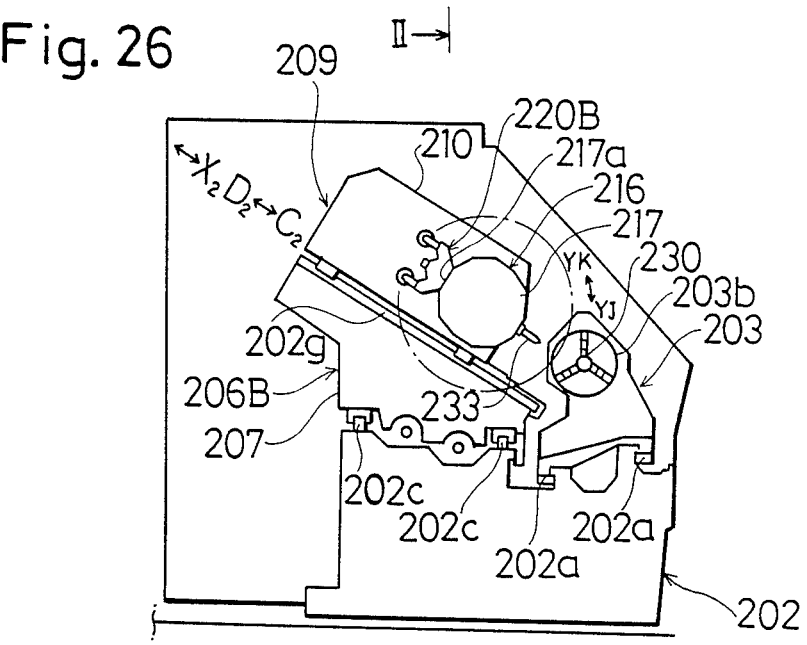
FIG. 26 is a sectional view along line II—II of FIG. 25.

On the machine body 202 are carriages 207, comprising tool rests 206A and 206B, movably provided on guide rails 202c and disposed at right angles to the paper surface in FIG. 26 (that is, the directions as shown by the arrows YA and YB in FIG. 27) in the directions as shown by the arrows $A_3$ and $B_3$ (that is, in the $Z_1$ axis direction) and in the direction as shown by the arrow $A_4$ and $B_4$ (that is, in the $Z_2$ axis direction). Each direction is parallel to the direction shown by the arrows YA and YB. With each carriage 207 of the tool rests 206A and 206B is provided a respective ball screw 202$b$ and 202$d$ in the elongated directions shown by the arrows YA and YB in FIG. 28. Each ball screw is connected by a nut (not shown) to a respective carriage. Servomotors (not shown) are connected with the ball screws 202$b$ and 202$d$. The tool rests 206A and 206B move in respective movement areas ARE1 and ARE2, and the servomotors are driven to make the ball screws 202$b$ and 202$d$ rotate in reciprocal directions. The movement areas ARE1 and ARE2 denote movement boundaries of each tool 233 in the directions as shown by the arrows YA and YB when the tool rests 206A and 206B move together with their tools 233 along the movement direction of the spindles 203 and 205, that is, the directions as shown by the arrows YA and YB. The movement areas ARE1 and ARE2 are provided so as to overlap. The common movement area ARE3 denotes the area of overlap of the movement areas ARE1 and ARE2.

Furthermore, a turret base 209 is movably and drivably provided with each carriage 207 on each of guide rails 202$g$ in the directions as shown by the arrows $C_1$ and $D_1$ (in the $X_1$ axis direction) and in the directions as shown by the arrows $C_2$ and $D_2$ (in the $X_2$ axis direction) as shown in FIG. 27. Each turret base 209 has a main body 210. With each main body 210 is provided a turret 216 free to turn and drive in the directions as shown by arrows YJ and YK in FIG. 29. The turret 216 has a turret base 217.

In the casing 217 and the turret base 209 is provided a tool rotation driving structure 232. The tool rotation driving structure 232 has a driving motor 211, pulleys 211$a$ and 213$a$, bearing portions 212 and 217$b$, a shaft 213, a belt 215, bevel gears 213$b$ and 219$a$, and a rotation shaft 219. In the main body 210 of the turret base 209 is disposed the driving motor 211. A shaft 211$b$ is rotatably supported by the driving motor 211 in the directions as shown by arrows YE and YF. The pulley 211$a$ is installed on the shaft 211$b$. In the main body 210 is also provided the bearing portion 212. At the bearing portion 212, the shaft 213 extends its shaft center YCT1 in the up and down directions in FIG. 29, that is, the directions as shown by arrows YG and YH, and is rotatably supported, with the shaft center YCT1 as its center, in the directions as shown by arrows YJ and YK. On the lower end portion of the shaft 213 is installed the pulley 213$a$. The belt 215 is disposed to stretch between the pulley 213$a$ and the pulley 211$a$, which is installed on the shaft 211$b$ of the driving motor 211. At the upper end portion of the shaft is installed the bevel gear 213$b$.

Figure 29:
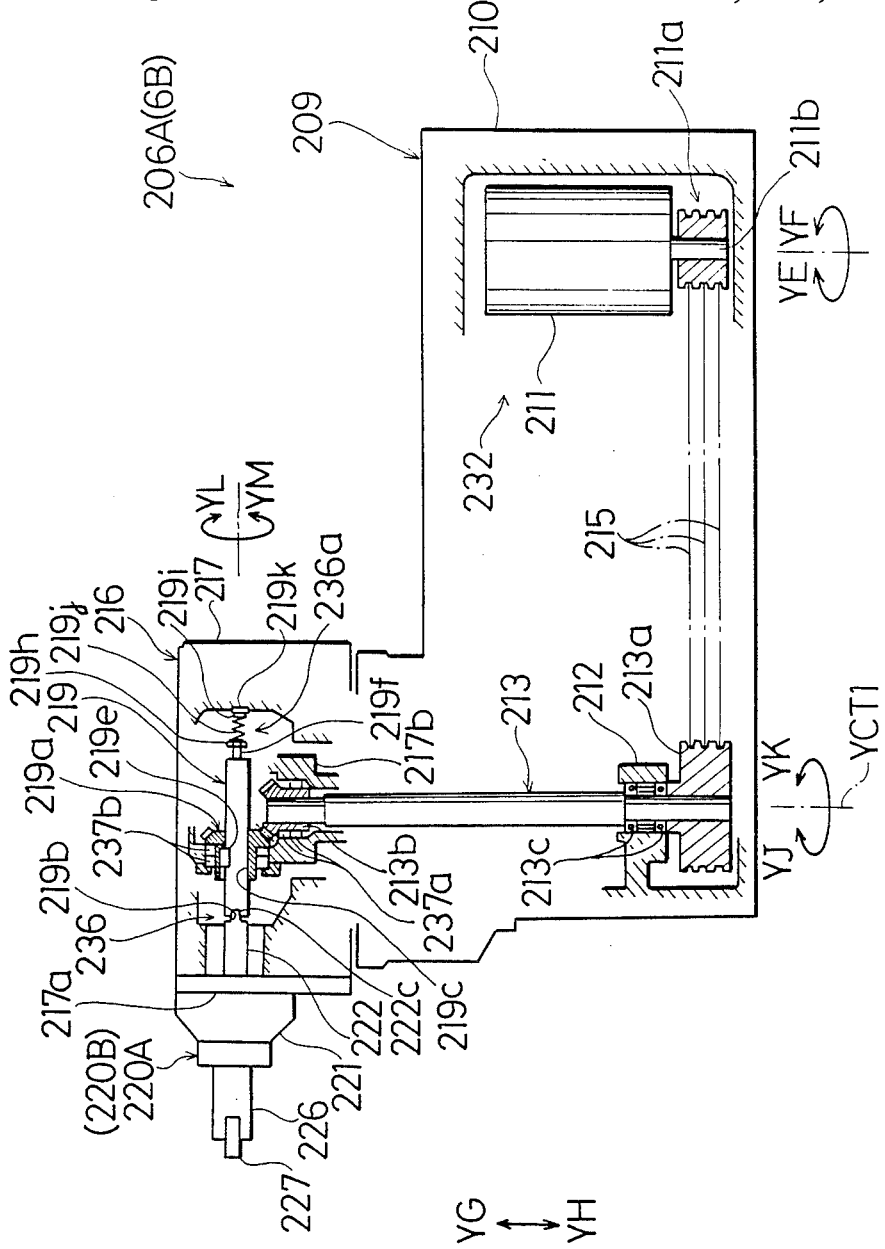
FIG. 29 is a front elevation showing a tool rest of the complex machine tool as shown in FIG. 25.

The turret 216 is rotatably disposed with the shaft 213 as its center in the directions as shown by the arrows YJ and YK at the main body 210 of the turret base 209, as shown in FIG. 29. In the casing 217 of the turret 216 is provided a bearing portion 217$b$. In the bearing portion 217$b$, the bevel gear 213$b$, which is installed on the shaft 213, is fitted to be free to rotate through a bearing 237$a$ in the directions as shown by the arrows YJ and YK. The bevel gear 219$a$ is rotatably supported by the bearing portion 217$b$ through a bearing 237$b$ in the directions as shown by arrows YL and YM.

Figure 30:
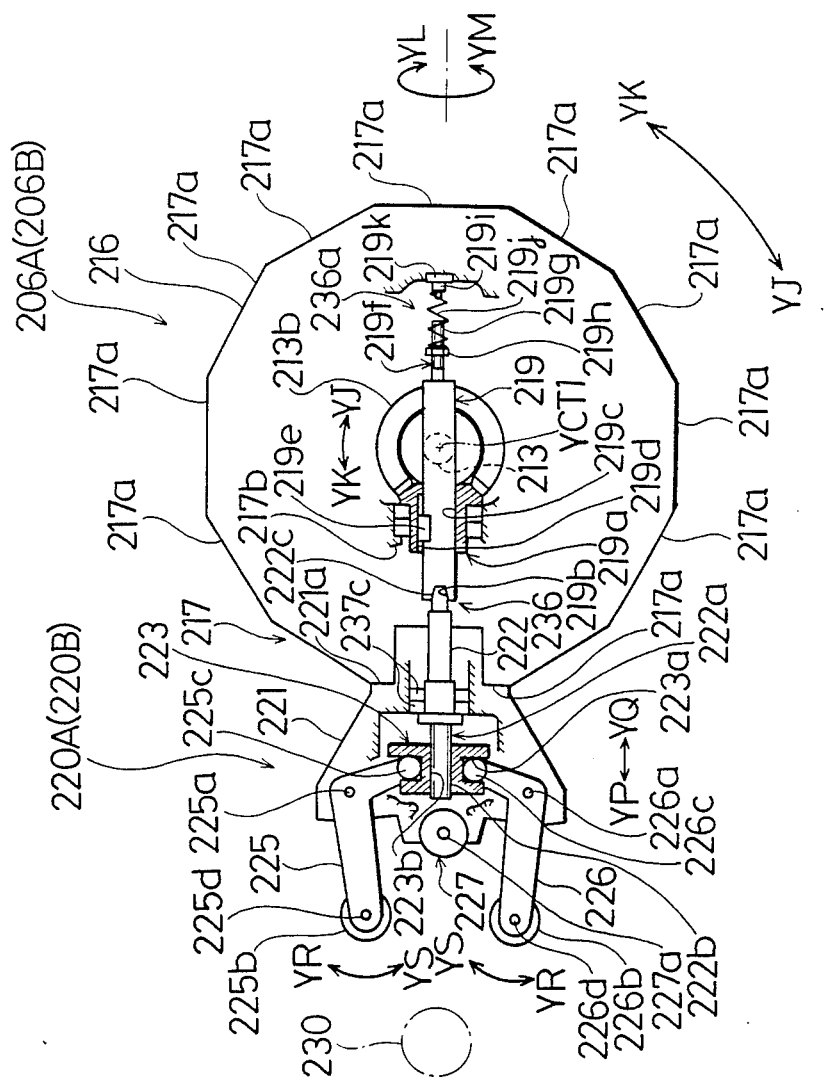
FIG. 30 shows an example of a workpiece center rest apparatus installed in a tool rest.

In the bevel gear 219$a$ is provided a hole 219$c$ penetrating therethrough in the right and left directions in FIG. 30, that is, in the directions as shown by arrows YP and YQ. In the hole 219$c$ is disposed a key way 219$d$. Furthermore, in the hole 219$c$ of the bevel gear 219 is fitted the rotation shaft 219, supported so as to be free to move only in the directions as shown by the arrows YP and YQ and such that a key 219$e$, which is installed in the peripheral surface of the rotation shaft 219, is fitted in a key way 219$d$ so as to be slidable. A right end portion 219$f$ of the rotation shaft 219 in FIG. 30 is provided with a pressuring portion 236$a$, which is composed of a clutch 236. The pressuring portion 236$a$ has a screw portion 219$g$, a nut 219$h$, a support pin 219$i$, and a spring 219$j$. The screw portion 219$g$ is disposed at the right end portion 219$f$ of the rotation shaft 219.

The nut 219$h$ is disposed at the screw portion 219$g$. Furthermore, in the casing 217 of the turret 216 the support pin 219$i$ is rotatably mounted by a bearing 219$k$ to be rotatable in the directions as shown by arrows YL and YM, thus facing the nut 219$h$. The spring 219$j$ is disposed between the nut 219$h$ and the support pin 219$i$. At the left end portion of the rotation shaft 219 in FIG. 30 is a wedge shaped connecting slot or hole 219$b$, acting as part of the clutch 236.

Plural tool installation portions 217$a$ are formed at the outside surfaces of the turrets 216, these surfaces being composed of the tool rests 206A and 206B, respectively. Workpiece center rest apparatus 220A and 220B are installed on respective tool installation portions 217$a$.

Each workpiece center rest apparatus has a main body 221, as shown in FIG. 30. In the main body 221, a connecting shaft 222 is rotatably disposed by a bearing 237$c$ to be rotatable in the directions as shown by the arrows YL and YM. At the right end portion of the connecting shaft 222 is a wedge shaped connecting portion 222$c$ also acting as part of the clutch 236. The connecting portion 222$c$ is fitted in the connecting hole 219$b$ of the rotation shaft 219 so as to be free to connect and separate. A male screw 222$b$ is disposed at a left end portion 222$a$ of the connecting shaft 222. An engaging member 223 is movably disposed on the left edge portion 222$a$ movable only in the directions as shown by the arrows YP and YQ, and such that a female screw 223$b$ on the engaging member 223 is fitted on the male screw 222$b$. A space 223$a$ is formed on the engaging member 223 in a ring shape surrounding the left edge portion 222$a$ of the connecting shaft 222.

Clamps 225 and 226 are disposed on the main body 221 to be free to open and close, pivoting on pins 225$a$ and 226$a$ in the directions as shown by arrows YR and YS. Each clamp is substantially L-shaped. Support rollers 225$b$ and 226$b$ are rotatably mounted on the left end portions of respective clamps 225 and 226 on shafts 225$d$ and 226$d$. Respective balls 225$c$ and 226$c$ are provided on the other end portions of the clamps 225 and 226. The balls 225$c$ and 226$c$ slidably fit in the space 223$a$ of the engaging member 223. Furthermore, on the main body 221 between the clamps 225 and 226, a pressing roller 227 projects a portion thereof out of the main body 221, being rotatably disposed on a central shaft 227$a$.

With the above-described arrangement of the complex machining machine tool 201, when a long size shaft-shaped workpiece is required to be machined with the machine tool 201, it is necessary for the workpiece 230 to be supported by the workpiece center rest apparatus 220A or 220B so as not to deflect the workpiece from the rotation center during the machining. To do this, the workpiece center rest apparatus 220A and 220B are first installed in the turrets 216 of the tool rests 206A and 206B, as shown in FIG. 30, respectively. Each machine body 221 of the workpiece center rest apparatus 220A and 220B are attached to a tool installation portion 217a of a turret 216 such that the connecting portion 222c of the connecting shaft 222 is fitted in the connecting hole 219b of the rotation shaft 219. The connecting shaft 222 is then securely connected with the rotation shaft 219, since the connecting hole 219b is pushed into the connecting portion 222c by the elasticity of the spring 219j.

At the time that the workpiece center rest apparatus 220A and 220B are installed in the turrets 216 of the tool rests 206A and 206B, a pre-machining is performed. The pre-machining denotes the machining before the main machining of a holding portion of the long-sized workpiece 230 for the chucks 203b and 205b (that is, both right and left end portions 230f and 230e in FIG. 32), i.e. a cut in the form of a cylinder, or a center hole 230i or 230j provided on end surfaces 230g or 230h of the workpiece 230, as shown in FIG. 32 and FIG. 34.

The end portion 230f on the left side in the figure of the long-sized workpiece 230 to be machined, as shown in FIG. 32, is then held by the chuck 203b. Thereafter, the turret 216 of the tool rest 206A is turned in the directions as shown by the arrows YJ and YK to make the workpiece center rest apparatus 220A face the workpiece 230, as shown in FIG. 30. Next, the tool rest 206A is moved a predetermined distance, together with the workpiece center rest apparatus 220A, in the direction of arrow $C_1$ in FIG. 27, that is, in the direction of arrow YP in FIG. 30, and the workpiece 230 is passed between the rollers 225b and 226b. In this way, the pressing roller 227 of the center rest apparatus 220A comes into contact with the workpiece 230.

The driving motor 211 in the turret base 209, as shown in FIG. 29, is then driven to rotate the pulley 211a in the direction as shown by the arrow YF. The shaft 213 rotates together with the bevel gear 213b, through the pulleys 211a and 213a and the belt 215, in the direction as shown by the arrow YK. The rotation shaft 219 rotates due to the bevel gears 213b and 219a in the direction as shown by the arrow YL. Accordingly, the connecting shaft 222, as shown in FIG. 30, rotates by the connecting hole 219b and the connecting portion 222c in the direction as shown by the arrow YL, and the left end portion 222a of the connecting shaft 222 also rotates in the direction as shown by the arrow YL. When a torque greater than a predetermined torque value is transmitted to the connecting shaft 222 through the clutch 236, the connection between the connecting hole 219b of the clutch 236 and the connecting portion 222c is released. The connecting shaft 222 thus stops rotating in the direction as shown by the arrow YL.

Figure 31:
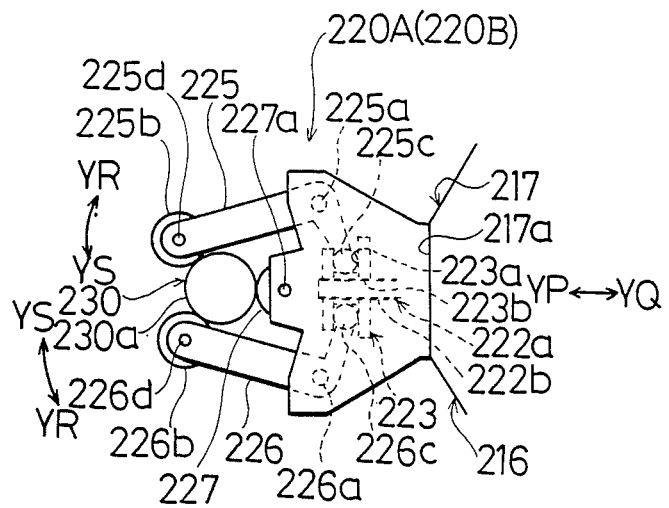
FIG. 31 shows an engagement condition between a workpiece center rest apparatus and a workpiece.

After the connecting shaft 222 rotates in the direction as shown by the arrow YL, the engaging member 223, which is fitted on the male screw 222b of the left end portion 222a by the female screw 223b, moves toward the shaft center YCT1 of the shaft 213 in the direction as shown by the arrow YQ in FIG. 30. The balls 225c and 226c of the clamps 225 and 226 then turn on their pins 225a and 226a in the direction shown by the arrow YS, being pulled by the engaging member 223, the balls 225c and 226c slidably moving in the space 223a of the engaging member 223. Each support roller 225b and 226b of the clamps 225 and 226 then also turns in the direction as shown by the arrow YS, as shown in FIG. 31, to come into contact with the workpiece 230. Furthermore, the workpiece 230 is pressed by the pressing roller 227.

At this point the pressuring support force operating on the workpiece 230 depends on the torque which is transmitted to the connecting shaft 222 from the rotation shaft 219 through the clutch 236, as shown in FIG. 30. If the transmission torque is more than a certain value, the connection between the connecting hole 219b and the connecting portion 222c is released against the elasticity of the spring 219j. Accordingly, the connecting shaft 222 then stops rotating in the direction as shown by the arrow YL. The torque then is no longer transmitted to the clamps 225 and 226 through the engaging member 223, and the clamps 225 and 226 stop turning in the direction shown by the arrow YS. As a result, the support rollers 225b and 226b stop pressing the workpiece 230 against the pressing roller 227, and the pressuring support force operating on the workpiece 230 is maintained at the set value. Accordingly, the workpiece 230 will not become difficult to rotate, since it is not pressed too much by the center rest apparatus 220A and 220B.

Figure 28:
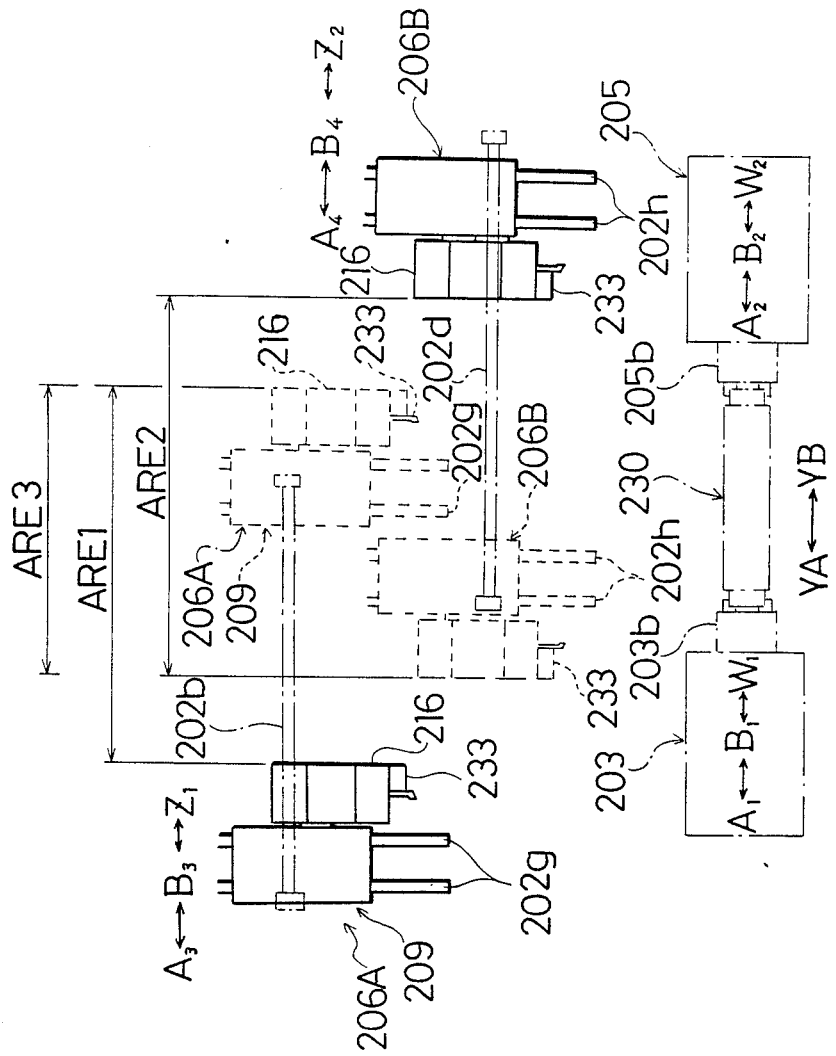
FIG. 28 shows the relation of the positions between two tool rests of the complex machine tool as shown in FIG. 25.

After the workpiece 239 is supported by the workpiece center rest apparatus 220A, held by the support rollers 225b and 226b and the pressing roller 227, the turret 216 of the tool rest 206B, as shown in FIG. 26, is turned in the direction as shown by the arrows YJ and YK to position a tool 233 for machining a center hole ar a predetermined position. Thereafter, the ball screw 202d, as shown in FIG. 28, is rotated by driving the servo-motor (not shown). The tool rest 206B is then moved together with the tool 233 in the direction as shown by the arrow $A_4$ in FIG. 32. Moreover, the tool rest 206B is moved a predetermined distance in the direction as shown by the arrow $C_2$. Then the tool 233 is positioned at the position facing the end surface 230g of the right side of the workpiece 230. Next, the direction as shown by the arrow YS. In this state the tool rest 206B is fed a predetermined distance together with the tool 233 in the direction as shown by the arrow $A_4$. The center hole 230i is then formed at the end surface 230g of the workpiece 230 by means of the tool 233.

Since the workpiece 230 is supported near the end portion 230e on the right side in FIG. 32 with the workpiece center rest apparatus 220A, the workpiece 230 does not deflect from the rotation center during machining of the center hole 230i, and the center hole 230i is formed smoothly.

After the center hole 230i is formed, the tool rest 206B is moved in the direction as shown by the arrow $B_4$ and in the direction as shown by the arrow $D_2$, as shown in FIG. 32, to move and retract from the workpiece 230. Next, the turret 216 of the tool rest 206B is turned in the direction as shown by the arrows YJ and YK to position the tool 233 for cutting the outside cylindrical portion at the predetermined position. The tool rest 206B is moved and driven, together with the tool 233 for cutting the cylindrical portion, in the directions as shown by the arrows $A_4$ and $B_4$ and in the directions as shown by the arrows $C_2$ and $D_2$. The edge portion 230e of the workpiece 230 is then cut in the form of a cylinder by making use of the tool 233. Since the workpiece 230 is rotatably supported near the edge portion 230e on the right side in FIG. 32 with the workpiece center rest apparatus 220A, similar to the provision of the center hole 230i described above, the workpiece 230 does not deflect from the rotation center during the machining, and the cutting of the cylinder portion is accurately performed. After the machining is finished, the tool rest 206B is moved and retracted in the direction as shown by the arrow $B_4$ and in the direction as shown by the arrow $D_2$.

Figure 33:
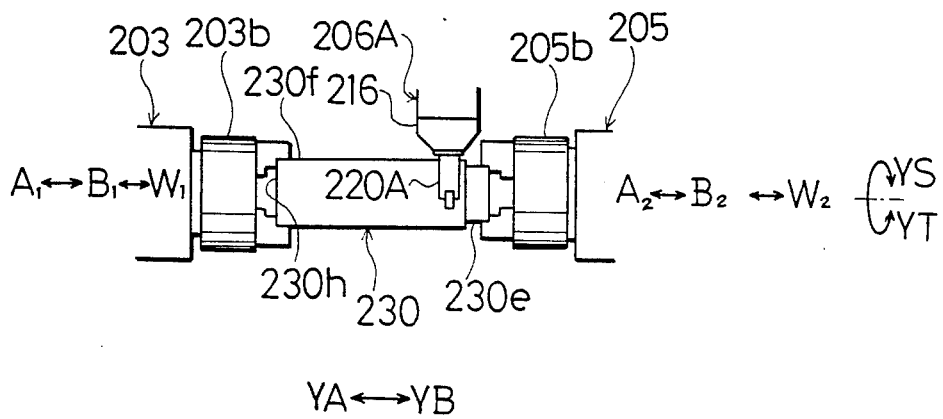

Thereafter, the chuck 205b of the spindle stock 205, as shown in FIG. 32, is opened. The spindle stock 205 is moved in the direction as shown by the arrow $A_2$. The machined end portion 230e on the right side in the figure of the workpiece 230 is inserted in the chuck 205b, as shown in FIG. 33. Next, the chuck 205b is closed. Furthermore, the driving motor 211 of the tool rotation driving structure 232 as shown in FIG. 29 is driven to release the supporting relation between the workpiece center rest apparatus 220A and the workpiece 230. The shaft 211b is rotated in the direction as shown by the arrow YE. Then the connecting shaft 222 is moved, through the pulleys 211a and 213a, the belt 215, the shaft 213, the bevel gears 213b and 219a, the rotation shaft 219, and the clutch 236, in the direction as shown by the arrow YM. The engaging member 223 as shown in FIG. 30 is then moved in the direction as shown by the arrow YP. The clamps 225 and 226 are turned about the pins 225a and 226a through the balls 225c and 226c in the direction shown by the arrow YR, so that the support rollers 225b and 226b move apart from the workpiece 230. Accordingly, the supporting relation between the workpiece center rest apparatus 220A and the workpiece 230 is released. After the supporting relation between the center rest apparatus 220A and the workpiece 230 is released, the tool rest 206A is moved in the direction as shown by the arrow $D_1$ in FIG. 32 to retract from the workpiece 230.

Thereafter, the spindle stock 203 is moved in the direction as shown by the arrow $B_1$, and at the same time the spindle stock 205 is moved in the direction as shown by the arrow $B_2$. The spindle stocks 203 and 205 are then synchronously moved a predetermined distance together with the workpiece 230 in the direction as shown by the arrow YB. Next, the turret 216 of the tool rest 206B as shown in FIG. 26 is turned in the direction as shown by the arrows YJ and YK to position the workpiece center rest apparatus 230. Moreover, in this state the tool rest 206B is moved together with the workpiece center rest apparatus 220B in the directions as shown by the arrows $A_4$ and $B_4$ and in the direction as shown by the arrow $C_2$ in FIG. 34. Near the end portion 230f on the left side in the figure the workpiece 230 is supported by the center rest apparatus 220B.

Thereafter, the chuck 203b of the spindle stock 203 is opened. The spindle stock 203 is moved in the direction as shown by the arrow $A_1$ to position the spindle stock 203 at the position as shown by full lines in FIG. 34. The turret 216 of the tool rest 206A is turned in the directions as shown by the arrows YJ and YK to position a tool 233 for machining the center hole at a predetermined position. Furthermore, the servo-motor (not shown) is driven so that the ball screw 202b, as shown in FIG. 28, is rotated. The tool rest 206A is then moved the predetermined distance together with the tool 233 in the directions as shown by the arrows $A_3$ and $B_3$ in FIG. 34 and in the direction shown by the arrow $C_1$. Then the tool 233 for machining the center hole is positioned at a position facing the end portion 230h of the workpiece 230.

Next, the chuck 205b is rotated together with the workpiece 230 in the direction as shown by the arrow YS. The tool rest 206A is fed the predetermined distance together with the tool 233 for machining the center hole in the direction as shown by the arrow $B_3$, forming the center hole 230j at the end surface 230h of the workpiece 230 with the tool 233. After the center hole 230j is formed on the workpiece 230, the turret 216 of the tool rest 206A is turned in the directions as shown by the arrows YJ and YK to position the tool 233 for cutting the outside cylindrical portion at a predetermined position. In this way, the edge portion 230f of the workpiece 230 is cut in the form of a cylinder by the tool 233.

Since the workpiece 230 is supported near its end portion 230f by the center rest apparatus 220B, the workpiece 230 does not deflect from its rotation center. This enables the center hole 230j to be accurately formed on the workpiece 230, and the outside cylindrical portion of the edge portion 230f can also be accurately machined. After the machining, the tool rest 206A is moved and retracted in the direction as shown by the arrow $D_1$.

After the pre-machining of the workpiece 230 is finished, the chuck 203b is opened. In this state the tool rest 203 is moved a predetermined distance together with the chuck 203b in the direction as shown by the arrow $B_1$. The end portion 230f of the workpiece 230 is inserted in the chuck 203b. The chuck 203b is then closed. The workpiece 230 is thus held between the chucks 203b and 205b as shown in FIG. 35. Then, the workpiece 230 is positioned at a position corresponding to the common movement area ARE3 as shown in FIG. 28. Thereafter the supporting relation between the workpiece center rest apparatus 220B and the workpiece 230 is released. The chucks 203b and 205b are synchronously rotated in the direction as shown by the arrow YS. The tool rest 206A is then moved together with the tool 233 for cutting the outside cylindrical portion in the directions as shown by the arrows $C_1$ and $D_1$ and in the directions as shown by the arrows $A_3$ and $B_3$, in the movement area as shown in FIG. 28. In this way, the main machining is performed on the outside cylindrical portion of the workpiece 230 in FIG. 35 by the tool 233 installed on tool rest 206A. Since the long sized workpiece 230 is positioned at the position corresponding to the common movement area ARE3 by the spindle stocks 203 and 205, as shown in FIG. 28, the main machining can be also performed on the workpiece 230 by the other tool rest 206B. That is, the tool rest 206B is moved together with the tool 233 for cutting the outside cylindrical portion in the directions as shown by the arrows $C_2$ and $D_2$, and in the directions as shown by the arrows $A_4$ and $B_4$, in the movement area ARE2. In this way, the machining can also be performed on the portion of the workpiece 230 between the chucks 203b and 205b by the tool 233 on the tool rest 206B.

Thereafter, the machining of the portion of the workpiece 230 which is held by the chuck 205b, that is, the end portion 230e on the right side in FIG. 36, is performed. For this purpose, the center 240, which is disposed in the spindle stock 205, is moved a predetermined distance in the direction as shown by the arrow YA in the spindle 205a and the chuck 205b, as shown in FIG. 36. Then the center 240 projects out from the chuck 205b in the direction as shown by the arrow YA and is inserted in the center hole 230i, which is disposed at the end portion 230g of the workpiece 230.

Next, the holding relation between the chuck 205b and the workpiece 230 is released. The spindle stock 205 is moved the predetermined distance together with the chuck 205b in the direction as shown by the arrow $B_2$. At the same time, the center 240 is moved, at the same speed as chuck 205, in the direction as shown by the arrow $A_2$. The chuck 205b is then positioned at a position apart from the end portion 230e a predetermined distance on the right side in FIG. 36, the end portion 203e of the workpiece 230 being supported with the center 240. The chuck 203b is then rotated together with the workpiece 230 in the direction as shown by the arrow YS. Furthermore, the machining is performed on the end portion 230e on the right side of the workpiece 230 in FIG. 36 with the tool 233, which is installed in the tool rest 206B, to machine the end portion of the workpiece. The workpiece 230 then does not deflect from its rotation center, because it is supported by the center 240, and the machining on the end portion 230e of the workpiece 230 is performed accurately. After the machining, the center 240 is moved and retracted in the direction as shown by the arrow YB, and is positioned at the position as shown by the broken line in FIG. 37. The end portion 230e, after the machining, is held by the chuck 205b.

At the same time, the center 240, provided in the spindle stock 203, is projected from the position shown by the broken line in FIG. 36 through the spindle 203a and the chuck 203b a predetermined distance away from the chuck 203b in the direction as shown by the arrow YB for the purpose of machining the workpiece portion (that is, the end portion 230f of the workpiece 230) being held by the chuck 203b, and is inserted in the center hole 230j of the workpiece 230 on the left side in the figure. The end portion 230f of the workpiece 230 is supported by the center 240, and the chuck 203b is retracted to the left side in the figure, as shown in FIG. 37. In this state, the machining is performed toward the end portion 230f of the workpiece 230 on the left side in the figure by means of the tool 233 installed in the tool rest 206A. As described before, the workpiece 230 does not deflect from its rotation center because it is held by the center 240. Accordingly, the machining on the end portion 230f of the workpiece 230e is performed accurately.

Since the workpiece 230 being held between the spindle stocks 203 and 205 is positioned at the position corresponding to the common movement area ARE3 as shown in FIG. 28, the machining can also be performed on the end portion 230f of the workpiece 230 by means of the tool rest 206B. That is, the tool rest 206A is moved and retracted in the direction as shown by the arrow $A_3$. Secondly, the tool rest 206B is moved, together with the tool 233 used for machining the end portion 230e of the workpiece 230, in the direction as shown by the arrow $A_4$ in the movement area ARE2. The tool 233 then faces the end portion 230f of the workpiece 230 as shown in FIG. 37. In this state the tool rest 206B is fed the predetermined distance together with the tool 233 in the directions as shown by the arrows $A_4$ and $B_4$. In this way, the machining is performed on the end portion 230f of the workpiece 230, in the form of a cylinder, by means of the tool 233. In case the machining is performed on the end portion 230f of the workpiece 230 by means of the tool rest 206B, the machining of end portions 230e and 230f of the workpiece 230 can be performed by means of only the tool 233 installed on one tool rest (that is, the tool rest 206B in the present embodiment). It is then not necessary to install the tool 233 for the purpose of machining the end portions 230e and 230f of the workpiece 230 on the other tool rest (the tool rest 206A in the present embodiment).

If a boring operation is performed on each end portion 230e and 230f of the workpiece 230, at first a pre-machining (exclusive of the machining providing the center holes 330i and 330j as shown in FIG. 32 and FIG. 34), as shown in FIG. 32 through FIG. 34, is performed on the end portions 230e and 230f of the workpiece. Moreover, the main machining is performed on the outside cylindrical portion of the workpiece 230 as shown in FIG. 35. Then the end portion 230e of the workpiece 230 on the right side in FIG. 38 is supported by the workpiece center rest apparatus 220A, which is installed in the tool rest 206A.

Thereafter, the tool rest 206B is moved, together with a tool 233 such as a drill or a boring tool, for cutting the inside diameter portion in the directions as shown by the arrows $A_4$ and $B_4$ and in the direction as shown by the arrow $C_2$. The tool 233 faces the end surface 230g of the workpiece 230. Next, the chuck 230b is rotated together with the workpiece 230 in the direction as shown by the arrow YS. The tool rest 206B is then fed the predetermined distance together with the tool 233 to cut the inside diameter portion with the tool 233 to cut the inside diameter portion in the direction as shown by the arrow $A_4$. In this way, a predetermined machining of the inside diameter portion is performed on the end portion 230e of the workpiece 230 by means of the tool 233. The outside cylindrical portion of the end portion 230e of the workpiece 230 is also machined by means of the tool 233 installed on the tool rest 206B. Since the workpiece 230 is supported near its end portion 230e by the workpiece center rest apparatus 220A, the workpiece 230 does not deflect from its rotation center, even when the cutting force of the tool 233 operates upon the workpiece 230. The machining of the inside diameter portion the outside cylindrical portion are then accurately performed on the end portion 230e of the workpiece 230.

Figure 38:
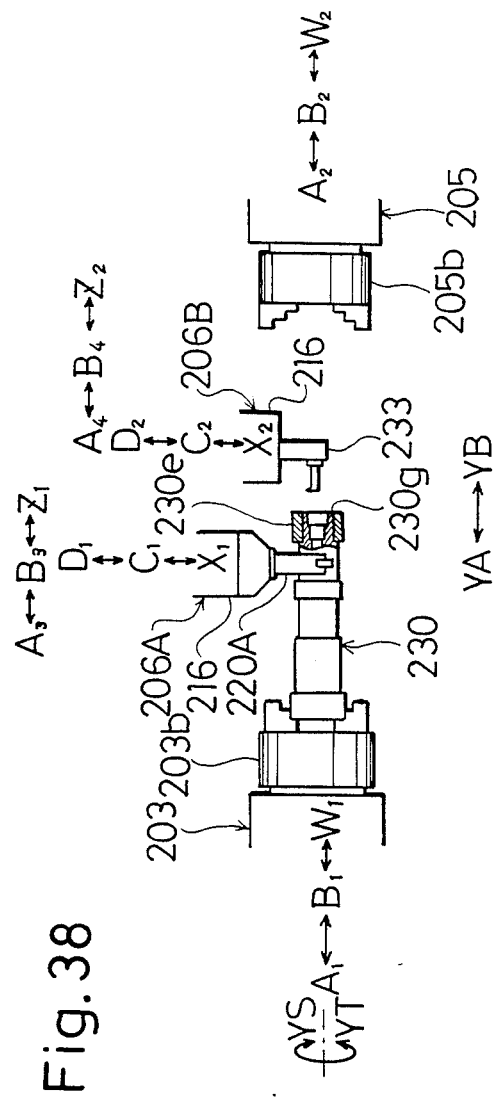
Figure 39:
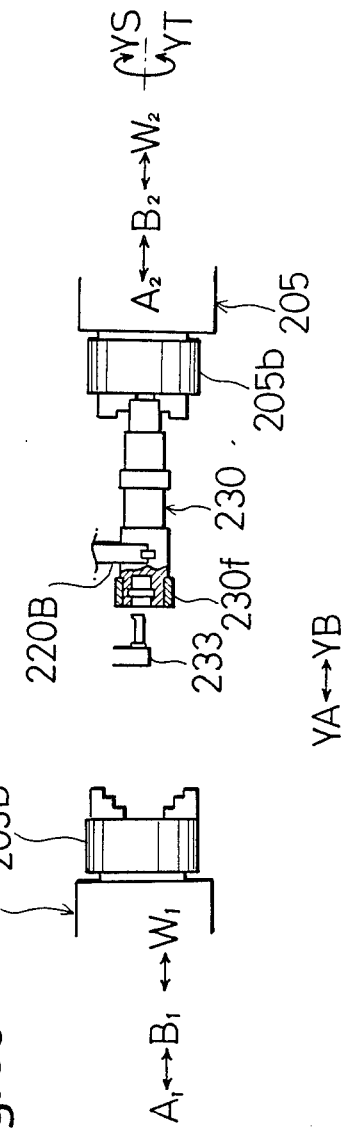

Thereafter, the spindle stock 205 as shown in FIG. 38 is moved a predetermined distance together with the chuck 205b in the direction as shown by the arrow $A_2$ to hold the end portion 230e of the workpiece 230 with the chuck 205b. The supporting 220A and the workpiece 230 is then released. In this state the tool rest 206A is moved and retracted in the direction as shown by the arrow $D_1$. The spindle stocks 203 and 205 are synchronously moved together with the workpiece 230 in the direction as shown by the arrow YB to position the spindle stock 205 at the position as shown in FIG. 39. The end portion 230f of the workpiece 230 on the left side in the figure is then supported by the workpiece center rest apparatus 220B installed on the tool rest 206B. The holding relation between the spindle stock 203 and the workpiece 230 is subsequently released. Then the spindle stock 203 is moved the predetermined distance away from the workpiece 230 in the direction as shown by the arrow $A_1$ to the position as shown by full lines in the figure.

Thereafter, the predetermined machining of the inside diameter portion is performed on the end portion 230f of the workpiece 230 by means of the tool 233 installed on the tool rest 206A for cutting the inside diameter portion. Moreover, a predetermined machining of the outside cylindrical portion is performed on the end portion 230f of the workpiece 230 by means of a tool (not shown) installed on the tool rest 206A for machining the outside cylindrical portion. Since the workpiece 230 is supported at its end portion 230f by the workpiece center rest apparatus 220B, the workpiece 230 is able to be efficiently prevented from deflecting from its rotation center, even if the cutting force of the tool operates upon the workpiece 230.

Figure 40:
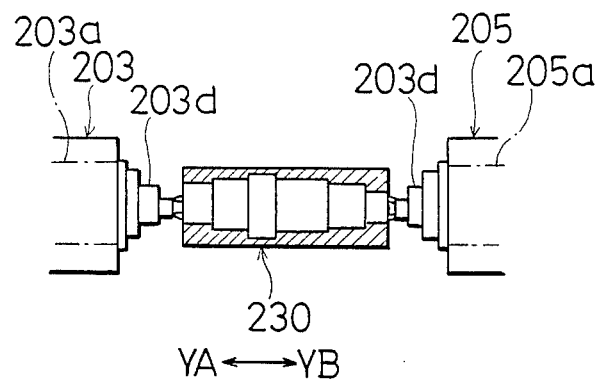
FIG. 40 illustrates a method of machining a shaft shaped workpiece after the workpiece is supported by a face driver.

In the above-described embodiment, when a shaft shaped workpiece is required to be machined it was mentioned that the workpiece 230 is supported by the centers 240. However, in supporting the workpiece this feature is not critical. Any method of support is available if the end portions 230e and 230f of the workpiece 230 can be rotatably supported in the directions as shown by the arrows YS and YT when the machining is performed. For example, face drivers 203d as shown in FIG. 40 can be installed in the spindles 203a and 205a of the spindle stocks 203 and 205 as the workpiece supporting means. The workpiece 230 may be held between the face drivers 203d, and a main machining operation may be performed on the workpiece 230.

Figure 41:
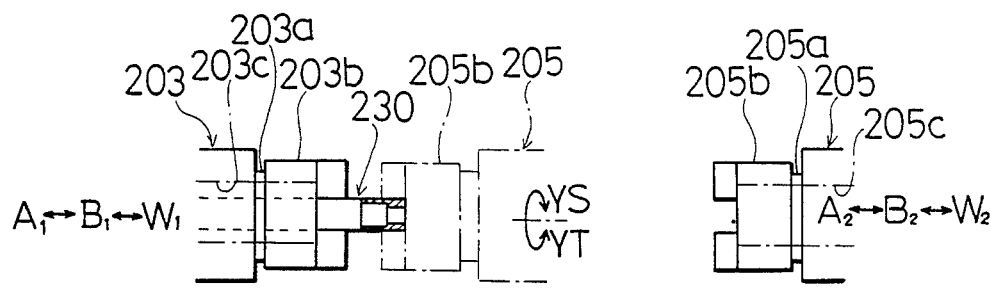
FIGS. 41 through 44 illustrate a process by which a bar shaped workpiece machining is performed with the complex machine tool as shown in FIG. 25.

When a bar shaped workpiece is required to be machined the bar shaped workpiece 230 is set to project an end portion thereof from the chuck 203b a predetermined distance in the direction as shown by the arrow YB through the through hole 203c of the spindle 203a and the chuck 203b, as shown in FIG. 41. Secondly, the chuck 203b is rotated together with the bar shaped workpiece 230 in the direction as shown by the arrow YS. In this state, the machining of the end portion of the bar shaped workpiece 230 is performed. Then the chuck 205b is opened and the spindle 205 is moved a predetermined distance toward the spindle 203 in the direction as shown by the arrow $A_2$. The chuck 205b is then positioned at the position as shown by the imaginary line in FIG. 41. The bar shaped workpiece 230 is then held by both the chucks 203b and 205b by closing the chuck 205b.

Figure 42:
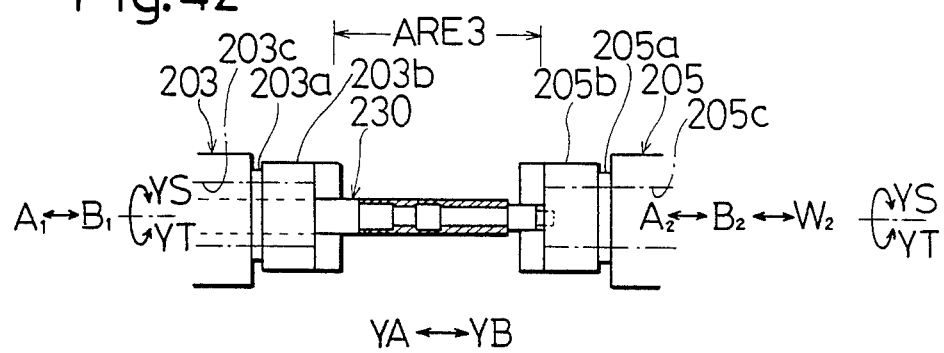

Thereafter, the holding relation between the chuck 203b and the workpiece 230 is released. The spindle stock 204 is moved a predetermined distance together with the chuck 205b in the direction as shown by the arrow $B_2$. Then the bar shaped workpiece 230 is moved in the direction as shown by the arrow YB so as to be pulled by the chuck 205b. The raw portion of the bar shaped workpiece 230 is pulled out from the chuck 203b to a predetermined length, as shown in FIG. 42, to position the workpiece to correspond to the common movement area ARE3 as shown in FIG. 28. Next, the chuck 203b is closed to hold the workpiece 230 with both the chucks 203b and 205b. The chucks 203b and 205b are then synchronously rotated together with the bar shaped workpiece 230 in the direction as shown by the arrow YS. Thereafter, the tool rest 206A or 206B is moved, together with a tool 233, in the direction as shown by the arrows $A_3$ and $B_3$, or in the directions as shown by the arrows $A_4$ and $B_4$, respectively. In this way a predetermined machining is performed on the bar shaped workpiece 230 between the chucks 203b and 205b by means of the tool 233.

Thereafter the holding relation between the chuck 205b and the bar shaped workpiece 230 is released. The spindle stock 205 is then moved a predetermined distance together with the chuck 205b in the direction as shown by the arrow $A_2$ in FIG. 43. The machined portion of the bar shaped workpiece 230 is inserted into the through hole 205c of the spindle stock 205. Next, the chuck 205b is closed, and the machined portion of the bar shaped workpiece 230 is held. At the same time, the holding relation between the chuck 203b and the bar workpiece 230 is released. The spindle stock 205 is then moved a predetermined distance together with the chuck 205b in the direction as shown by the arrow $B_2$, and the bar shaped workpiece 230 is moved in the direction as shown by the arrow YB, the raw portion of the bar workpiece 230 being pulled out from the chuck 203b.

Figure 43:
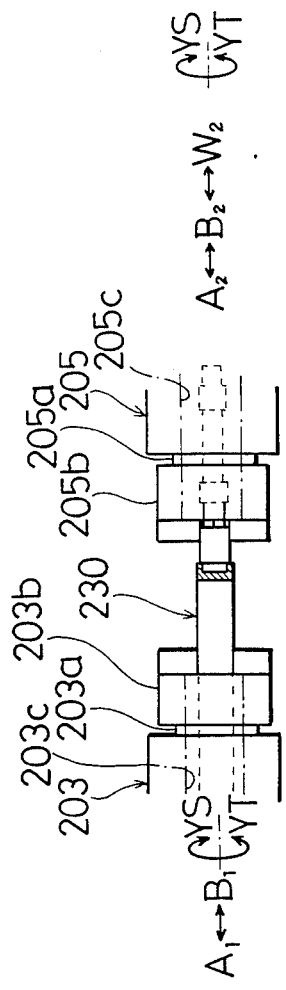
Figure 44:
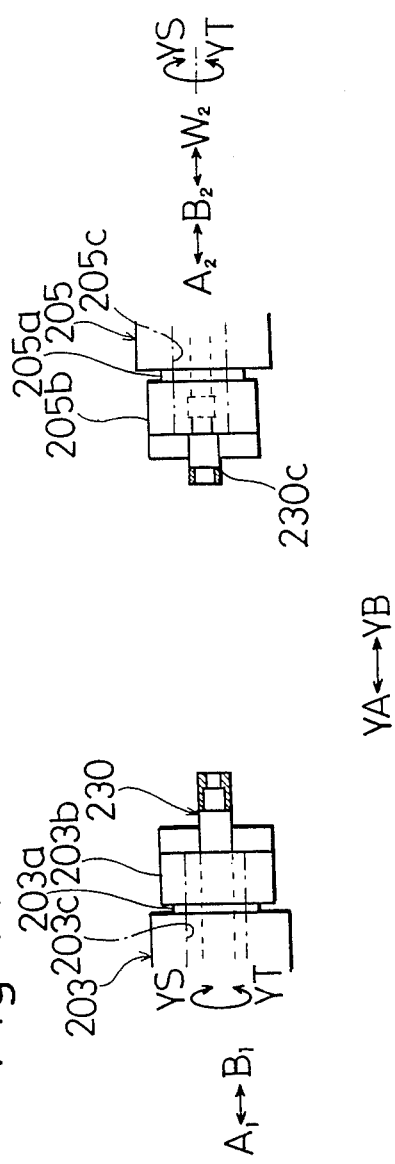

Thereafter, a predetermined portion of the bar shaped workpiece 230 between the chucks 203b and 205b is cut off. The spindle stock 205 is then moved together with the chuck 205b in the direction as shown by the arrow $B_2$ in FIG. 43. Secondly, a machining is performed on the left end portion of a workpiece block 230c (that is, the machined portion of the bar shaped workpiece 230 which has been cut and separated from the bar shaped workpiece 230) being held by the chuck 205b in FIG. 44. The right end portion of the workpiece 230 in the figure, held by the chuck 203b, is also machined. At each spindle 203a and 205a of the spindle stocks 203 and 205, the through holes 203c and 205c are formed to penetrate in the directions as shown by the arrows YA and YB, as shown in FIG. 41. Therefore, successive machining operations can be performed on the outside cylindrical portion of the workpiece 230 such that a long and big workpiece 230 can be held by the chucks 203b and 205b through the through holes 203c and 205c. The workpiece pulling-out movement as shown in FIG. 41 through FIG. 43 is performed by the spindle stocks 203 and 205 to pull out the raw portion of the workpiece 230 in the direction as shown by the arrow YB, and thus the raw portion of the workpiece 230 can be machined at every movement.

If the bar shaped workpiece 230 is to be machined so as to cut out two kinds of workpieces, e.g. 230r and 230s, and the cut out workpieces 230r and 230s are to be screwed to each other, one combination part 230T can be made. The bar shaped workpiece 230 is set projecting its end portion 230d from the chuck 203b a predetermined distance and in the direction as shown by the arrow YB, through the spindle 203a and the chuck 203b, by means of a bar feeder 241 disposed at the left in FIG. 45. Thereafter, the chuck 203b, as shown in FIG. 46, is rotated at a predetermined rotating speed together with the bar shaped workpiece 230 in the direction as shown by the arrow YS. A machining is then performed for cutting the outside cylindrical portion of the end portion 230d of the bar shaped workpiece 230 by means of the tool 233 installed in the tool rest 206A. Furthermore, a male screw is formed on the end portion 230d by means of a tool 233 for cutting threads.

Figure 47:
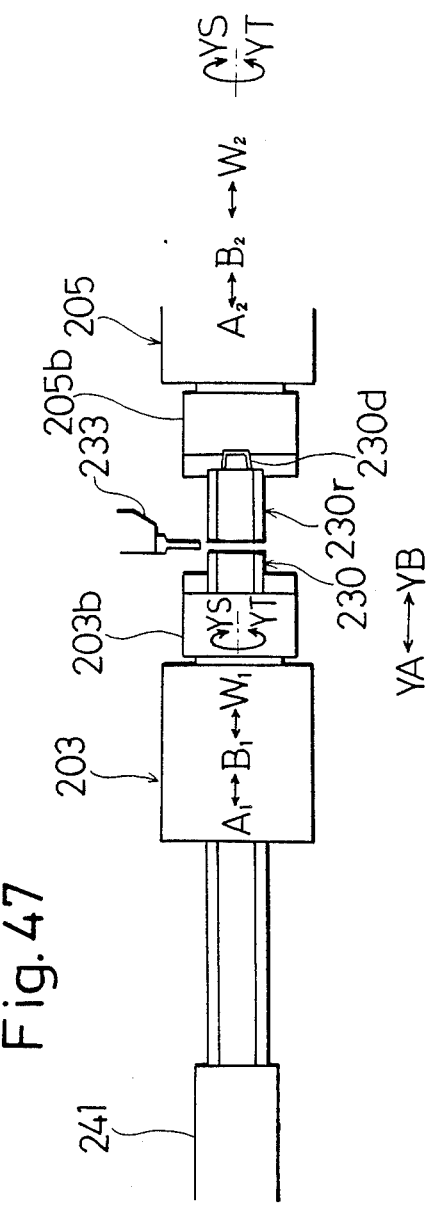

The spindle stock 203 is then moved in the direction as shown by the arrow $B_1$, the bar shaped workpiece 230 being held by the chuck 203b. The spindle stock 205 is moved a predetermined distance, together with the chuck 205b, toward the spindle stock 203 in the direction as shown by the arrow $A_2$. Then the end portion 230d of the bar shaped workpiece 230 is inserted inside the chuck 205b, as shown in FIG. 47. Next, the chuck 205b is closed to hole the end portion 230d of the bar shaped workpiece 230. The chucks 203b and 205b are then synchronously rotated together with the bar shaped workpiece 230 in the direction as shown by the arrow YS. Under this condition, the predetermined portion of the bar workpiece 230 being held between the chucks 203b and 205b is cut by means of the tool 233 installed in the tool rest 206A or 206B.

Figure 48:
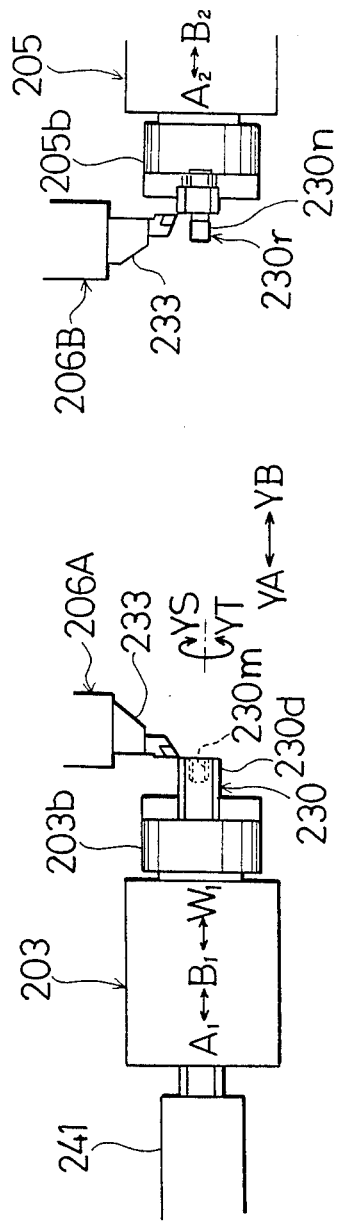

Thereafter, the spindle stock 203 is moved a predetermined distance together with the bar shaped workpiece 230 in the direction as shown by the arrow $A_1$ in FIG. 47. The spindle stock 205 is then moved together with a workpiece 230r (the workpiece 230r denotes the part of the bar shaped workpiece 230 cut and separated from the bar shaped workpiece 230 held by the spindle stock 203) in the direction as shown by the arrow $B_2$. In this way, the spindle stocks 203 and 205 are positioned at the positions as shown in FIG. 48, respectively. Thereafter, a female screw 230m is formed at the end portion 230d of the bar shaped workpiece 230 being held by the spindle stock 203 by means of a tool 233 installed in the tool rest 206A for cutting an interior cylindrical portion, such as a drill or boring tool, and a tool 233 for forming a female screw. On the other hand, a male screw 230n is formed by means of a tool 233 installed in the tool rest 206B, forming a male screw on the raw portion of the workpiece 230r delivered to the spindle stock 205.

In this way the male screw 230n is formed on the workpiece 230r and the female screw 230m is formed on the end portion 230d of the bar shaped workpiece 230. The chuck 205b, as shown in FIG. 48, is then rotated together with the workpiece 230r with a predetermined rotational speed (usually a rotation of low speed) in the direction as shown by the arrow YS or in the direction as shown by the arrow YT. Thereafter, the spindle stock 205 is moved together with the workpiece 230r in the direction as shown by the arrow $A_2$. At the same time, the spindle stock 203 is moved together with the bar shaped workpiece 230 toward the spindle stock 205 in the direction as shown by the arrow $B_1$. Then the male screw 230n of the workpiece 230r is also moved in the direction as shown by the arrow YA while rotating in the direction as shown by the arrow YS or YT, to fit in the female screw 230m of the bar shaped workpiece 230. The workpiece 230r is thus connected with the bar shaped workpiece 230. Next, the chucks 203b and 205b are synchronously rotated, together with the connected workpieces 230r and 230, in the direction as shown by the arrow YS. A predetermined portion of the bar shaped workpiece 230 being held between the chucks 203b and 205b is then cut by means of a cutting-off tool 233 installed on the tool rest 206B. Since the chucks 203b and 205b synchronously rotate in the same direction, the bar shaped workpiece 230 and the workpiece 230r held by the chucks 203b and 205b are also synchronously rotated in the same direction. Thereafter the assembly of the bar shaped workpiece 230 and the workpiece 230r do not loosen during the cutting-off machining.

The assembly of the workpiece 230r and a workpiece 230s (the workpiece 230s denotes the portion of the bar shaped workpiece 230 which is fitted in the workpiece 230r and cut and separated from the the bar shaped workpiece 230 held by the spindle stock 203) is performed in such a manner that the male screw 230n is fitted in the female screw 230m, and such that once a connecting part 230T, being composed of the workpieces 230r and 230s, is made, the spindle stock 205 is moved a predetermined distance together with the connecting part 230T in the direction as shown by the arrow $B_2$. The spindle stock 203 is moved a predetermined distance together with the bar shaped workpiece 230 in the direction as shown by the arrow $A_1$. Thus the spindle stocks 203 and 205 are positioned at the positions as shown in FIG. 50. The bar feeder 241, as shown at the left in the figure, is then driven, and the bar shaped workpiece 230 is moved in the direction as shown by the arrow YB. The end portion 230d of the bar shaped workpiece 230 is projected from the chuck 203b a predetermined length in the direction as shown by the arrow YB. A predetermined machining is then performed, by means of the tool 233 installed on the tool rest 206A, on the end portion 230d of the bar shaped workpiece 230. A machining of an end face is performed by means of the tool 233 installed on the tool rest 206B on the workpiece 230s of the connecting part 230T being held by the spindle stock 205, as shown in FIG. 50, to finish the machining of the connecting part 230T.

In this way, at the time that the machining on the connecting part 230T has finished, a parts catcher 242, installed on the tool rest 206B, is positioned at a position separated from the chuck 205b with a predetermined distance in the direction as shown by the arrow YA, as shown in FIG. 51. The chuck 205b is then opened, and the connecting part 230T is removed from the chuck 205b in the direction as shown by arrow YA by means of a well known workpiece removing device 245 disposed in the spindle 205a, and the connecting part 230T is caught by the parts catcher 242 and is carried out of the machine.

In the above-described embodiment, the case is mentioned where different kinds of workpieces 230r and 230s are cut off from the bar shaped workpiece 230 and machined, and one connecting part 230T is made by assembling the workpieces 230r and 230s with the spindle stocks 203 and 205. However, component parts of a connecting part 230T are not restricted to the workpieces 230r and 230s cut-off from the same bar shaped workpiece 230. Many workpieces are imaginable. For example, one connecting part 230T can also be made by different kinds of workpieces 230A and 230B, of a single substance. As shown in FIG. 52, the workpieces 230A and 230B are machined, and the assembly thereof is performed. The first routine of the machining is performed on the workpiece 230A, which is supplied by a workpiece handling unit 243, described hereinafter, by means of the tool 233 at the spindle stock 203, to form a press-in portion 230v in the shape of a bar. The second routine of machining is performed on the workpiece 230B on the spindle stock 205 by means of the tool 233 after the first routine of the machining has been performed on the spindle stock 203. Thereafter, the spindle stock 203 is moved together with the chuck 203b in the direction as shown by the arrow $B_1$. At the same time, the spindle stock 205 is moved together with the workpiece 230B in the direction as shown by the arrow $A_2$. Then the workpieces 230A and 230B approach each other, as shown in FIG. 53. The press-in portion 230v of the workpiece 230A is pressured into a hole 230w of the workpiece 230B. The assembly of the workpieces 230A and 230B is thus performed, and the connecting part 230T is made.

When the assembly of the two kinds of workpieces 230A and 230B is performed to make the connecting part 230T, the holding relation between the workpieces 230A and the chuck 203B is released. The spindle stock 205 is then moved a predetermined distance together with the assembled workpieces 230A and 230B in the direction as shown by the arrow $B_2$, to a position as shown in FIG. 54. The spindle stock 203 is also moved a predetermined distance in the direction as shown by the arrow $A_1$ to position it as shown in FIG. 54.

Figure 55:
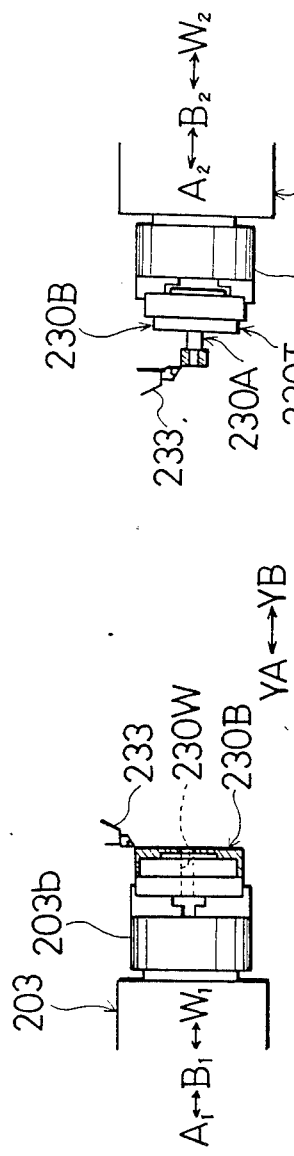
Figure 56:
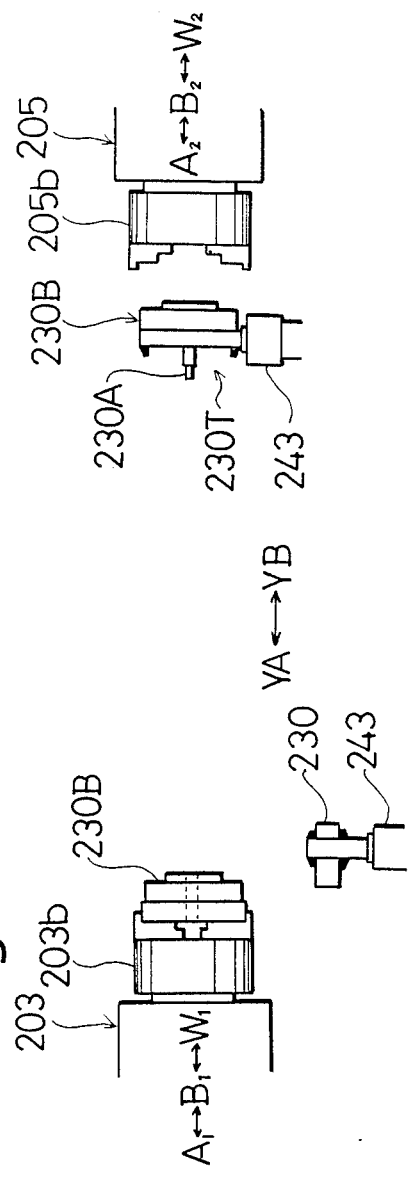

Thereafter, a second workpiece 230B is supplied to the spindle stock 203, as shown in FIG. 54, by means of the workpiece handling unit 243, and the first routine of the machining is performed on the supplied workpiece 230B, as shown in FIG. 55. Thus the hole 230w and the like are formed. A second routine of the machining is performed on the workpiece 230A of the connecting part 230T on the spindle stock 204. Next, the connecting part 230T, which the machining has finished, is carried off the machine from the spindle stock 205 by means of the workpiece handling unit 243 as shown at the right side in FIG. 56.

Thereafter, the spindle stocks 203 and 205 are moved a predetermined distance in the direction as shown by the arrow $B_1$ and in the direction as shown by the arrow $A_2$, as shown in FIG. 57, respectively. The workpiece 230B, after the first routine wherein it is held by the spindle stock 203, is delivered to the spindle stock 205. This delivery of the workpiece 230B is usually performed with the chucks 203$b$ and 205$b$ stopped. However, the spindle stocks 203 and 205 approach each other in a state therein the spindles 203$a$ and 205$a$ of both spindle stocks 203 and 205, that is, the chucks 203$b$ and 205$b$, are rotated in order to shorten the machining time. Thereafter, the delivery movement can be naturally performed between both spindle stocks 203 and 205 while the workpiece 230B is rotated. In this case, the workpiece 230B can be delivered between the spindles 203$a$ and 205$a$ without generating a phase shift, such that the phases of rotation of both spindles 203$a$ and 205$a$ in the C-axis direction match each other, even if a milling machining accompanied by C-axis control is performed on the workpiece 230B. When the workpiece 230B is delivered to the spindle stock 205, the second routine of the machining is performed on the workpiece 230B, as shown in FIG. 58. A premachined workpiece 230A is supplied to the chuck 203$b$ of the spindle stock 203 by means of the workpiece handling unit 243, to start the first routine of the machining on the workpiece 230A. Then the press-in portion 230$v$ is formed.

In the above-described embodiment, it was mentioned that the connecting part 230T was made in such a manner that different kinds of workpieces were fitted and pressed-in to each other to assemble them. In the method of assembly, this feature is not critical. Any method if available, if a pair of workpieces can be surely connected such that the spindle stocks 203 and 205 approach each other while holding the respective workpieces.

Figure 60:
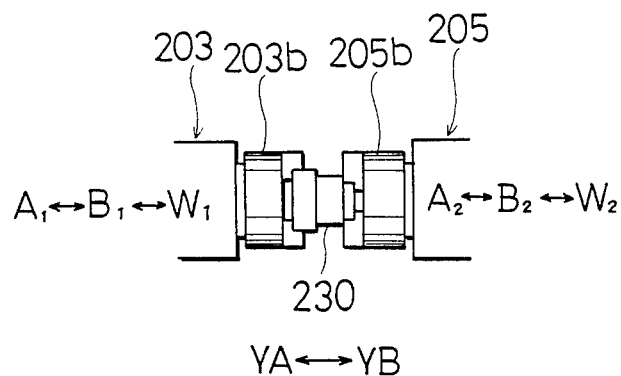

In a further case where workpieces machining is performed making use of the complex machining machine tool 201, the workpiece 230 to be machined is supplied with the chuck 203$b$ of the spindle stock 203 as shown in FIG. 59. The first routine of the machining is performed by means of the tool 233 on the workpiece 230. Secondly, the spindle stock 203 is moved together with the workpiece 230 toward the spindle stock 205 in the direction as shown by the arrow $B_1$, as shown in FIG. 60. At the same time, the spindle stock 205 is moved in the direction as shown by the arrow $A_2$ while opening the chuck 205$b$. The workpiece 230 is held by both the chucks 203$b$ and 205$b$ after the chuck 205$b$ is closed. Thereafter, the holding relation between the chuck 203$b$ and the workpiece 230 is released. The spindle stock 203 is then moved in the direction as shown by the arrow $A_1$, and the spindle stock 205 is moved together with the workpiece 230 in the direction as shown by the arrow $B_2$. Thus the spindle stocks 203 and 205 are positioned as shown in FIG. 61.

Figure 61:
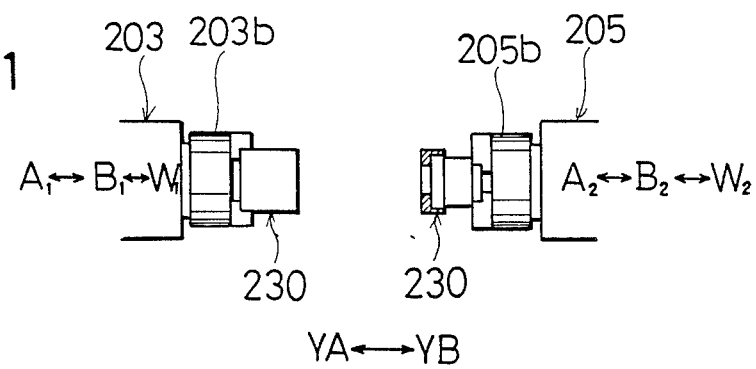
Figure 62:
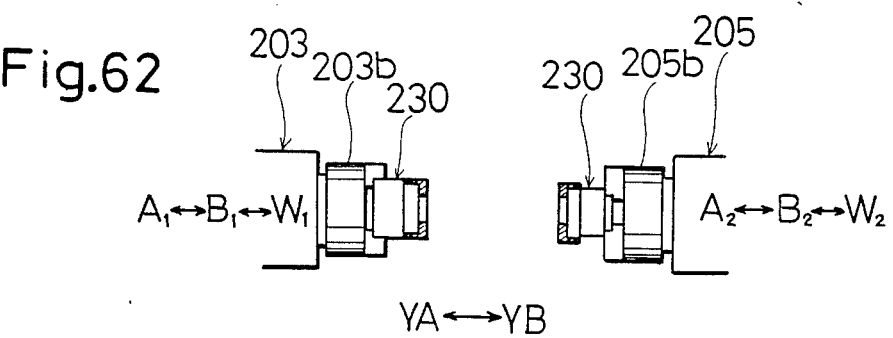

Thereafter, the second routine of the machining is performed on the workpiece 230, which was delivered to the spindle stock 205, as shown in FIG. 61. At the spindle stock 203, the second routine of the machining, which is the same routine as the machining at the spindle stock 204, is performed on a new workpiece 230, as shown in FIG. 62, after the raw workpiece 230 has been supplied to the spindle stock 203. Thus the same machining (that is, the second routine of the machining) is performed at nearly the same time at the spindle stocks 203 and 205. Therefore the machining finishing time is almost the same for both spindle stocks. After the machined workpiece 230 is removed from the chuck 205$b$, the workpiece 230 held by the spindle stock 204, after the second routine of the machining, can be delivered to the spindle stock 205 immediately.

Figure 63:
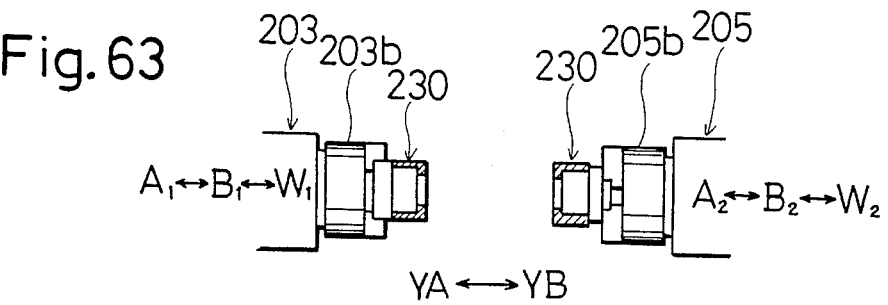

Thereafter, the first routine of the machining is performed on the new workpiece 230 delivered to the spindle stock 205, as shown in FIG. 63. A further raw workpiece 230 is then also supplied to the spindle stock 203 for carrying out the first routine of the machining at the same time as the machining at the spindle stock 205. At the time that the first routine of the machining is performed on the workpieces 230 held by the spindle stocks 203 and 205, respectively the workpiece 230 at the spindle stock 205, after the first and second routines of the machining, is removed from the machine. The workpiece 230 at the spindle stock 203 is then delivered to the spindle stock 205.

Since the machining time of the spindle stocks 203 and 205 is equal in this way, it is not necessary for one spindle stock, having finished a machining first, to wait for the end of the machining of the other spindle stock. The overall machining can thus be performed efficiently.

Figure 64:
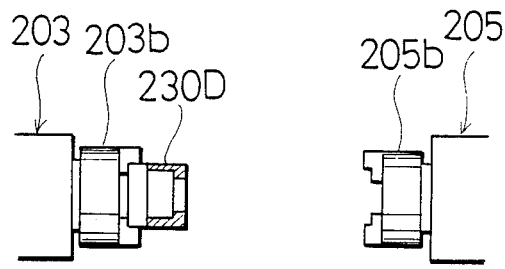
FIGS. 64 through 66 illustrate an example of a process by which chucked workpiece machining is successively performed on two types of workpieces by the complex machine tool as shown in FIG. 25.

In the above-described embodiment, it was mentioned that the successive first and second machining routines is performed on one kind of the workpiece 230. As will be described later, the successive machining of the first and second routines can also be performed on two kinds of workpieces 230D and 230E. That is, as shown in FIG. 64, the workpiece 230D is supplied to the spindle stock 203 to have a first routine of the machining preformed thereon. Thereafter, the workpiece 230D, after the first routine of the machining, is delivered to the spindle stock 205 from the spindle stock 203 as shown in FIG. 65, to have a second routine of the machining performed thereon.

Figure 65:
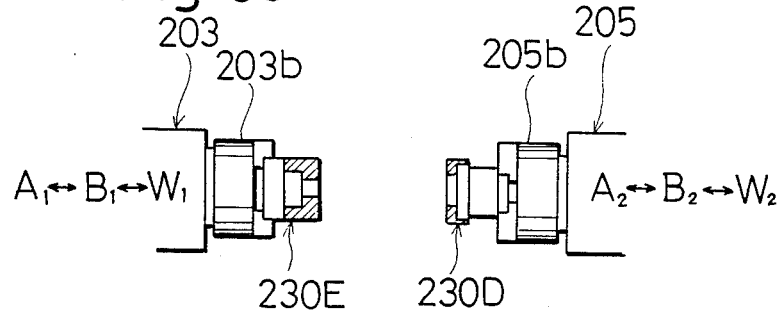
Figure 66:
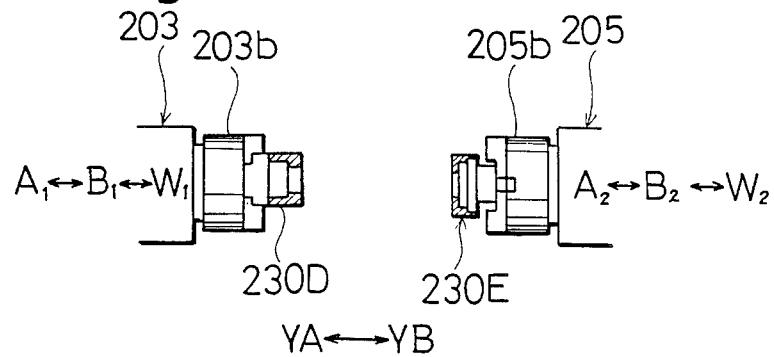

On the other hand, the workpiece 230E, being different in kind from the workpiece 230D, is supplied to the spindle stock 203 as shown in FIG. 65 to have the first routine of the machining performed thereon. The time it takes for the second routine of the machining of the workpiece 230D is set to be almost equal to that for the first routine of the machining of the workpiece 230E. Therefore, the machining end time of both these workpieces 230D and 230E very nearly corresponds. The workpiece 230E, after its first routine of the machining, can be immediately delivered to the spindle stock 205 from the spindle stock 203 after the machined workpiece 230D is removed from the spindle stock 205, as shown in FIG. 66. Thereafter, the second routine of the machining is performed on the workpiece 230E. A new workpiece 230D is supplied to the spindle stock 203 for the first routine of the machining on the workpiece 230D.

Figure 67:
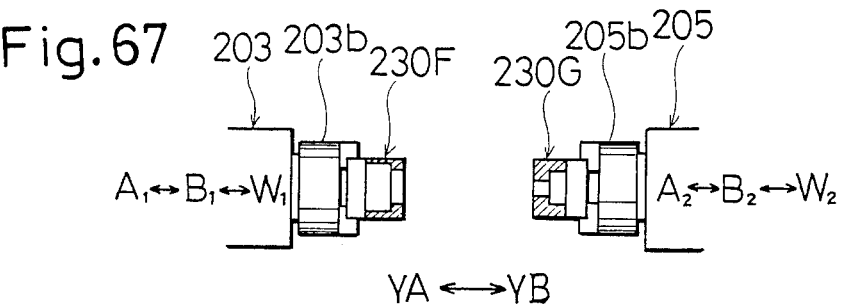
FIGS. 67 and 68 illustrate another example of a process by which chucked workpiece machining is successively performed on two types of workpieces by the complex machine tool as shown in FIG. 25.

In the above-described embodiment, it was mentioned that two kinds of workpieces 230D and 230E can be delivered between the spindle stocks 203 and 205, and that the first and second routines of the machining are performed on the workpieces 230D and 230E. However, the first and second routines of the machining can be performed on two kinds of workpieces 230F and 230G without delivering the workpieces between the spindle stocks 203 and 205, as will be described. That is, a first routine of the machining is performed on the workpiece 230F, which is supplied to the spindle stock 203 as shown in FIG. 67, and the first routine of the machining is performed on the workpiece 230G, which is supplied to the spindle stock 205.

Figure 68:
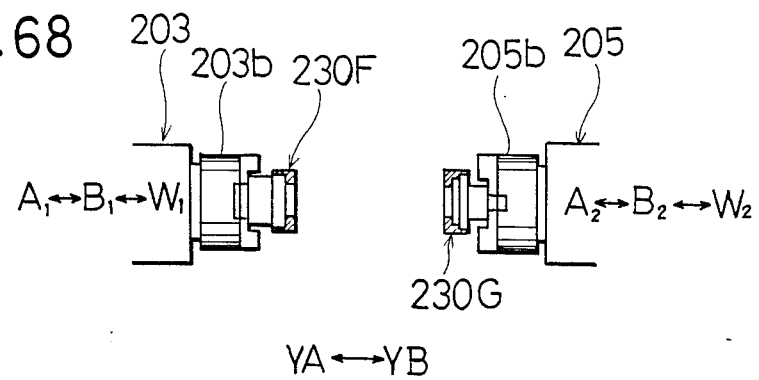
Figure 69:
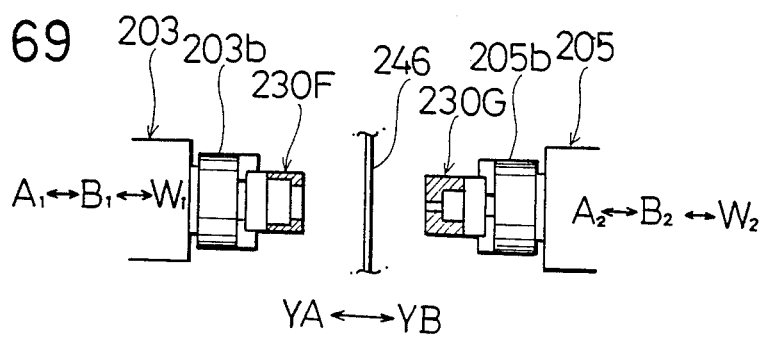
FIGS. 69 and 70 illustrate yet another example of a process by which chucked workpiece machining is successively performed on two types of workpieces by the complex machine tool as shown in FIG. 25.
Figure 70:
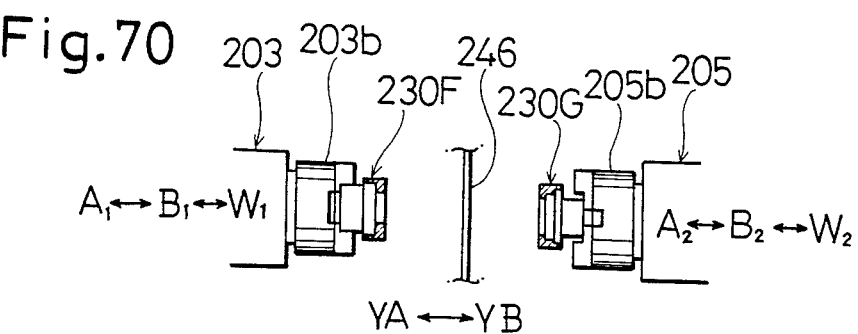

Next, after the holding relation between the spindle stocks 203 and 205 and their respective workpieces 230F and 230G is released, each workpiece 230F and 230G is turned around. Thus the workpieces are reinstalled in their respective spindle stocks 203 and 205, as shown in FIG. 68. Thereafter the second routine of the machining is performed on the workpieces 230F and 230G. At this time, a partition 246 is placed between the spindle stocks 203 and 205, as shown in FIG. 69 and FIG. 70. When the machining is performed toward the workpiece 230F of the spindle stock 203 and the workpiece 230G of the spindle stock 205, the chips of the workpieces 230F and 230G do not mix with each other, and the chip processing, etc., can be smoothly performed. This method is especially effective where workpieces 230F and 230G are of different materials.

In the above-described embodiment, it was mentioned that the workpiece holding movement is performed by the tool rests 206A and 206B, which have installed a rotation tool on one installation portion 217a that can rotate and drive, as shown in FIG. 30. However, the tool rests, having the workpiece center rest apparatus 220A and 220B, are not critical structures. Any constitution is available if the tool rest has a structure for rotating and driving the tool, such as the tool rotation driving structure 232 as shown in FIG. 29. For example, it would be natural to have the workpiece center rest apparatus 220A and 220B installed in the optional position, wherein which the rotation tool can be performed, regarding the tool rest to be free to rotate and drive the plural rotation tools installed, and the tool is selectively connected with the spindle driving structure for tool rotation, such as the motor 211 through a clutch plate, and the like.

Another embodiment of a complex machine tool will be described in FIG. 71 through FIG. 90.

Figure 71:
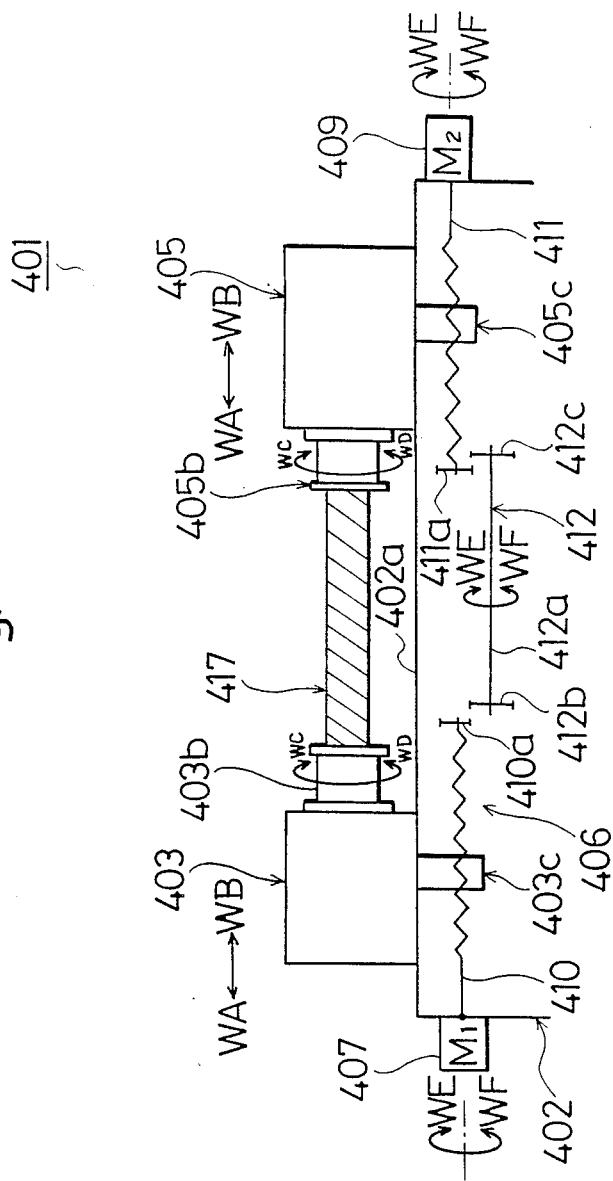
FIG. 71 is an elevated view showing an example of the driving structure of a spindle stock in a complex machine tool.

A complex machining machine tool 401 has a main body 402 on which a guide face 402a is disposed on the upper portion thereof, as shown in FIG. 71. On the guide surface 402a, two spindle stocks 403 and 405 face each other and are independently movable in a shaft axis direction of each spindle (not shown) of the spindle stocks 403 and 405, that is, in the directions as shown by arrows WA and WB (Z axis direction). Two chucks 403b and 405b, which are installed in the spindles (not shown), are rotatably disposed in the direction as shown by arrows WC and WD at the spindle stocks 403 and 405. A long sized workpiece 417 is rotatably installed in the directions as shown by the arrows WC and WD between the chucks 403b and 405b such that both the right and left end portions of the workpiece 417 are held by the chucks 403b and 405b. Furthermore, two nuts 403c and 405c project inside the main body 402 through the guide surface 402a at the lower side portion of the spindle stocks 403 and 405 in FIG. 71, and are movably disposed, together with the spindle stocks 403 and 405, in the directions as shown by the arrows WA and WB (Z axis direction) in the main body 402. Two female screws (not shown) are disposed at the nuts 403c and 405c in the Z axis direction.

A spindle stock driving unit 406 is provided at the main body 402, as shown in FIG. 71. The spindle stock driving unit 406 is composed of driving motors 407 and 409, driving screws 410 and 411, a clutch 412, and the like. That is, the driving motors 407 and 409 are disposed at both the right and left ends of the machine body 402 in FIG. 71. The driving screws 410 and 411, having the same pitch, are rotatably connected to be rotatable in the directions as shown by arrows WE and WF with the driving motors 407 and 409, respectively. The nuts 403c and 405, as described before, are fitted in the driving screws 410 and 411. The driving screws 410 and 411 are then rotated in the directions as shown by the arrows WE and WF by engaging the driving motors 407 and 409 so that the spindle stocks 403 and 405 are moved and driven in the direction as shown by the arrow WA or in the direction as shown by the arrow WB (Z axis direction) through each nut 403c and 405c.

Two gears 410a and 411a are fixed to the ends of the driving screws 410 and 411, respectively. The clutch 412 is provided between the driving screws 410 and 411 to be able to connect with the driving screws 410 and 411. The clutch 412 has a shaft 412a, which is provided to be rotatable in the directions as shown by the arrows WE and WF and movable in the directions as shown by the arrows WA and WB (Z axis direction). Two gears, 412b and 412c, are fixed to the respective right and left ends of the shaft 412a in FIG. 71.

Figure 72:
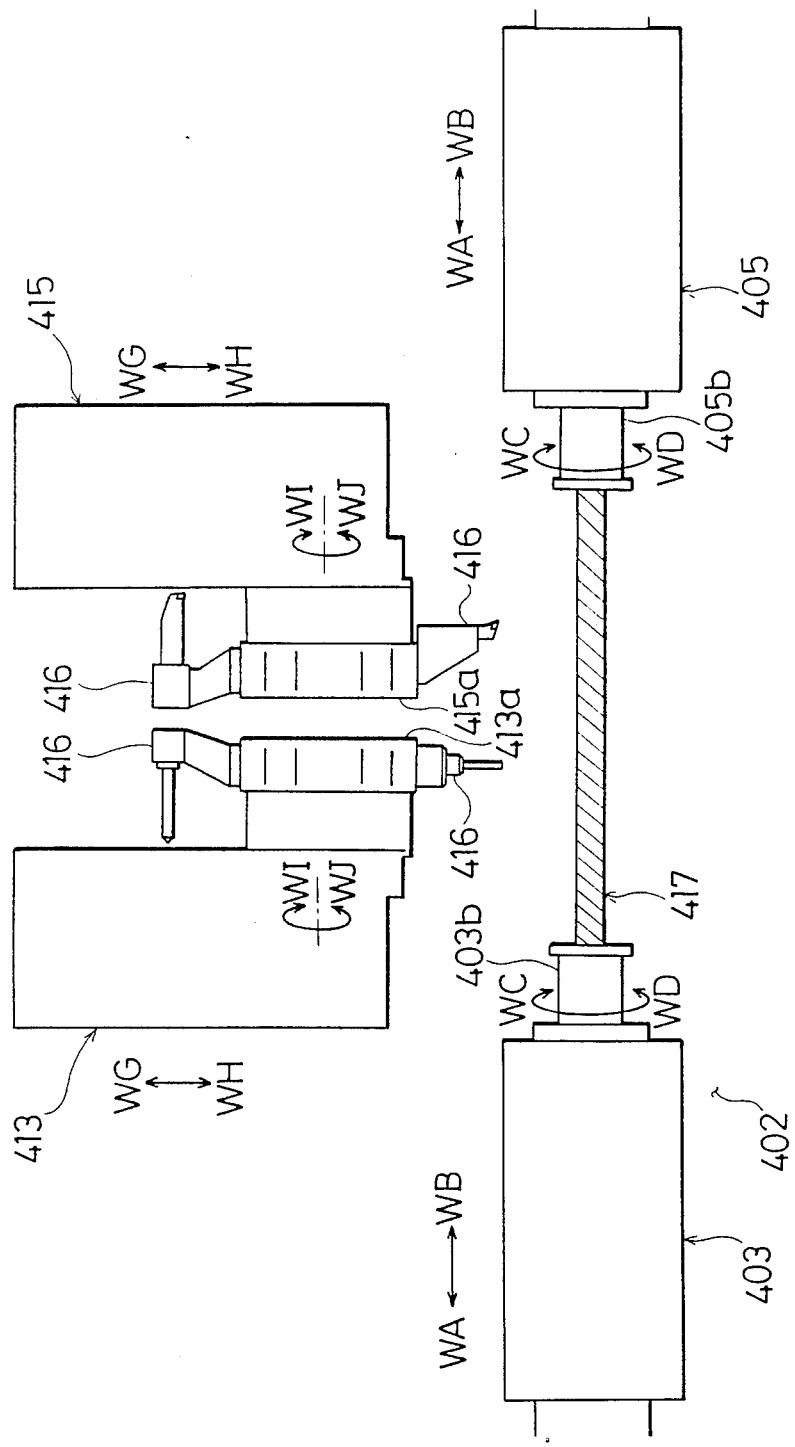
FIG. 72 is a top view of a complex machine tool.

Furthermore, two turret type tool rests 413 and 415 are provided, being free to move and drive only in the directions as shown by arrows WG and WH (that is, the X axis direction) on the machine body 402, as shown in FIG. 72. The directions shown by the arrows WG and WH are perpendicular to the directions shown by the arrows WA and WB. Two turret heads 413a and 415a are supported to be free to rotate and drive on the tool rests 413 and 415 in the directions shown by arrows WI and WJ. A plurality of tools 416, comprising a turning tool such as a bit, a rotation tool such as a drill, and a milling cutter, are installed on the turret heads 413a and 415a, the tools being attachable and detachable.

With the above-described structure of the complex machining machine tool 401, if a long sized workpiece 417 is required to be machined, as shown in FIG. 71, both the right and left ends of the workpiece 417 are held by the chucks 405b and 403b, respectively. When the workpiece 417 is supported between the chucks 403b and 405b, the turret heads 413a and 415a of the tool rests 413 and 415 are properly rotated in the direction as shown by the arrow WI or in the direction as shown by the arrow WJ to position a tool 416 to be used for the machining at a position facing the workpiece 417. Next, the chucks 403b and 405b are synchronously rotated and driven together with the workpiece 417 in the direction as shown by the arrow WC or in the direction as shown by the arrow WD. Furthermore, the clutch 412, as shown in FIG. 71, is moved a predetermined distance to the left in the figure from the position as shown by full lines in the figure. Then the gears 412b and 412c of the clutch 412 mesh with the gears 410a and 411a fixed to each end portion of each of the driving screws 410 and 411. The driving screws 410 and 411 are then connected to each other through the gears 410a and 411a and the clutch 412.

Thereafter, the other driving motor 407 is driven, whereby either of the two driving motors 407 and 409 as shown in FIG. 71, for example the driving motor 409, stops driving. The driving screw 410 is thus rotated together with the gear 410a in the direction as shown by the arrow WE or in the direction as shown by the arrow WF by means of the driving motor 407. When the gear 410a is rotated in the direction as shown by the arrow WE or in the direction as shown by the arrow WF, the clutch 412 is also rotated in the direction as shown by the arrow WF or in the direction as shown by the arrow WE due to the gear 412b being meshed with the gear 410a. Then the driving screw 411 is rotated due to the gear 411a being meshed with the gear 412c of the clutch 412 in the direction as shown by the arrow WE or in the direction as shown by the arrow WE in FIG. 71. Since the number of teeth of the gear 410a and the gear 411a and the number of teeth of the gear 412b and the gear 412c are all the same, the driving screws 410 and 411 are rotated in the same direction at the same angular velocity. For this reason, the spindle stocks 403 and 405 are properly synchronously moved by the nuts 403c and 405c fitted in each of the driving screws 410 and 411 in the direction as shown by the arrow WA or in the direction as shown by the arrow WB (Z axis direction).

A predetermined machining is thus performed on the workpiece 417 such that the spindle stocks 403 and 405, as shown in FIG. 71, are properly synchronously moved in the directions as shown by the arrows WA and WB (Z axis direction), and the tool rests 413 and 415 as shown in FIG. 72, are properly moved and driven together with the tool 416 in the directions as shown by the arrows WG and WH (X axis direction).

Figure 73:
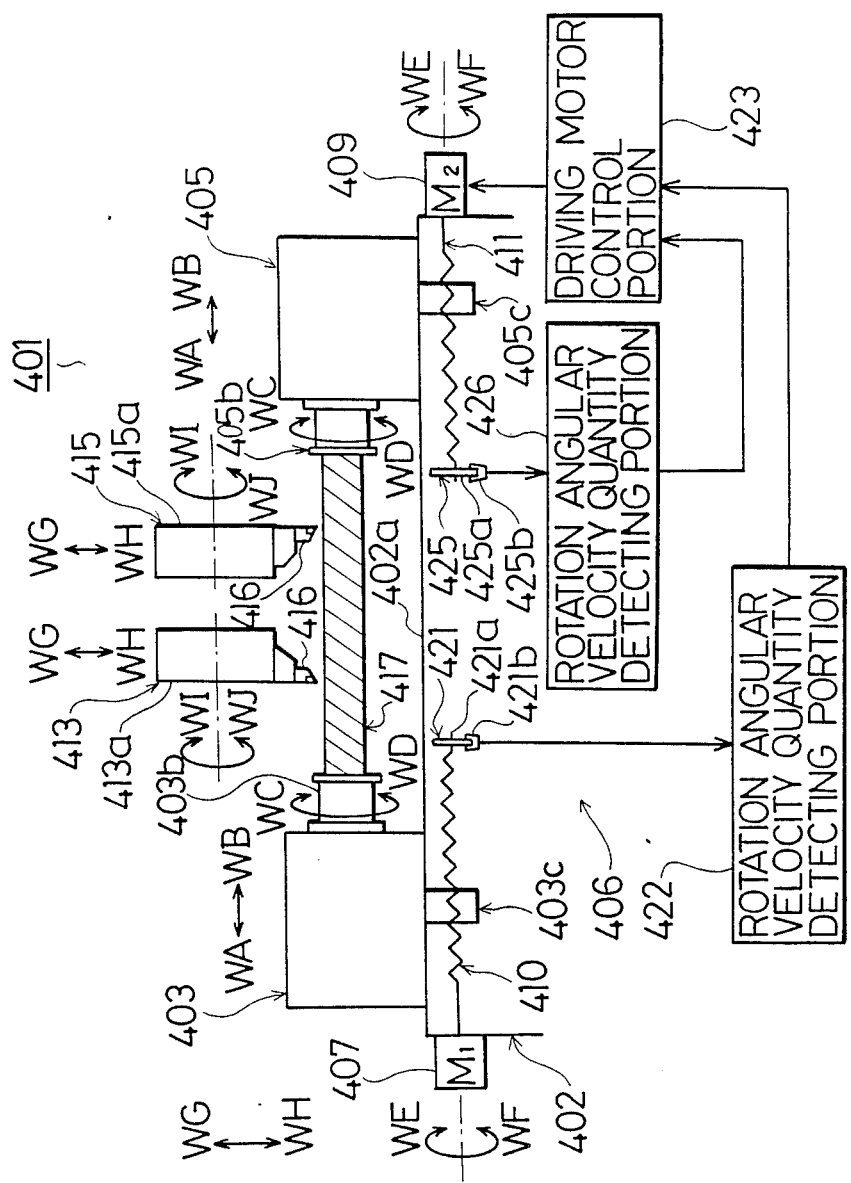
FIG. 73 is a top view showing another example of the driving structure of a spindle stock in a complex machine tool.

In the above-described embodiment, it was mentioned that two mutually facing spindle stocks 403 and 405 are synchronously moved in the directions as shown by the arrows WA and WB (that is, the Z axis direction) by means of the spindle stock driving unit 406 as shown in FIG. 71. But in the spindle stock driving unit 406, any structure is suitable if the spindle stocks 403 and 405 can be synchronously moved in the Z axis direction. Another situation when the spindle stocks 403 and 405 are synchronously moved and driven in the Z axis direction by means of the spindle stock driving unit 406 is shown in FIG. 73 and will be described hereinafter. The portions similar to the portions described in FIG. 71 and FIG. 72 are marked with the same reference numerals, and there explanation is not repeated.

Rotary encoders 421 and 425 re installed on the end portions of the driving screws 410 and 411 of the spindle stock driving unit 406 of the complex machining machine tool 401 shown in FIG. 73. The rotary encoders 421 and 425 have discs 421a and 425a provided a number of magnetic and optical marks (not shown). Sensors 421b and 425b for reading the marks are disposed at a lower position of the discs 421a and 425a in FIG. 73, respectively. A rotation angular velocity detecting portion 422 connects with the rotary encoder 421. A driving motor control portion 423 connects with the rotation angular velocity detecting portion 422. The driving motor control portion 423 connects with the driving motor 409. A rotation angular velocity detecting portion 426 similarly connects with the rotary encoder 425 installed on the end portion of the driving screw 411. The rotation angular velocity detecting portion 426 also connects with the driving motor control portion 423.

If a long sized workpiece 417 is required to be machined with the complex machining machine tool 401 is shown in FIG. 73, both the right and left end portions of the workpiece 417 in the figure are held by the chucks 403b and 405b installed in the spindle stocks 403 and 405. The turret heads 413a and 415a of the tool rests 413 and 415, as shown in FIG. 72, are properly rotated in the direction as shown by the arrow WI or in the direction as shown by the arrow WJ. Then the tools 416 to be used for the machining are positioned facing the workpiece 417. In this state, the chucks 403b and 405b are simultaneously rotated together with the workpiece 417 in the direction as shown by the arrow WC or in the direction as shown by the arrow WD. The driving motor 407 as shown in FIG. 73 is driven to rotate the driving screw 410 in the direction as shown by the arrow WE or in the direction as shown by the arrow WF. Then the spindle stock 403 is moved together with the chuck 403b by the nut 403c in the direction as shown by the arrow WA or WB (that is, Z axis direction). At the same time, the disc 421a of the rotary encoder 421 is also rotated together with the driving screw 410 in the direction as shown by the arrow WE or WF. The sensor 421b then reads the marks on the disc 421a and outputs to the rotation angular velocity detecting portion 422.

The rotation angular velocity detecting portion 422, on the basis of the reading, detects the rotation angular velocity of the driving screw 410 in the direction as shown by the arrow WE or in the direction as shown by the arrow WF, and outputs a control signal corresponding to the rotation angular velocity to the driving motor control portion 423. The driving motor control portion 423, on the basis of the outputted signal, then controls the driving motor 409. Thus the driving screw 411 is rotated in the same direction as the screw 410 and equals the rotation angular velocity of the driving screw 410. Therefore the spindle stock 405 is moved by the nut 405c together with the chuck 405b in the direction as shown by the arrow WA or in the direction as shown by the arrow WB (Z axis direction) synchronized with the spindle stock 403.

The disc 425a of the rotary encoder 425 as shown in FIG. 73 is also rotated together with the driving screw 411 in the direction as shown by the arrow WE or in the direction as shown by the arrow WF. The sensor 425b reads the marks on the disc 425a and outputs them to the rotation angular velocity detecting portion 426. The rotation angular velocity detecting portion 426, on the basis of the reading, detects the rotation angular velocity of the driving screw 411 in the directions as shown by the arrows WE or WF, and outputs the rotation angular velocity to the driving screw 411 in the directions as shown by the arrows WE or WF, and outputs the rotation angular velocity to the driving motor control portion 423. Then the driving motor control portion 423 outputs a corrected driving signal to the driving motor 409 such that the rotation angular velocity is compared with the rotation angular velocity of the driving motor 407 outputted from the rotation angular velocity detecting portion 422. The driving motor 409 on the basis of the corrected driving signal, rotates the driving screw 411 in the direction as shown by the arrow WE or in the direction as shown by the arrow WF. Accordingly, the rotation angular velocity of the driving screws 410 and 411 stays the same. The spindle stocks 403 and 405 are thus simultaneously and smoothly moved in the directions as shown in the arrows WA and WB (Z axis direction), supporting the workpiece 416 between the chucks 403b and 405b.

In this way the spindle stocks 403 and 405 as shown in FIG. 73 are simultaneously moved together with the workpiece 417 in the directions as shown by the arrows WA and WB (the Z axis direction). Furthermore, the tool rests 413 and 415 are properly moved together with the tool 416 in the directions as shown by the arrows WG and WH (the X axis direction). Then the workpiece 417 is machined into a predetermined shape by means of each tool 416.

Figure 74:
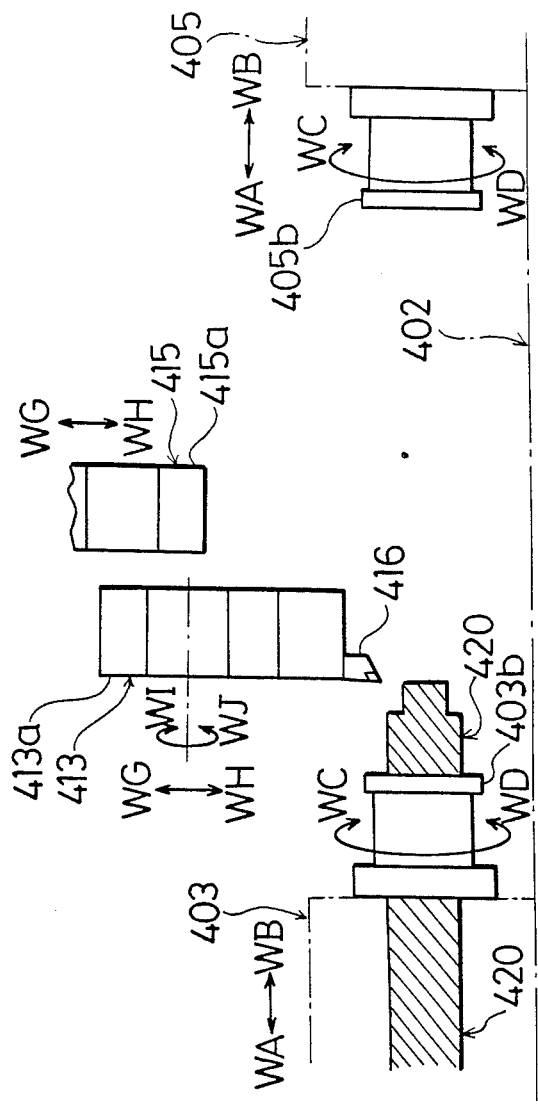
FIGS. 74 through 81 illustrate a method of bar shaped workpiece machining with the complex machine tool as shown in FIG. 71.

Now will be described the situation where a bar shaped workpiece is machined by means of the complex machining machine tool 401. If a bar shaped workpiece 420 as shown in FIG. 74 is required to be machined, the bar shaped workpiece 420 is pushed out through the chuck 403b installed on the spindle stock 403 in the direction as shown by the arrow WB by means of the barfeeder apparatus (not shown). Thus the end of the bar shaped workpiece 420 on which the first routine is to be performed is set to project from the chuck 403b in the direction as shown by the arrow WB. Thereafter, the turret head 413a of the tool rest 413 is properly rotated in the direction as shown by the arrow WI or in the direction as shown by the arrow WJ in FIG. 74. Then the tool 416 for turning the outside diameter is positioned at a position facing the bar shaped workpiece 420. Next, the chuck 403b is rotated together with the bar shaped workpiece 420 in the direction a shown by the arrow WC. When the bar shaped workpiece 420 is rotated in the direction as shown by the arrow WC, the driving motor 407 as shown in FIG. 71 is driven, and the driving screw 410 is properly rotated in the direction as shown by the arrow WE or in the direction as shown by the arrow WF. Moreover, the spindle stock 403 is properly moved by the nut 403c in the direction as shown by the arrow WA or in the direction as shown by the arrow WA or in the direction as shown by the arrow WB (the Z axis direction). At the same time, the tool rest 413 as shown in FIG. 74 is moved and driven together with the tool 416 in the directions as shown by the arrows WG and WH (the X axis direction). Thus the machining for turning is performed on the outside cylindrical portion of the bar shaped workpiece 420 by means of the tool 416.

When the turning performed on the outside cylindrical portion of the bar shaped workpiece 420 is completed, the tool rest 413 is properly moved in the direction as shown by the arrow WG to retract from the bar shaped workpiece 420. The turret head 413a of the tool rest 413 is properly rotated in the direction as shown by the arrow WI or in the direction as shown by the arrow WJ. Then the tool 416 for turning the inside diameter, such as a drill or a boring tool, is positioned at a position facing the bar shaped workpiece 420. Thereafter, the tool rest 413 is fed a predetermined distance together with the tool 416 in the direction as shown by the arrow WH in FIG. 75. The spindle stock 403 is moved and driven properly in the directions as shown by the arrows WA and WB (Z axis direction) with the bar shaped workpiece 420 held by the chuck 403b. In this way, the inside diameter portion of the bar shaped workpiece 420 is machined by means of the tool 416.

Figure 75:
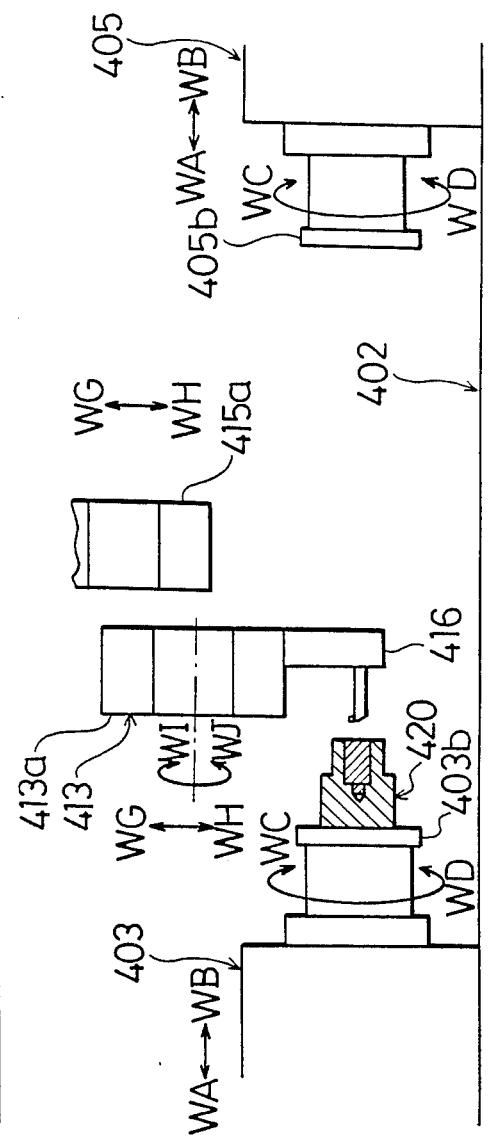

When the inside diameter portion of the bar shaped workpiece 420 has been machined as shown in FIG. 75, the spindle stock 403 is properly moved in the direction as shown by the arrow WA to be away from the tool used for the machining of the inside diameter portion.

The tool rest 413 is moved in the direction as shown by the arrow WG to retract from the bar shaped workpiece 420. When the tool rest 413 is retracted, the turret head 413a is properly rotated in the directions as shown by the arrows WI or WJ. Then a tool 416, such as an end mill, is positioned at a position facing the bar shaped workpiece 420. Thereafter, the rotation of the chuck 403b in the direction as shown by the arrow WC is stopped, and the tool 416 is rotated and driven. In this state the tool rest 413 is fed a predetermined distance in the direction as shown by the arrow WH in FIG. 76, and the spindle stock 403 is moved and driven in the directions as shown by the arrows WA and WB (the Z axis direction). In this way the milling machining is performed on the bar shaped workpiece 420. The chuck 403b of the spindle stock 403 is properly rotated in the directions as shown by the arrows WC and WD by C-axis control. In this state, the milling machining can be performed. After the milling machining, the tool rest 413 is retracted from the bar shaped workpiece 420 in the direction as shown by the arrow WG. A cutting-off tool 416 is then positioned at a position facing the bar shaped workpiece 420.

When the first routine of the machining is performed on the top end portion of the bar shaped workpiece 420 is completed, the tool rest 413 is moved in the direction as shown by the arrow WG to be retracted from the bar shaped workpiece 420, and the rotation of the chuck 403b in the directions as shown by the arrows WC and WD is stopped. Thereafter, the chuck 403b is loosened. The barfeeder apparatus (not shown) is driven, and the bar shaped workpiece 420 is pushed out a predetermined length in the direction as shown by the arrow WB, through the chuck 403b. When the bar shaped workpiece 420 is pushed out the predetermined length from the chuck 403b, the chuck 403b is fastened to hold the bar shaped workpiece 420. Then the portion to which the first routine of the machining was performed on the bar shaped workpiece 420 is fitted into the chuck 405b with the chuck 405b of the spindle stock 405 loosened, and the tool rest 405 is moved in the direction as shown by the arrow WA in FIG. 76. The chuck 405b is then fastened, and the bar shaped workpiece 420 is supported between the chucks 403b and 405b.

A cutting-off tool 416 installed on the tool rest 413 is then positioned at a position facing the bar shaped workpiece 420. When the tool 416 faces the bar shaped workpiece 420, the portion (called part 420a hereinafter) on which the first routine of the machining of the bar shaped workpiece 420 had finished and the raw portion to which will be performed the second routine of the machining of the bar shaped workpiece 420 is cut off from the other raw portion of the bar shaped workpiece 420 by means of the tool 416. The chucks 403b and 405b, as shown in FIG. 77, are synchronously rotated together with the bar shaped workpiece 420 in the direction as shown by the arrow WC by means of the method described earlier, and the tool rest 413 is fed a predetermined distance in the direction as shown by the arrow WH.

Figure 77:
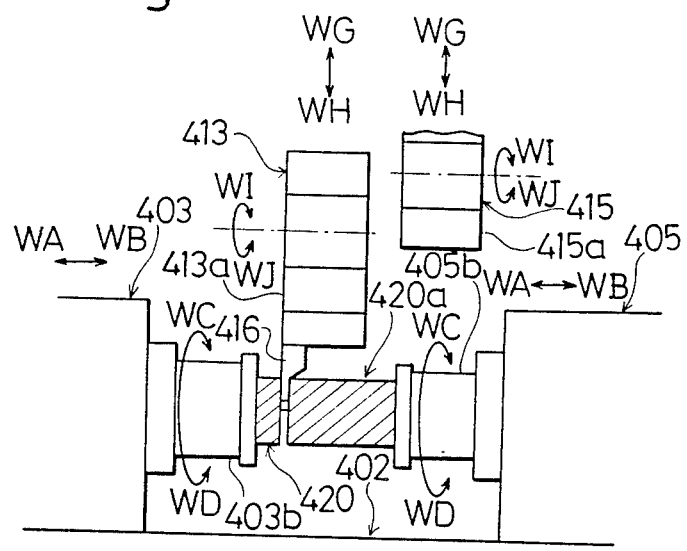
Figure 78:
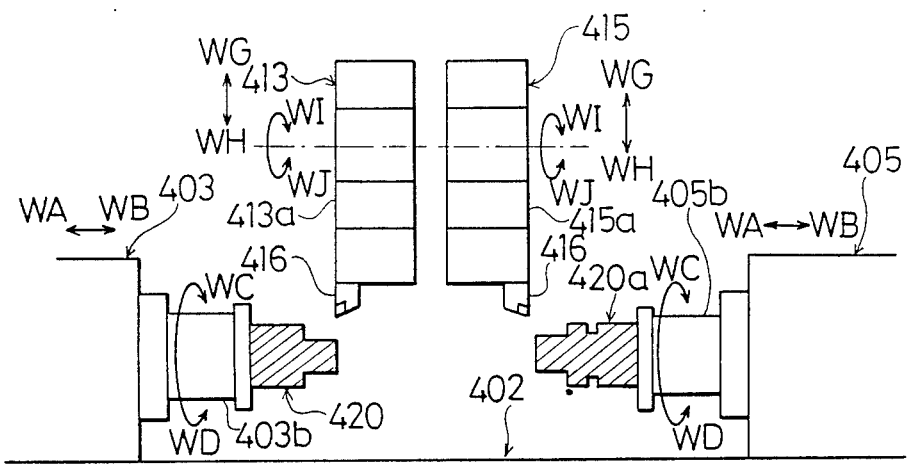

When the part 420a is cut off as shown in FIG. 77, the tool rest 413 is retracted from the bar shaped workpiece 420 in the direction as shown by the arrow WG, and the spindle stock 405 is moved a predetermined distance in the direction as shown by the arrow WB, that is, in the direction away from the spindle stock 403, with the part 420a held by the chuck 405b. Thereafter, the rotation of the chuck 403b in the direction as shown by the arrow WC is stopped, and the chuck 403b is loosened. Next, the bar shaped workpiece 420 is pushed out from the chuck 403b in the direction as shown by the arrow WB as shown in FIG. 78. The raw portion of the bar shaped workpiece 420 is projected a predetermined length from the chuck 403b in the direction as shown by the arrow WB. In this state, the chuck 403b is fastened, and the bar shaped workpiece 420 is held.

Thereafter, the first routine is performed on the raw portion of the bar shaped workpiece 420. At the same time, the second routine is performed on the part 420a. At first the turret heads 413a and 415a of the tool rests 403 and 405 are properly rotated in the direction as shown by the arrow WI or in the direction as shown by the WJ in FIG. 78, and the tools 416 for turning the outside diameter are positioned at a position facing the bar shaped workpiece 420 and the part 420a. Thereafter, each chuck 403b and 405b of the tool rests 403 and 405 is rotated in the direction as shown by the arrow WC. The turning machining is performed in a predetermined manner on each outside cylindrical portion of the bar shaped workpiece 420 and the part 420a by means of the tools 416. The spindle stocks 403 and 405 are properly and independently moved and driven in the directions as shown by the arrows WA and WB (Z axis direction), and the tool rests 413 and 415 are properly moved together with the tools 416 in the directions as shown by the arrows WG and WH, that is, in the X axis direction.

When each outside cylindrical portion of the bar shaped workpiece 420 and the part 420a has been turned as shown in FIG. 78, the tool rests 413 and 415 are retracted from the bar shaped workpiece 420 and the part 420a, and tool 416 installed on the tool rests 413 and 415 for turning the inner diameter are respectively positioned facing the bar shaped workpiece 420 and the part 420a. Thereafter, the tool rests 413 and 415 are fed a predetermined distance in the direction as shown by the arrow WH in FIG. 79. The tools 416, as described before, face the right end surface of the bar shaped workpiece 420 and the left end surface of the part 420a, respectively. The spindle stocks 403 405 are then independently moved in the directions as shown by the arrows WA and WB (the Z axis direction), respectively. In this way, each inside diameter portion of the bar shaped workpiece 420 and the part 420a is machined in a predetermined manner.

Figure 79:
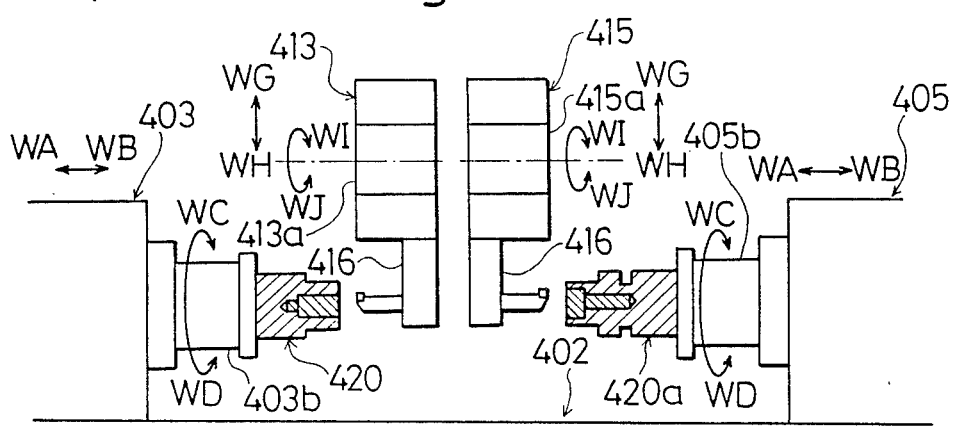

After each inside diameter portion of the bar shaped workpiece 420 and the part 420a is machined in the predetermined shape as shown in FIG. 79, the spindle stock 403 is moved in the direction as shown by the arrow WA, and the spindle stock 405 is moved in the direction as shown by the arrow WB, to remove each tool 416 from each inside diameter portion. The tool rests 413 and 115 are then moved in the direction as shown by the arrow WG to retract from the bar shaped workpiece 420 and the part 420a. Furthermore, the rotation of the chucks 403b and 405b in the direction as shown by the arrow WC is stopped.

Figure 80:
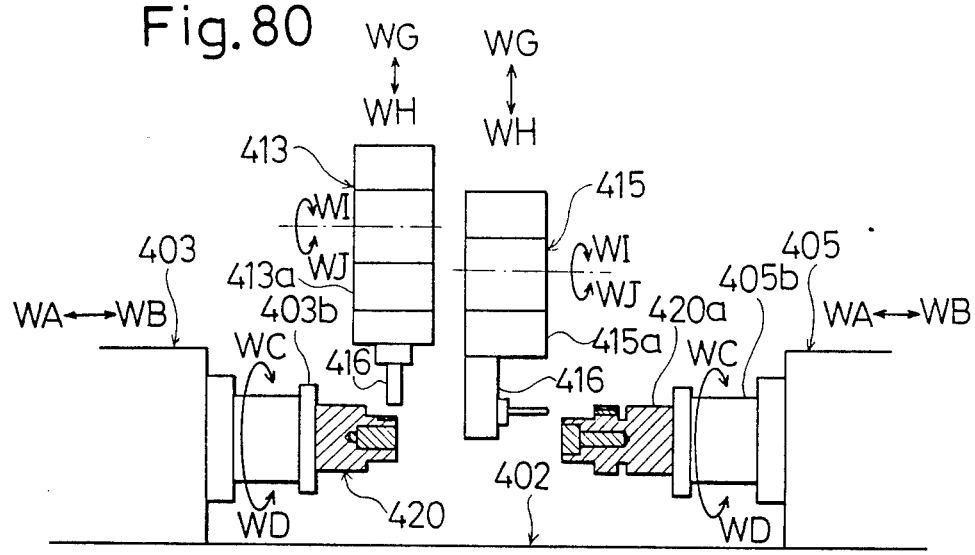
Figure 81:
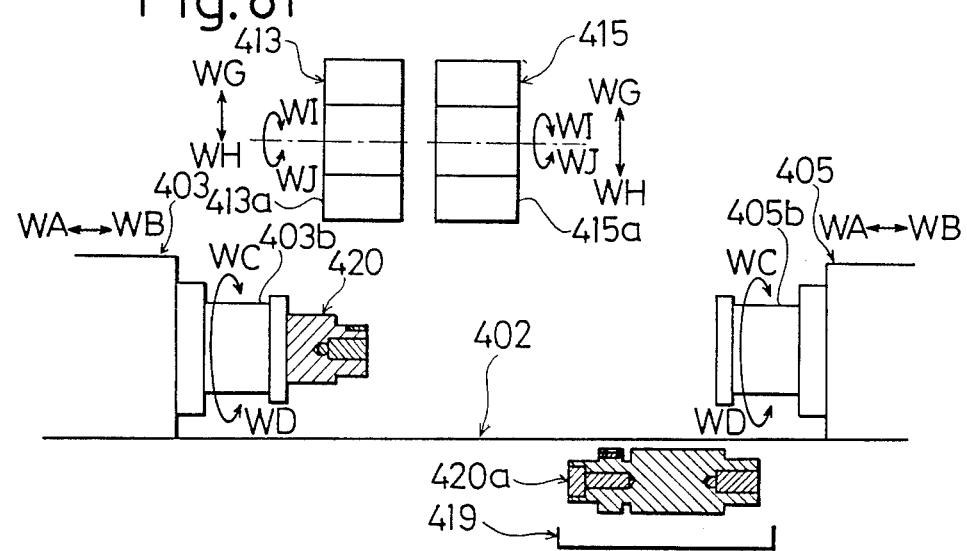

Then a milling machining is performed on the bar shaped workpiece 420 by means of the tool 416. The tool rest 413, as shown in FIG. 80, is fed a predetermined distance, together with the tool 416 for milling, in the direction as shown by the arrow WH. The spindle stock 403 is moved together with the bar shaped workpiece 420 in the directions as shown by the arrows WA and WB (the Z axis direction). The chuck 403b is then properly rotated in the directions as shown by the arrows WC and WD by means of the C-axis control so that the milling machining can be performed. The second routine is performed in parallel with the milling machining. The other tool rest 415 is fed a predetermined distance together with the tool 416, such as a drill, in the direction as shown by the arrow WH, to have the tool 416 face the machining portion of the part 420a, as shown in FIG. 80. The spindle stock 405 is moved together with the part 420a in the directions as shown by the arrows WA and WB (Z axis direction) to perform a drill machining and the like on the part 420a by means of the tool 416. When the second routine is finished with respect to the parts 420a, the chuck 405b is loosened to detach the machined part 420a from the chuck 405b, and part 420a is thrown into a parts catcher 419, as seen at the bottom of FIG. 31 The first routine is thus performed in parallel with the second routine, so that successive machining is performed on the bar shaped workpiece 420, and a large number of the machined parts 420a are made.

In the above-described embodiment, it was mentioned that the bar shaped workpiece 420 was fed a predetermined length through the chuck 403b from the spindle stock 403 in the direction as shown by the arrow WB at two times, that is, one time before the cutting-off and the other time after the cutting-off, by means of the barfeeder apparatus (not shown). But the time that the bar shaped workpiece 420 is fed is not critical. The delivering activity can finish at one time, either before the cutting-off or after the cutting-off.

Figure 76:
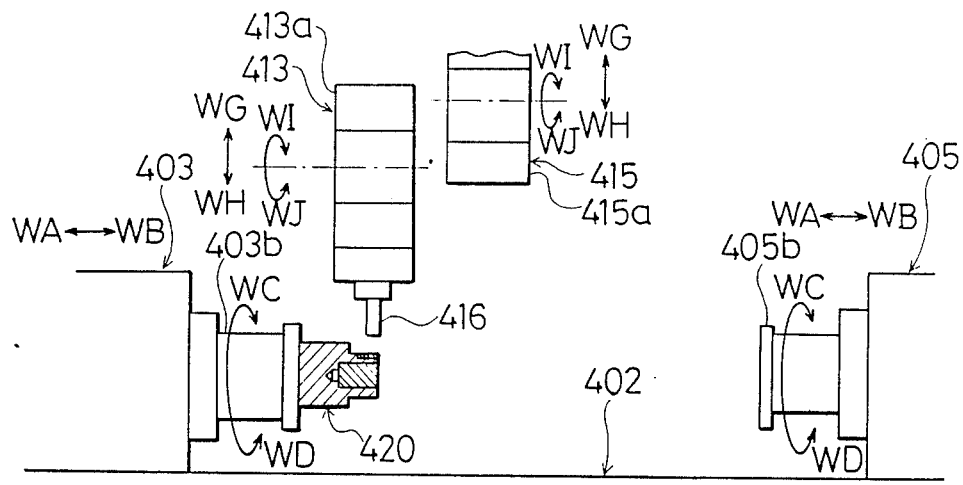

In the above-described embodiment, it was also mentioned that after the first routine finishes on the bar shaped workpiece 420, the portion on which the first routine was performed is fed in the direction shown by the arrow WB by means of the barfeeder apparatus, is held by the chuck 405b, and is cut off to leave the part 420a separate from the remaining raw portion. However, it may be that the bar shaped workpiece 420 is pulled out the quantity to have the first routine performed thereon next from the chuck 403b in the direction as shown by the arrow WB by means of the spindle stock 405, without the barfeeder apparatus and before the cutting-off, and is then cut off. That is, after the first routine finishes on the bar shaped workpiece 420, as shown in FIG. 76, the rotation of the chuck 403b in the direction as shown by the arrow WC is stopped. The chuck 405b of the spindle stock 405 is then loosened. Furthermore, the tool rest 405 is moved a predetermined distance in the direction as shown by the arrow WA, and the portion of the bar shaped workpiece 420 to which the first routine had been performed is fitted into the chuck 405b. At the time that this portion is fitted into the chuck 405b, the chuck 405b is fastened, and the bar shaped workpiece 420 is held. At the same time, the chuck 403b is loosened, and the holding relation between the chuck 403b and the bar shaped workpiece 420 is released. In this state the spindle stock 405 is moved a predetermined distance together with the chuck 405b in the direction as shown by the arrow WB, that is, in the direction away from the spindle stock 403. The bar shaped workpiece 420 is thus pulled out, with a quantity thereof to which will next be performed the first routine, from the chuck 403b in the direction as shown by the arrow WB, being pulled by the spindle stock 405. When the bar shaped workpiece 420 is pulled out the quantity which will next have the first routine performed thereon from the chuck 403b, the chuck 403b is fastened to hold the bar shaped workpiece 420.

In this way, when the bar shaped workpiece 420 is supported between the chucks 403b and 405b, the chucks 403b and 405b are synchronously rotated in the direction as shown by the arrow WC, and the spindle stocks 403 and 405 are properly moved together with the bar shaped workpiece 420 in the directions as shown by the arrows WA and WB (the Z axis direction). The tool 416 for cutting-off, which is installed in the tool rest 413, is positioned to face the portion of the bar shaped workpiece 420 to be cut off. The tool rest 413 is then fed a predetermined distance in the direction as shown by the arrow WH to cut the bar shaped workpiece 420 by means of the tool 416. In this way the part 420a is cut off from the remaining raw portion of the bar shaped workpiece 420. The bar shaped workpiece 420 is then pulled out a length corresponding to the length of workpiece needed to have performed a next first routine of the machining to be able to start the machining immediately.

Figure 82:
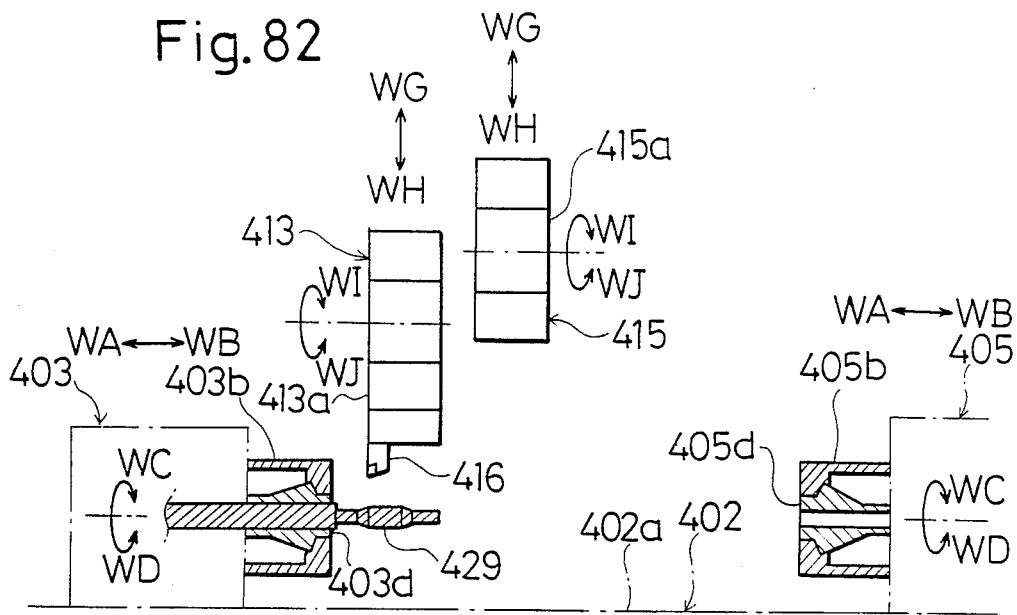

If a long and slender shaft shaped workpiece 429 as shown in FIG. 82 is machined making use of the complex machining machine tool 401, the shaft shaped workpiece 429 is held by the chuck 403b to project a predetermined length from the chuck 403b installed in the spindle stock 403 in the direction as shown by the arrow WB. When the shaft shaped workpiece 429 is held by the chuck 403b as shown in FIG. 82, the chuck 403b is rotated in the direction as shown by the arrow WC. At the same time, the tool 416 for turning is positioned at a position facing the shaft shaped workpiece 429 by the turret head 413a of the tool rest 413 by being properly rotated in the direction as shown by the arrow WI or in the direction as shown by the arrow WJ in FIG. 82. The spindle stock 403 is then moved and driven together with the chuck 403b in the directions as shown by the arrows WA and WB (the Z axis direction). Moreover, the tool rest 413 is properly moved and driven in the directions as shown by the arrow WG and WH (the X axis direction). Thus turning is performed on the portion of the shaft shaped workpiece 429 projecting from the chuck 403b in the direction as shown by the arrow WB by means of the tool 416.

When the turning has been performed on the projecting portion of the shaft shaped workpiece 429, the tool rest 413 is properly moved in the direction as shown by the arrow WG to retract from the shaft shaped workpiece 429. Thereafter, a workpiece holding portion 405d of the chuck 405b, which is installed in the spindle stock 405 as shown in FIG. 82, is loosened. The spindle stock 405 is then moved a predetermined distance together with the chuck 405b toward the spindle stock 403 in the direction as shown by the arrow WA, and the machined portion of the shaft shaped workpiece 429 is fitted into the workpiece holding portion 405d. At the time the portion is fitted into the workpiece holding portion 405d, the workpiece holding portion 405d is fastened and the shaft shaped workpiece 429 is held. At the same time, a workpiece holding portion 403d of the chuck 403b is loosened, and the holding relation between the chuck 403b and the shaft shaped workpiece 429 is released.

Figure 83:
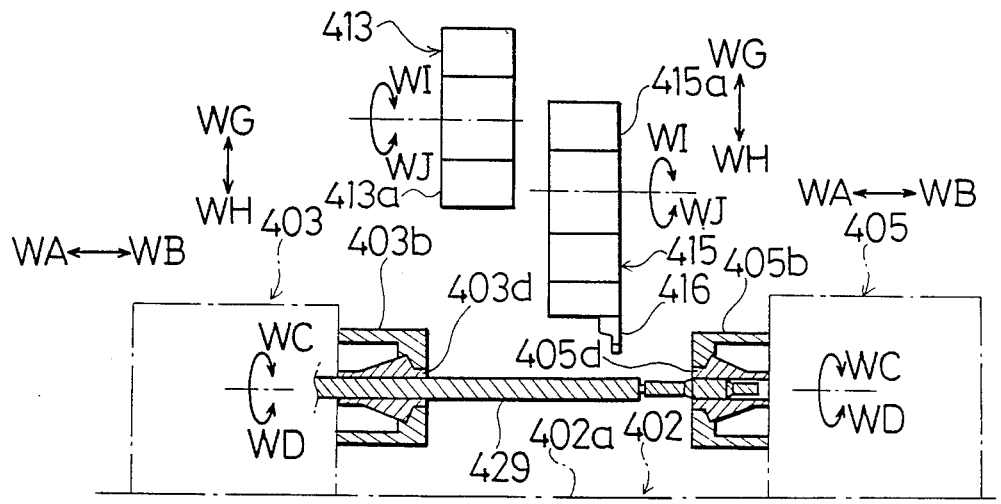

The spindle stock 405 is then moved a predetermined distance together with the chuck 405b in the direction as shown by the arrow WB, that is, in the direction away from the spindle stock 403. Then the shaft shaped workpiece 429 is pulled out a predetermined length from the chuck 403b in the direction as shown by the arrow WB, being pulled by the spindle stock 405, as shown in FIG. 83. Then when the raw portion of the shaft shaped workpiece 429 is pulled out the predetermined length from the chuck 403b, the workpiece holding portion 403d of the chuck 403b is fastened to hold the shaft shaped workpiece 429.

The chucks 403b and 405b, as shown in FIG. 83, are then synchronously rotated in the direction as shown by the arrow WC and at the same time the tool 416 used for machining is positioned to face the shaft shaped workpiece 429 by the turret head 415a of the tool rest 415 being properly rotated in the direction as shown by the arrow WI or in the direction as shown by the arrow WJ. Thereafter, turning is performed on the raw portion (the raw portion of the nearby chuck 403b is excluded) of the shaft shaped workpiece 429, which is pulled from the chuck 403b in the direction as shown by the arrow WB, in such a manner that the spindle stocks 403 and 405 are synchronously and properly moved in the directions as shown by the arrows WA and WB (the Z axis direction), and the tool rest 415 is moved together with the tool 415 in the directions as shown by the arrows WG and WH (the X axis direction).

Figure 84:
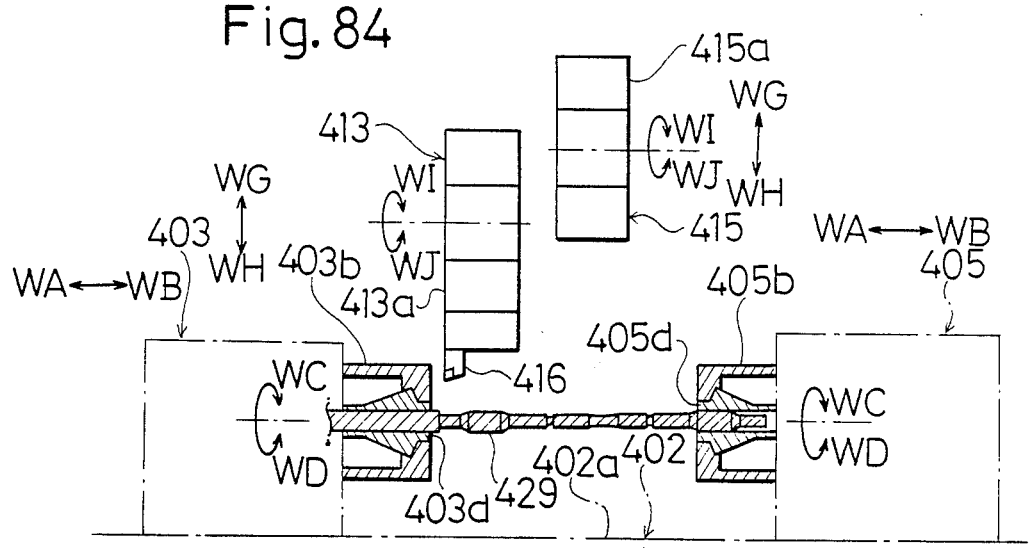

When the turning is completed on the raw portion, the tool rest 415 is properly moved in the direction as shown by the arrow WG as shown in FIG. 84 to be retracted from the shaft shaped workpiece 429. Next, the tool 416 used for the machining is positioned at a position facing the shaft workpiece 429 by the tool rest 413 being properly rotated in the direction as shown by the arrow WI or in the direction as shown by the arrow WJ. Then the spindle stocks 403 and 405 are synchronously and properly moved in the directions as shown by the arrows WA and WB (the Z axis direction). The tool rest 413 is also then properly moved together with the tool 416 in the directions as shown by the arrows WG and WH (the X axis direction). The turning has then been performed on the raw portion of the shaft shaped workpiece 429 adjacent to the chuck 403b.

Figure 85:
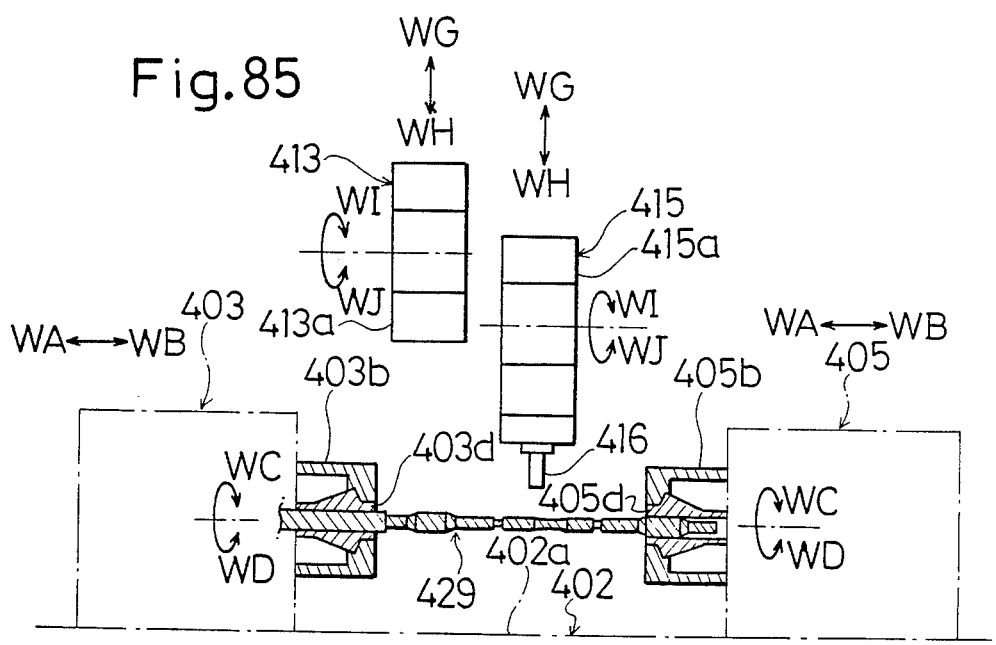

When the turning has been performed on the outside cylindrical portion of the shaft shaped workpiece 429 as shown in FIG. 84, the rotation of the chucks 403b and 405b in the direction as shown by the arrow WC is stopped, and the tool rest 413 is retracted from the shaft shaped workpiece 429. Thereafter, the tool 416 for milling is positioned facing the shaft shaped workpiece 429, as shown in FIG. 85, by the tool rest 415 being properly rotated in the direction as shown by the arrow WI or in the direction as shown by the arrow WJ. The tool rest 415 is then fed a predetermined distance together with the tool 416 for milling in the direction as shown by the arrow WH. Furthermore, the spindle stocks 403 and 405 are synchronously and properly moved in the directions as shown by the arrows WA and WB (the Z axis direction). The milling machining is thus performed on the outside surrounding portion of the shaft shaped workpiece 429. The milling machining can be performed in such a manner that the chucks 403b and 405b are synchronously and properly rotated in the directions as shown by the arrows WC and WD by means of the C-axis control. After the milling machining finishes, the tool rest 415 is retracted from the shaft shaped workpiece 429.

Figure 86:
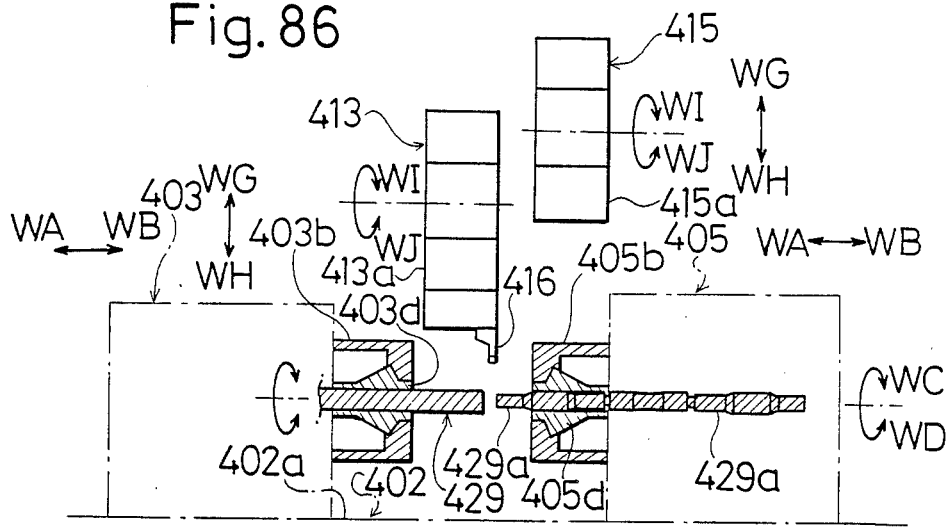

When the end portion of the shaft shaped workpiece 429 is machined at a predetermined length, the holding relation between the chuck 405b and the shaft shaped workpiece 429 is released by loosening the chuck 405b. Moreover, the spindle stock 405 is moved a predetermined distance in the direction as shown by the arrow WA. Then the chuck 405b is moved in the direction as shown by the arrow WA, making the machined portion of the shaft shaped workpiece 429 successively pass into the workpiece holding portion 405d, to be positioned at a position adjacent to the chuck 403b. The chuck 405b is then fastened to hold the shaft shaped workpiece 429, and the chuck 403b is loosened. Next, the spindle stock 405 is moved a predetermined distance together with the chuck 405b in the direction as shown by the arrow WB, to pull out the shaft shaped workpiece 429 from the chuck 403b a predetermined length. When the shaft shaped workpiece 429 is pulled out the predetermined length from the chuck 403b, the chuck 403b is fastened to hold the shaft shaped workpiece 429. The chucks 403b and 405b are then synchronously rotated in the direction as shown by the arrow WC. Furthermore, the spindle stocks 403 and 405 are moved together with the shaft shaped workpiece 429 in the directions as shown by the arrows WA and WB. A portion of the shaft shaped workpiece 429 to be cut is then positioned to face a tool for cutting-off 416 installed in the tool rest 413. Thereafter, the tool rest 413 is fed a predetermined distance together with the tool 416 for cutting-off in the direction as shown by the arrow WH as shown in FIG. 86. Then the shaft shaped workpiece 429 is cut by means of the tool 416 in the directions as shown by the arrows WG and WH, and the machined portion (called part 429a, hereinafter) is cut off from the other raw portion of the shaft shaped workpiece 429.

Figure 87:
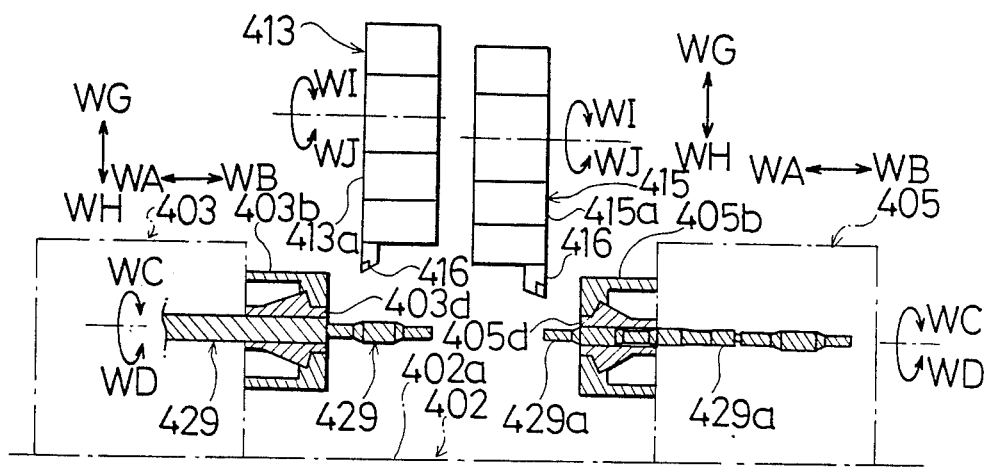

When the shaft shaped workpiece 429 is cut, the tool rest 413 is retracted from the shaft shaped workpiece 429, and the spindle stock 405 is moved a predetermined distance, together with the chuck 405b, in the direction as shown by the arrow WB as shown in FIG. 87. The part 429a is moved the predetermined distance together with the chuck 405b in the direction shown by the arrow WB. The spindle stock 405 is then moved and driven in the directions as shown by the arrows WA and WB (the Z axis direction), and the tool rest 415 is moved and driven together with the tool 416 in the directions as shown by the arrows WG and WH (the X axis direction) to perform a predetermined machining on the part 429a. In parallel with this, the spindle stock 403 is moved and driven in the directions as shown by the arrows WA and WB (the Z axis direction). Moreover, the tool rest 413 is moved and driven together with the tool 416 in the directions as shown by the arrows WG and WH (the X axis direction). Then the same machining as shown in FIG. 82 is performed on the raw portion of the shaft shaped workpiece 429 held by the chuck 403b. When the machining finishes on the part 429a, the chuck 405b is loosened to remove the part 429a from the chuck 405b, and the part 429a is thrown in the parts catcher 419, as shown in FIG. 88.

A situation where a long sized workpiece 427, as shown in FIG. 89, is fed from the spindle stock 403 in the direction as shown by the arrow WB without using the barfeeder apparatus and machining on the workpiece 427 is performed without using a center rest will be described. That is, in order to machine the workpiece 427, the workpiece 427 is set so as to project a predetermined length from the chuck 403b through the workpiece holding portion 403d of the chuck 403b installed on the spindle stock 403 in the direction as shown by the arrow WB. Thereafter, the chuck 403b is rotated together with the workpiece 427 in the direction as shown by the arrow WC, and the tool 416 used for machining, among the tools 416 installed on the tool rest 413, is positioned to face the workpiece 427. Next, the spindle stock 403 is moved together with the chuck 403b (that is, the workpiece 427) in the direction as shown by the arrows WA and WB (the Z axis direction), and the tool rest 413 is moved together with the tool 416 for machining in the direction as shown by the arrows WG and WH (X axis direction) and the end portion of the workpiece 427 is machined by means of the tool 416.

When the end portion of the workpiece 427 has been machined, the rotation of the chuck 403b in the direction as shown by the arrow WC is stopped, and the tool rest 413 is moved in the direction as shown by the arrow WG to retract from the workpiece 427. The tool used for the next machining (see FIG. 90 (a)) of the tools 416 installed in the tool rest 413 is then positioned to face the workpiece 427. Next, the workpiece holding portion 405d of the chuck 405b, which is installed in the spindle stock 405, as shown in FIG. 89, is loosened. In this state the spindle stock 405 is moved a predetermined distance together with the chuck 405b toward the spindle stock 403 in the direction as shown by the arrow WA to fit the end portion of the workpiece 427 into the workpiece holding portion 405d as shown in FIG. 90(a). When the end portion fits into the workpiece holding portion 405d, the workpiece holding portion 405d is fastened, and the end portion is held by the spindle stock 405. At the same time, the workpiece holding portion 403d of the chuck 403b is loosened a little. The holding relation between the spindle stock 403 and the workpiece 427 is revised so as to move in the direction as shown by the arrows WA and WB (the Z axis direction), although the workpiece 427 can't rotate in the direction as shown by the arrows WC and WD on the chuck 403b.

When the workpiece 427 is held by each of the chucks 403b and 405b of the spindle stocks 403 and 405, the spindle stocks 403 and 405 are synchronously moved in the directions as shown by the arrows WA and WB, and the chucks 403b and 405b are synchronously rotated in the direction as shown by the arrow WC or in the direction as shown by the arrow WD. The tool rest 413 is fed a predetermined quantity, together with the tool 416, for machining in the direction as shown by the arrow WH. Then the tool rest 413 is positioned at a position near the chuck 403b of the spindle stock 403 as shown in FIG. 90 (a), and the tool 416 for machining is positioned at a position of the start of machining.

Thereafter, with the spindle stock 403 positioned at the machining position, the spindle stock 405 as shown in FIG. 90 (a) is gradually moved, together with the chuck 405b, in the direction as shown by the arrow WB, that is, in the direction away from the spindle stock 403. Then the workpiece 427 is pulled in the direction as shown by the arrow WB by the spindle stock 405, and the raw portion of the workpiece 427 is gradually pulled out from the chuck 403b in the direction as shown by the arrow WB through the workpiece holding portion 403d of the chuck 403b. Thus a successive machining is performed on the raw portion of the workpiece 427 being gradually pulled out from the chuck 403b by means of the tool 416, as shown in FIG. 90 (a) and FIG. 90 (b), the tool rest 413 being properly moved together with the tool 416 in the directions as shown by the arrows WG and WH. The chuck 403b of the spindle stock 403 holds the workpiece 427 loosened a little so as to be able to move in the directions as shown by the arrows WA and WB (the Z axis direction), although the workpiece 427 is not rotated in the directions as shown by the arrows WC and WD, and the machining by the tool rest 413 is performed at a position near the chuck 403b. Thus the chuck 403b fills the role of a center rest, the workpiece 427 being machined without deflecting from its center. The workpiece 427 is smoothly pulled out in the direction as shown by the arrow WB on account of the above described reasons.

In the above-described embodiment, it was mentioned that the spindle stock 405 was moved toward the spindle stock 403 in the direction as shown by the arrow WA, and then held by the spindle stock 405. However, the above method of holding the end portion of the workpiece 427 with the spindle stock 405 is not critical. Any holding method is available if the end portion can be properly held by the spindle stock 405. For example, the end portion of the workpiece 427 may be held by the spindle stock 405 in such a manner that the spindle stock 403 is moved a predetermined distance together with the workpiece 427 toward the spindle stock 405 in the direction as shown by the arrow WB. The end portion of the workpiece 427 can be held by the spindle stock 405 in such a manner that the spindle stocks 403 and 405 are relatively moved in the Z axis direction, and the interval between the spindle stocks 403 and 405 is narrowed.

Another example will be described in FIG. 91, that is, the spindle stocks 403 and 405 face each other and are synchronously moved in the directions as shown by the arrows WA and WB. The same portions as described in FIG. 73 are marked with the same numerals, and the explanation of these portions will be omitted.

Figure 91:
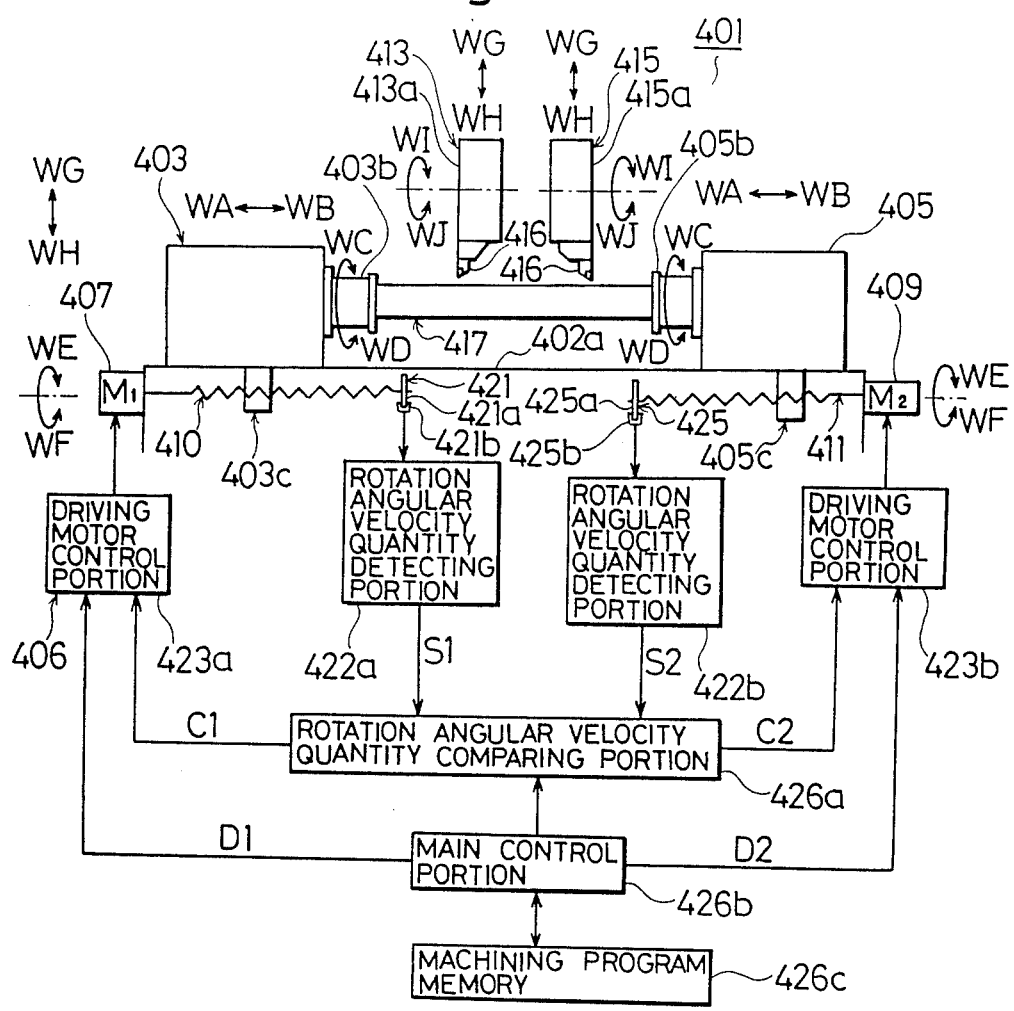
FIG. 91 is a schematic view showing an embodiment of a method of driving the spindle stocks in a complex machine tool.

The spindle stock driving unit 406 is provided with the machine body 402 of the complex machining machine tool 401 as shown in FIG. 91. The spindle stock driving unit 406 has driving motors 407 and 409 driving screws 410 and 411, rotary encoders 421 and 425, rotation angular velocity quantity detecting portions 422a and 422b driving motor control portion 423a and 423b, and the like. That is, the driving motors 407 and 409 are provided at both the right end portions of the machine body 402 in FIG. 91. Each of the driving motor control portions 423a and 423b is connected with its respective driving motor 407 and 409. The driving motor control portions 423a and 423b connect with a rotation angular velocity quantity comparing portion 426a and a main control portion 426b. The rotation angular velocity quantity comparing portion 426a also connects with the main control portion 426b. A machining program memory 426c connects with the main control portion 426b.

The driving screws 410 and 411, having the same ptich, rotatably connect with the driving motors 407 and 409, and are rotatable in the directions as shown by the arrows WE and WF. Each of the nuts 403c and 405c, as described before, fits in the respective driving screws 410 and 411. The spindle stocks 403 and 405 are moved and driven by the nuts 403c and 405c in the directions as shown by the arrow WA or in the direction as shown by the arrow WA or in the direction as shown by the arrow WB (the Z axis direction), the driving motors 407 and 409 being driven to rotate the driving screws 410 and 411 in the direction as shown by the arrow WE or in the direction as shown by the arrow WF.

The rotary encoders 421 and 425 are installed in the end portions of the driving screws 410 and 411. The rotary encoders 421 and 425 are discs 421a and 425a provided with a number of magnetic and optical marks (not shown). The sensors 421b and 425b read the marks that are provided at the lower portion of the discs 421a and 425a in FIG. 91. The rotary encoders 421 and 425 are connected with the respective rotation angular velocity quantity detecting portions 422a and 422b. The rotation angular velocity quantity detecting portions 422a and 422b connect with the rotation velocity quantity comparing portion 426a.

With the above complex machining machine tool 401, if the long sized workpiece 417 is required to be machined, as shown in FIG. 91, both the right and left end portions of the workpiece 417 are held by the chucks 403b and 405b. When the workpiece 417 is held by the chucks 403b and 405b the chucks 403b and 405b are synchronously rotated and driven together with the workpiece 417 in the direction as shown by the arrow WC or in the direction as shown by the arrow WD on the basis of a machining program used for the machining of the workpiece 417 stored in the machining program memory 426c. At the same time, the turret heads 413a and 415a of the tool rests 413 and 415, as shown in FIG. 72, are properly rotated and driven in the direction as shown by the arrow WI or in the direction as shown by the arrow WJ. Thus the tool 416 to be used for the machining is positioned facing the workpiece 417. Thereafter, driving signals D1 and D2 indicating the synchronous movement of the spindle stocks 403 and 405 are outputted to each of the driving motor control portions 423a and 423b from the main control portion 426b. The driving motor control portions 423a and 423b receive signals to rotate and drive the driving motors 407 and 409 at the same speed. Then the driving screws 410 and 411 connected with the driving motors 407 and 409 rotate at the same angular velocity in the direction as shown by the arrow WE or in the direction as shown by the arrow WF. As a result, the spindle stocks 403 and 405 are synchronously moved by the nuts 403c and 405c at the same speed in the directions as shown by the arrows WA and WB (that is, in the Z axis direction). At this point the discs 421a and 425a of the rotary encoders 421 and 425 are also rotated in the direction as shown by the arrow WE or in the direction as shown by the arrow WF. The sensors 421b and 425b then read the marks on the discs 421a and 425a. The read signals are sent to the rotation angular velocity quantity detecting portions 422a and 422b.

The rotation angular velocity quantity detecting portions 422a and 422b, on the basis of the received signals, detect the rotation angular velocity quantities of the driving screws 410 and 411 in FIG. 91 in the direction as shown by the arrow WE or in the direction as shown by the arrow WF. Detecting signals S1 and S2, corresponding to the rotation angular velocity quantities, are outputted to the rotation angular velocity quantity comparing portion 426a. Then the rotation angular velocity quantity comparing portion 426a, on the basis of the signals, outputs control signals C1 and C2 to the driving control portions 423a and 423b so that the difference between the detected rotation angular velocity quantities of the driving screws 410 and 411 becomes zero. The driving motor control portions 423a and 423b, on the basis of the signals, drive and control the driving motors 407 and 409. Accordingly, the rotation angular velocity quantities of the driving screws 410 and 411, in the directions as shown by the arrows WE and WF, always stay the same by means of the above-described control, even if the rotation of the motors 407 and 409 changes while the spindle stocks 403 and 405 are synchronously moving in the directions as shown by the arrows WA and WB (that is, the Z axis direction). Therefore synchronous movement is smoothly performed.

In this way the spindle stocks 403 and 405, as shown in FIG. 91, are synchronously moved together with the workpiece 417 in the direction as shown by the arrows WA and WB (the Z axis direction). Moreover, the tool rests 413 and 415 are properly moved together with the tools 416 in the directions as shown by the arrows WG and WH (the X axis direction). Thus the workpiece 417 is machined in a predetermined shape by the means of each tool 416.

Figure 92:
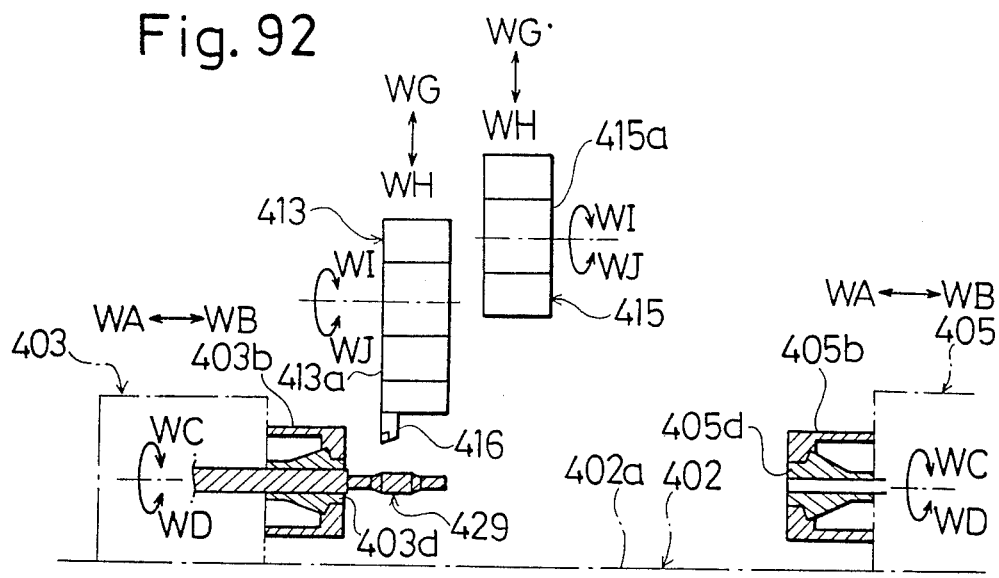
FIGS. 92 through 99 illustrate a method of machining a long and slender shaft workpiece.

If a slender and long sized and shaft shaped workpiece 429 as shown in FIG. 92 is machined, the shaft workpiece 429 is preset to project a predetermined length from the spindle stock 403 in the direction as shown by the arrow WB through the chuck 403b installed in the spindle stock 403. When the shaft shaped workpiece 429 is set, the chuck 403b is rotated in the direction as shown by the arrow WC. At the same time, the turret head 413a of the tool rest 413 is properly rotated in the direction as shown by the arrow WI or in the direction as shown by the arrow WJ in FIG. 92. A tool 416 for turning is then positioned facing the shaft shaped workpiece 429. Next, in this state, the spindle stock 403 is moved and driven together with the chuck 403b in the directions as shown by the arrows WA and WB (the Z axis direction). Thus the machining for turning is performed on the outside cylindrical portion of the shaft shaped workpiece 429 projecting from the chuck 403b of the spindle stock 403 in the direction as shown by the arrow WB by means of the tool 416.

Figure 93:
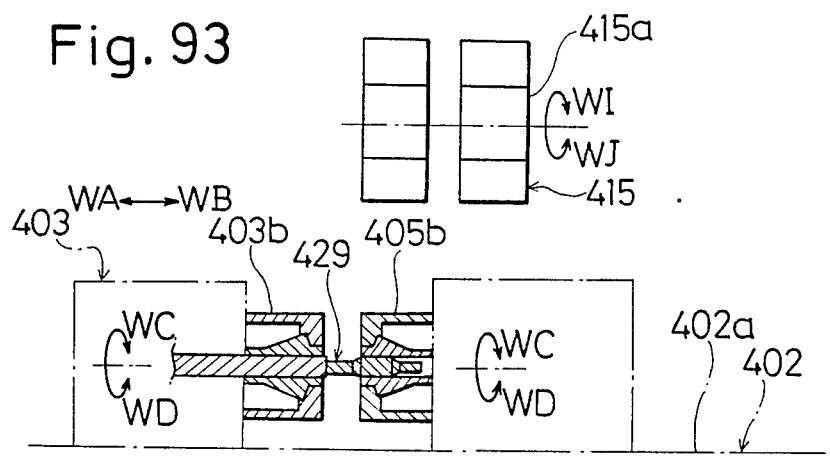

When the turning is completed on the outside cylindrical portion of the shaft shaped workpiece 429, the tool rest 413 is properly moved in the direction as shown by the arrow WG to be retracted from the shaft shaped workpiece 429. Furthermore, the rotation of the chuck 403b in the direction as shown by the arrow WC is stopped. Thereafter, the workpiece holding portion 405d of the chuck 405b installed in the spindle stock 405, as shown in FIG. 92, is loosened. In this state, the spindle stock 405 is moved a predetermined distance, together with the chuck 405b, toward the spindle stock 403, in the direction as shown by the arrow, WA as shown in FIG. 93, to insert the machined portion of the shaft shaped workpiece 429 into the workpiece holding portion 405d. When the machined portion is inserted into the workpiece holding portion 405d, the workpiece holding portion 405d is fastened to hold the shaft shaped workpiece 429 by the spindle stock 405. At the same time, the workpiece holding portion 403d of the chuck 403d is loosened to release the holding relation between the spindle stock 403 and the shaft shaped workpiece 429.

Figure 94:
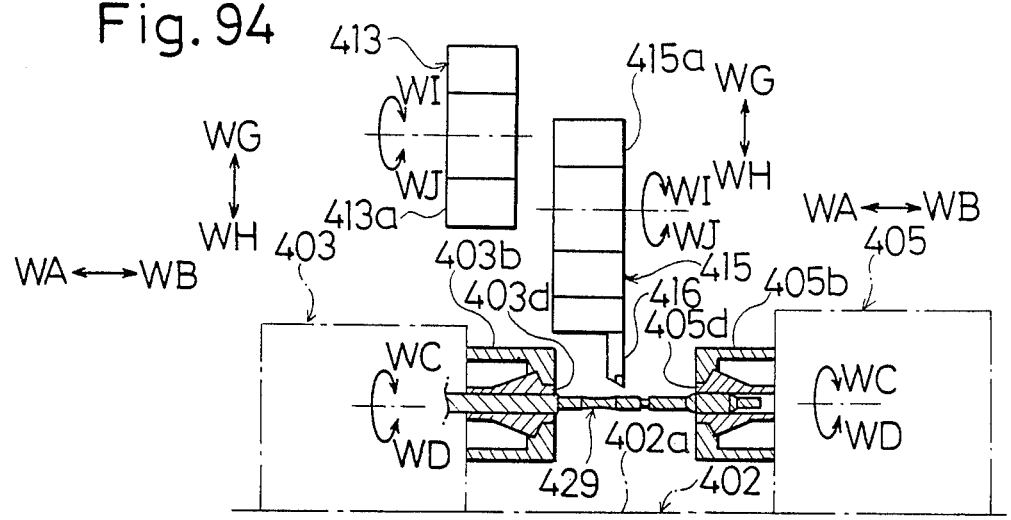

The spindle stock 405 is then moved a predetermined distance together with the chuck 405b in the direction as shown by the arrow WB in FIG. 93, that is, in the direction away from the spindle stock 403. Then the shaft shaped workpiece 429 is pulled by the spindle stock 405, as shown in FIG. 94, and its raw portion is pulled out a predetermined length through the chuck 403b of the spindle stock 403 in the direction as shown by the arrow WB. After the raw portion of the shaft shaped workpiece 429 is pulled out the predetermined length from the spindle stock 403, the workpiece holding portion 403d of the chuck 403b is fastened to hold the shaft shaped workpiece 429 with the spindle stocks 403 and 405.

In this state the chucks 403b and 405b, as shown in FIG. 94, are synchronously rotated in the direction as shown by the arrow WC. The tool 416 for turning, to be used in the machining, is positioned facing the shaft shaped workpiece 429 by the turret head 415a of the tool rest 415 being properly rotated in the direction as shown by the arrow WI or in the direction as shown by the arrow WJ. Thereafter the spindle stocks 403 and 405 are synchronously and properly moved in the directions as shown by the arrows WA and WB (the Z axis direction), and tool rest 415 is moved together with the tool 416 for turning in the directions as shown by the arrows WG and WH (the X axis direction). Thus the turning is performed on the raw portion of the shaft shaped workpiece 429 which has been pulled out anew.

Figure 95:
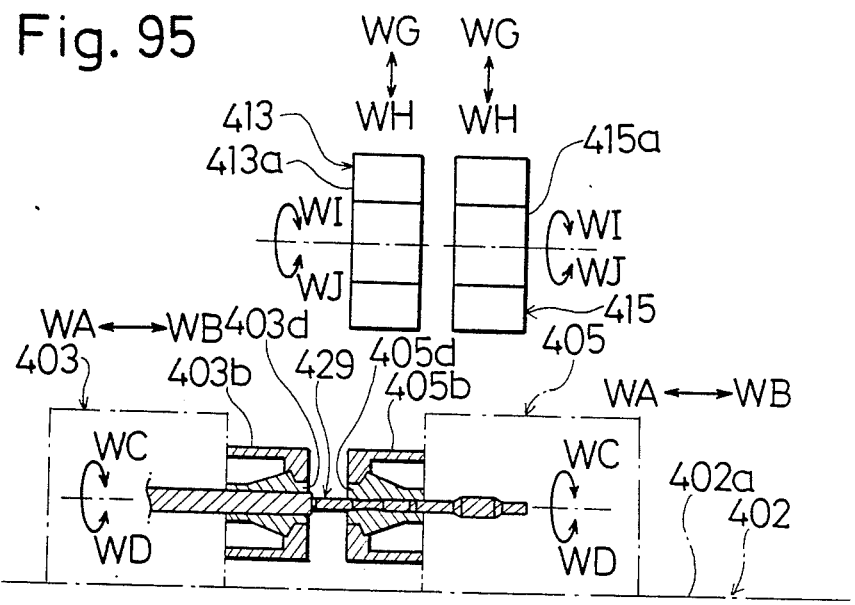
Figure 96:
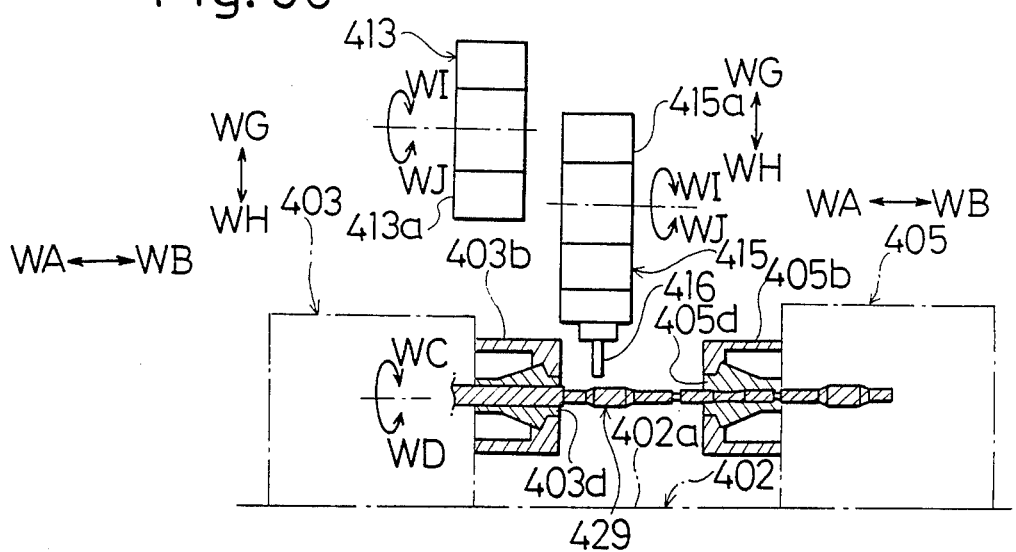

When the turning is completed on the raw portion of the shaft shaped workpiece 429, as shown in FIG. 94, the rotation of the chucks 403b and 405b in the direction as shown by the arrow WC is stopped, and the tool rest 415 is moved in the direction as shown by the arrow WG to be retracted from the shaft shaped workpiece 429. Thereafter the workpiece holding portion 405d of the chuck 405b is loosened to release the holding relation between the spindle stock 405 and the shaft shaped workpicce 429. The spindle stock 405 is then moved a predetermined distance toward the spindle stock 403 in the direction as shown by the arrow WA. Then chuck 405b is also moved in the direction as shown by the arrow WA to make the machined portion of the shaft shaped workpiece 429 pass into the workpiece holding portion 405d, to position the chuck 405b near the chuck 403b, as shown in FIG. 95. The chuck 405b is then fastened to hold the shaft shaped workpiece 429 with the spindle stock 405. At the same time, the chuck 403b is loosened to release the holding relation between the spindle stock 403 and the shaft shaped workpiece 429. The spindle stock 405 is then moved a predetermined distance together with the chuck 405b in the direction as shown by the arrow WB in FIG. 96, that is, in the direction away from the spindle stock 403. The raw portion of the shaft shaped workpiece 429 is thus pulled out a predetermined length from the spindle stock 403 through the chuck 403b in the direction as shown by the arrow WB. After the raw portion of the shaft shaped workpiece 429 is pulled out the predetermined length from the spindle stock 403, the workpiece holding portion 403d of the chuck 403b is fastened to hold the shaft shaped workpiece 429 with both the spindle stocks 403 and 405. The tool rest 415 is then properly rotated in the direction as shown by the arrow WI or in the direction as shown by the arrow WJ to position the tool 416 for milling at a position facing the shaft shaped workpiece 429, and the tool 416 is rotated. The tool rest 415 is then fed a predetermined distance together with the tool 416 in the direction as shown by the arrow WH. Furthermore, the spindle stocks 403 and 405 are synchronously moved in the directions as shown by the arrows WA and WB (the Z axis direction). The milling machining is then performed on the raw portion of the shaft shaped workpiece 429 which has been pulled out anew. The chucks 403b and 405b are synchronously rotated a predetermined angle in the directions as shown by the arrows WC and WD, with C-axis control performed toward each spindle (not shown) of the spindle stocks 403 and 405, so that the milling machining can be performed.

When the milling machining is performed, the portion of the shaft shaped workpiece 429 to have the milling performed thereon is positioned near the chuck 403b or the chuck 405b, and is held. In this state, the shaft shaped workpiece 429 is machined by means of the tool rest 415 and tool 416 by having the spindle stocks 403 and 405 synchronously moved in the directions as shown by the arrows WA and WB. The chuck 403b or 405b fills the role of the center rest, since the workpiece 429 is always machined at a position near the chuck 403b or 405b. Accordingly, the generation of chattering can be efficiently prevented on the workpiece 429 during the machining, and the machining can be performed with accuracy.

Figure 97:
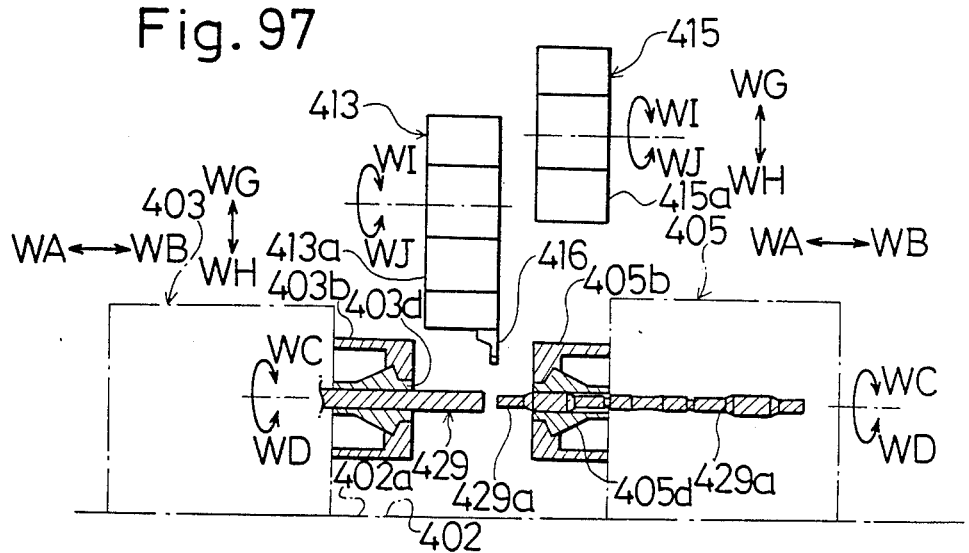

When the shaft shaped workpiece 429 has been machined along the predetermined length, the tool rest 415 is retracted from the shaft shaped workpiece 429. A tool 416 for cutting-off, installed on the tool rest 413, is then positioned to face the shaft shaped workpiece 429. Next, the spindle stock 405 is moved in the direction as shown by the arrow WA again, to hold the workpiece 429. Furthermore, the workpiece holding portion 403d of the chuck 403b is loosened to release the holding relation between the spindle stock 403 and the shaft shaped workpiece 429. In this state the spindle stock 405 is moved a predetermined distance together with the chuck 405b in the direction a shown by the arrow WB. Then the raw portion of the shaft shaped workpiece 429 is pulled out a predetermined length through the chuck 403b of the spindle stock 403 in the direction as shown by the arrow WB by the spindle stock 405. After the raw portion is pulled the predetermined length from the spindle stock 403, the workpiece holding portion 403d of the chuck 403b is fastened to hold the shaft shaped workpiece 429 by the spindle stocks 403 and 405. When the shaft shaped workpiece 429 is held by the spindle stocks 403 and 405, the spindle stocks 403 and 405 are moved together with the shaft shaped workpiece 429 in the directions as shown by the arrows WA and WB (that is, the Z axis direction). The portion of the shaft shaped workpiece 429 to be cut off (the boundary position between the machined portion and the raw portion) faces the cutting tool 416 installed in the tool rest 413. The chucks 403b and 405b, as shown in FIG. 97, are then synchronously rotated together with the shaft shaped workpiece 429 in the direction as shown by the arrow WC, and the tool rest 413 is fed a predetermined quantity, together with the cutting tool 416, in the direction as shown by the arrow WH. Then the shaft shaped workpiece 429 is cut by means of the tool 416, and the machined portion (it is called the part 429a hereinafter) is cut off from the remaining raw portion of the shaft shaped workpiece 429.

Figure 98:
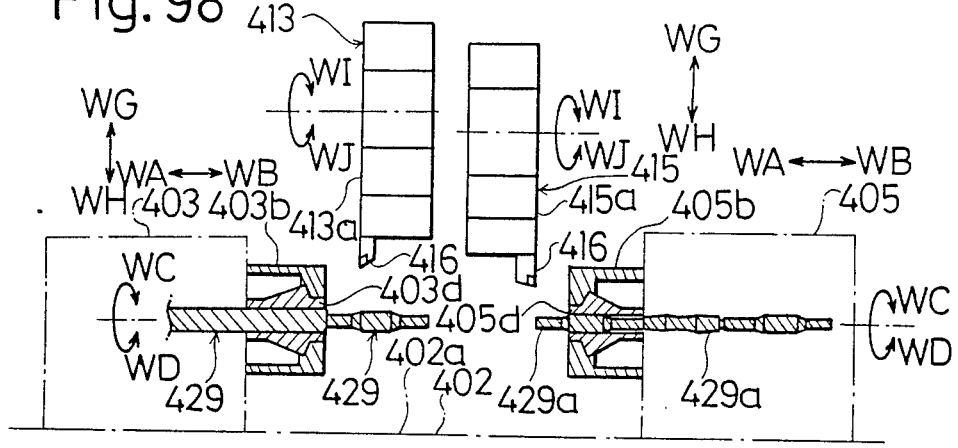
Figure 99:
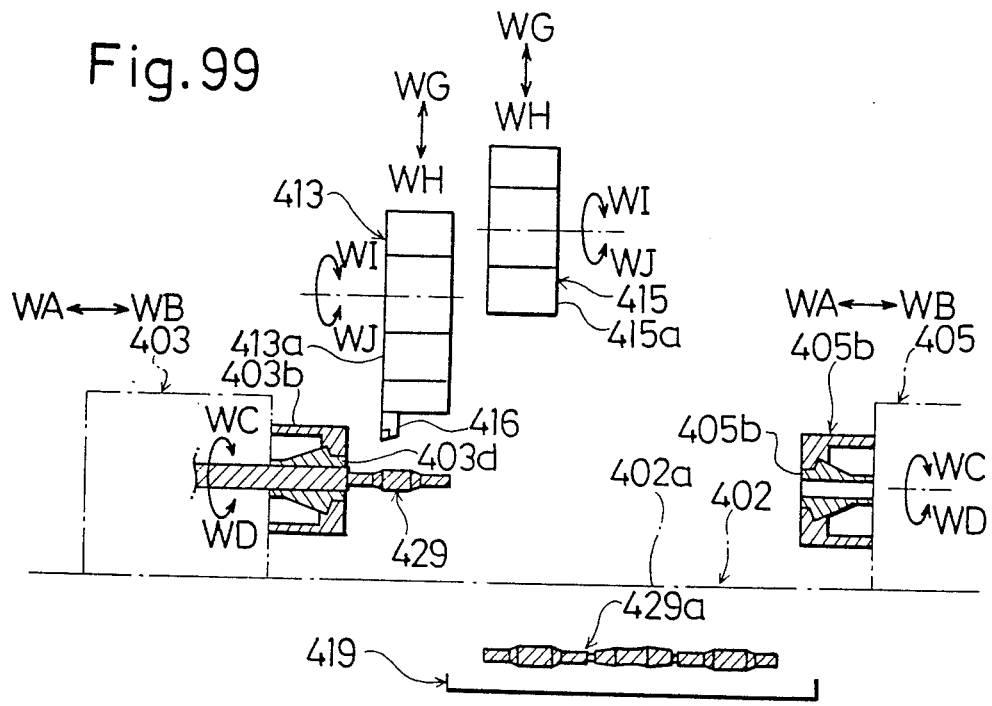

When the shaft shaped workpiece 429 is cut, the tool rest 413 is retracted from the shaft shaped workpiece 429, and the spindle stock 405 is moved a predetermined distance together with the chuck 405b in the direction as shown by the arrow WB. Then the part 429a is moved the predetermined distance together with the chuck 405b in the direction as shown by the arrow WB, as shown in FIG. 98. The spindle stock 405 is moved the predetermined distance in the direction as shown by the arrow WA or in the direction as shown by the arrow WB (the Z axis direction). Moreover, the tool rest 415 is fed a predetermined quantity, together with a tool 416, such as a cutting tool, in the direction as shown by the arrow WH, to machine the left end surface of the part 429a. In parallel with this, the spindle stock 403 is moved and driven in the directions as shown by the arrows WA and WB (the Z axis direction). Moreover, the tool rest 413 is moved and driven together with the tool 416 in the directions as shown by the arrows WG and WH (the X axis direction). Thus the same machining as shown in FIG. 92 is performed on the raw portion of the shaft shaped workpiece 429 held by the chuck 403b. Then when the part 429a is machined in the predetermined shape, the chuck 405b is loosened, and the machined part 429a is detached from the chuck 405b to remove the part 429a to the parts catcher 419, as shown at the lower portion of FIG. 99.

In the above-described embodiment, it was mentioned that the shaft shaped workpiece 429 was pulled out in such a manner that only the spindle stock 405 was moved toward the spindle stock 403, in the Z axis direction, without moving the spindle stock 403 in the Z axis direction. However, this method of moving the spindle stocks 403 and 405 when the pulling out is performed is not critical. Any method of moving is available if the distance between the spindle stocks 403 and 405 can be narrowed and extended properly. For example, the spindle stock 405 can be stopped, and the spindle stock 403 may be moved toward the spindle stock 405 in the Z axis direction. The shaft workpiece 429 may be pulled out in such that both spindle stocks 403 and 405 are moved in the Z axis direction.

Another embodiment of the complex machine tool will be described in FIG. 100 through FIG. 111.

Figure 100:
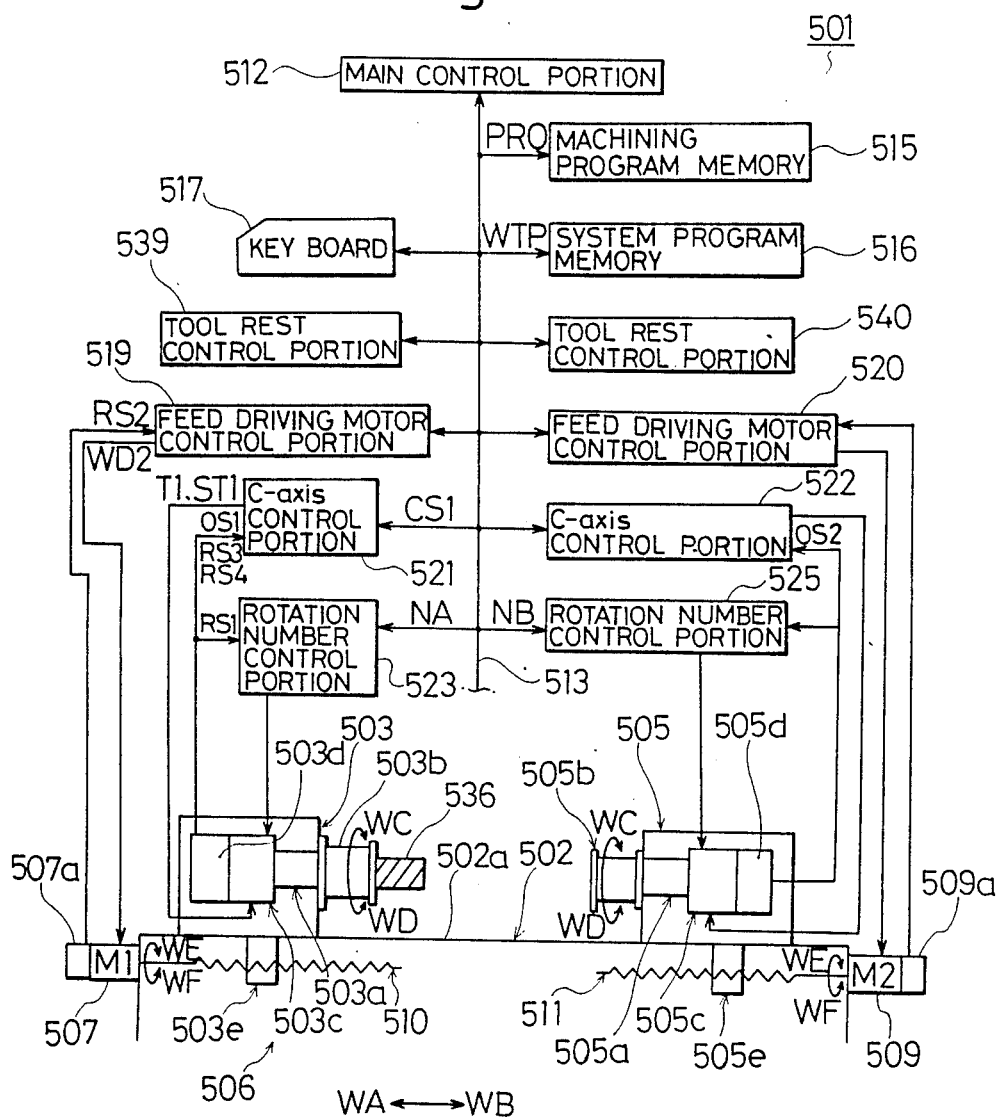
FIG. 100 is a control block diagram showing an example if a complex machine tool.

A complex machine tool 501 has a machine body 502 on which a guide surface 502a is provided on the upper portion thereof, as shown in FIG. 100. Two spindle stocks 503 and 505 face each other, and are movably and drivably provided, independent of each other, in the right and left directions in the figure, that is, in the direction as shown by the arrows WA and WB (the Z axis direction) on the guide surface 502a. Two spindles 503a and 505a are provided, rotatable and drivable in the directions as shown by the arrows WC and WD, with the spindle stocks 503 and 505. Two chucks 503b and 505b are rotatably installed in the spindles 503a and 505a, in the directions as shown by the arrows WC and WD.

Two spindle driving motors 503c and 505c are directly connected with the spindles 503a and 505a. Two transducers 503d and 505d for detecting the amount of angular rotation of the spindle motors 503c and 505c in the directions as shown by the arrows WC and WD are installed on the spindle driving motors 503c and 505c.

Furthermore, a spindle stock feed driving unit 506 is provided with the machined body 502 as shown in FIG. 100. The spindle stock feed driving unit 506 has nuts 503e and 505e, feed driving motors 507 and 509, driving screws 510 and 511, and the like. That is, each of the nuts 503e and 505e project, in the machine body 502, through the guide surface 502a at the lower portions of the spindle stocks 503 and 505 in FIG. 100, and is movably disposed together with the spindle stocks 503 and 505 in the directions as shown by the arrows WA and WB (the Z axis direction) in the machine body 502. Female screws (not shown) are disposed, penetrating in the Z axis direction, that is, in the directions as shown by the arrows WA and WB, in the nuts 503e and 505e. Two driving screws 510 and 511, of the same pitch, are rotatably fitted in the nuts 503e and 505e in the directions as shown by the arrows WE and WF. Two feed driving motors 507 and 509 are connected with the driving screws 510 and 511. Two transducers 507a and 509a for detecting the amount of angular rotation of each of the feed driving motors 507 and 509 in the directions as shown by the arrows WE and WF are installed on the feed driving motors 507 and 509. The spindle stocks 503 and 505 are moved and driven by the nuts 503e and 505e in the direction as shown by the arrow WA or in the direction as shown by the arrow WB (the Z axis direction) such that the feed driving motors 507 and 509 are driven to rotate the driving screw 510 and 511 in the direction as shown by the arrow WE or in the direction as shown by the arrow WF.

Figure 101:
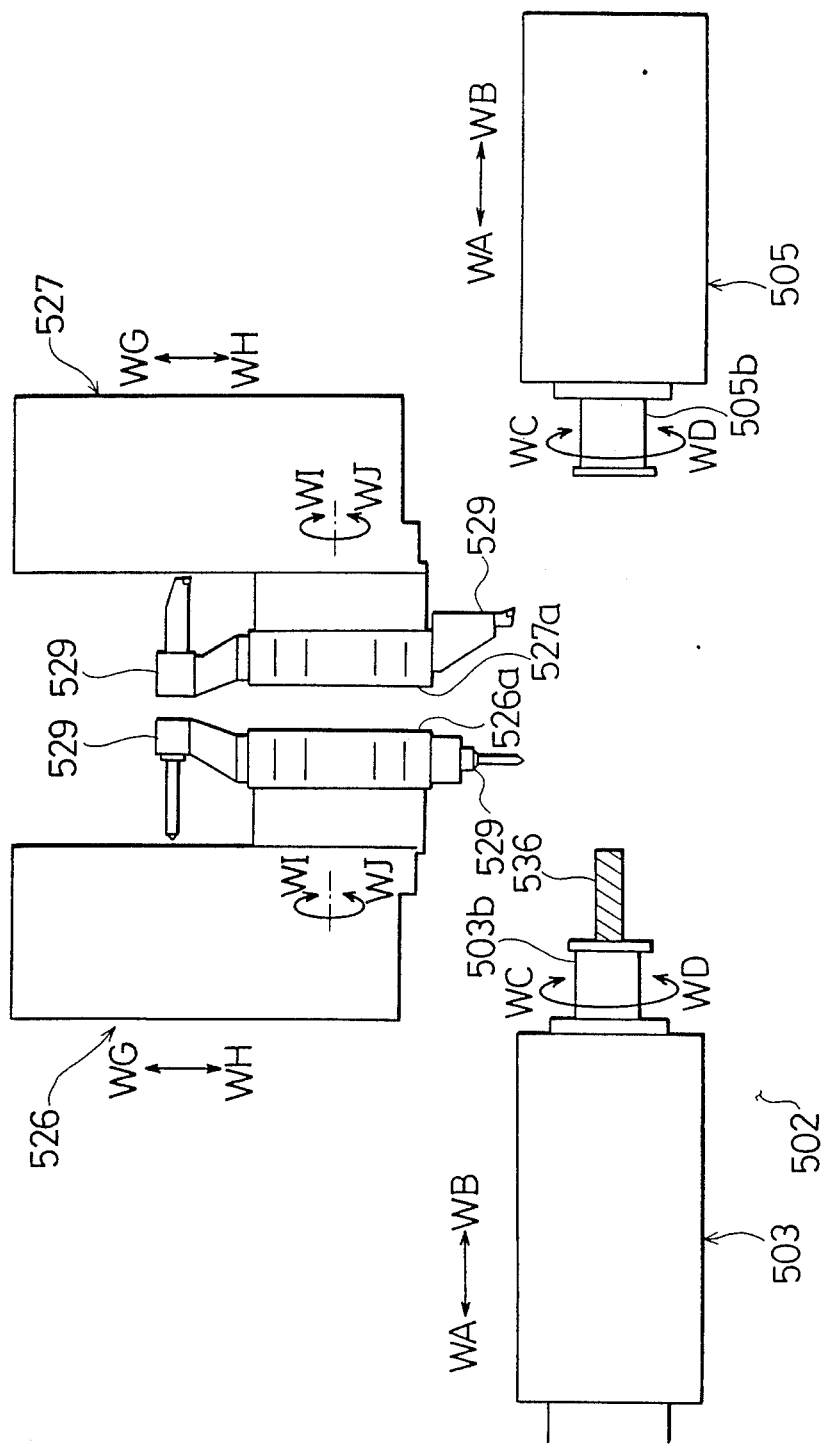
FIG. 101 is a top view of the complex machine tool as shown in FIG. 100.

The complex machining machine tool 501 has a main control portion 512 as shown in FIG. 100. A machining program memory 515, a system program memory 516, a keyboard 517, tool rest control portions 539 and 540, feed driving motor control portions 519 and 520, C-axis control portions 521 and 522 and rotation number control portions 523 and 525 are connected with the main control portion 512 through a bus line 513. The tool rest control portion 539 is connected with a tool rest 526 as shown in FIG. 101. The tool rest control portion 540 connects with the tool rest 527. The feed driving motor 507, as described before, and the transducer 507a connect with the feed driving motor control portion 519. The feed driving motor 509 and the transducer 509a connect with the feed driving motor control portion 520.

The spindle driving motor 503c and the transducer 503d connect with the C-axis control portion 521. The spindle driving motor 505c and the transducer 505d connect with the C-axis control portion 522. Furthermore, the spindle driving motor 503c and the transducer 503d connect with the rotation number control portion 523. The spindle driving motor 505c and the transducer 505d connect with the rotation number control portion 525.

The two turret type tool rests 526 and 527 are provided, movable and drivable only in the directions as shown by the arrows WG and WH (that is, the X direction), perpendicular to the directions as shown by the arrows WA and WB (the Z axis direction), with the machine body 502 as shown in FIG. 101. Two turret head 526a and 527a are supported to be free to rotate and drive in the directions as shown by the arrows WI and WJ by the tool rests 526 and 527. Plural tools 529 include a turning tool such as a cutting tool, a rotation tool such as a drill and a milling cutter, installed to be attachable and detachable on the turret head 526a and 527a.

With the above-described structure of the complex machining machine tool 501, when machining a workpiece, at first a workpiece 536 to be machined is attached to the spindle 503a with the chuck 503b, as shown in FIG. 100. Thereafter the operator commands the main control portion 512 to start the machining of the workpiece 536 through the keyboard 517. Then, the main control portion 512 read out a machining program PRO corresponding to the workpiece 536 to be machined from the machining program memory 515, and, the predetermined machining is performed on the workpiece 536 on the basis of the machining program PRO.

That is, the main control portion 512 as shown in FIG. 100 commands the rotation number control portion 523 that the spindle 503a is to be rotated in the direction as shown by the arrow WC at a predetermined rotation number NA provided by the machining program PRO. The rotation number control portion 523, on the basis of the command, makes the spindle driving motor 503c rotate together with the spindle 503a in the direction as shown by the arrow WC. Then a rotation signal RS1 is outputted to the rotation number control portion 523 from the transducer 503d installed on the spindle driving motor 503c every predetermined rotation angle of the spindle driving motor 503c (that is, the spindle 503a). The rotation number control portion 523 counts the input number of the rotation signal RS1 per hour to obtain the number of the spindle 503a and to control the spindle driving motor 503c so that the rotation number of the spindle driving motor 503c is equal to the predetermined rotation number NA.

The main control portion 512 as shown in FIG. 100 commands the feed driving motor control portion 519 to move the spindle stock 503 a predetermined quantity in the Z axis direction. The feed driving motor control portion 519, on the basis of the command, outputs a driving signal WD2 to the feed driving motor 507. Then the feed driving motor 507 makes the driving screw 510 rotate and drive in the direction as shown by the arrow WE and in the direction as shown by the arrow WF, and makes the spindle stock 503 move, by the nut 503e, in the direction as shown by the arrow WA or in the direction as shown by the arrow WB (the Z axis direction). Then a rotation signal RS2 is outputted to the feed driving motor control portion 519 from the transducer 507 whenever the feed driving motor 507 (that is, the driving screw 510) is rotated with a predetermined angle in the direction as shown by the arrow WE or in the direction as shown by the arrow WF. The feed driving motor control portion 519 counts the input number of the rotation signal RS2, and detects the quantity of movement of the spindle stock 503 in the Z axis direction, being in proportion to the rotation angle quantity of the feed driving motor 507 in the directions as shown by the arrows WE and WF. Accordingly, the rotation of the feed driving motor 507 is controlled so that the movement quantity is equal to the movement quantity provided in the machining program PRO.

Furthermore, the main control portion 511 command the tool rest control portion 539 to select a tool 529 to be used for the machining and to control the movement quantity of the tool 529 in the X axis direction. Then the tool rest control portion 539 makes the turret head 526a of the tool rest 526 properly rotate in the direction as shown by the arrow WI or in the direction as shown by the arrow WJ in FIG. 102. Thus the tool 529 for turning the outside diameter is positioned to face the workpiece 536. Moreover, the tool rest 526 is properly moved and driven together with the tool 529 for turning in the directions as shown by the arrows WG and WH. Then the machining for turning is performed in a predetermined manner on the outside cylindrical portion of the workpiece 536 by means of the tool 529.

Figure 102:
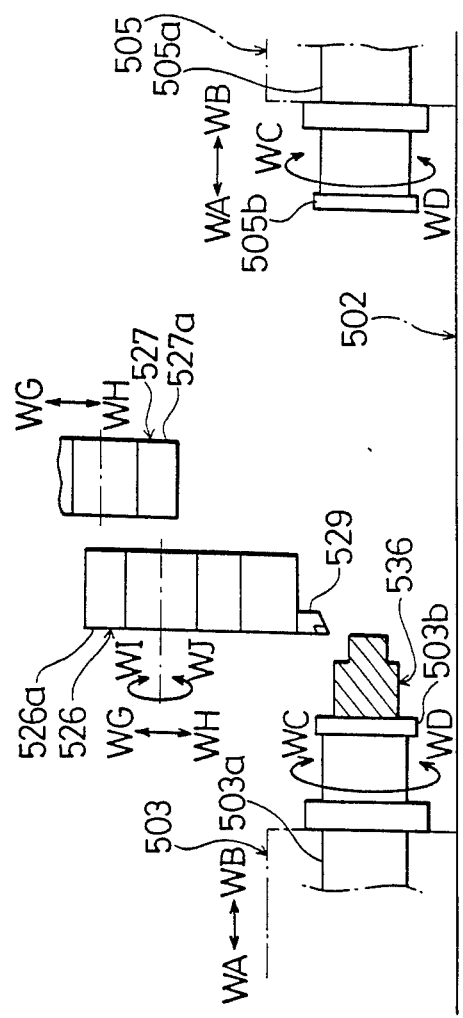
FIGS. 102 through 109 illustrate way of a machining of a workpiece making use of a embodiment of a machining control method in a complex machine tool.
Figure 103:
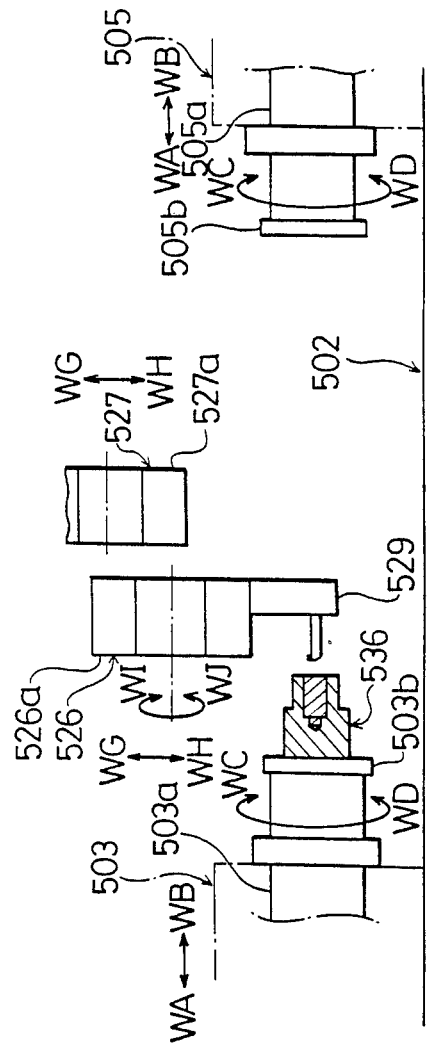

When the turning has been performed on the outside cylindrical portion of the workpiece 536 as shown in FIG. 102, the tool rest 526 is properly moved in the direction as shown by the arrow WG to be retracted from the workpiece 536. In this state the turret head 526a of the tool rest 526 is properly rotated in the direction as shown by the arrow WI or in the direction as shown by the arrow WJ. Thus the tool 529 for turning the inside diameter of the workpiece, such as a drill or a boring tool, is positioned to face the workpiece 536 as shown in FIG. 103. Next, the tool rest 526 is fed a predetermined distance, together with the tool 529, in the direction as shown by the arrow WH in FIG. 103. Furthermore, the spindle stock 501 is properly moved and driven in the directions as shown by the arrows WA and WB (the Z axis direction), holding the workpiece 536 with the chuck 503b. In this way the inside diameter portion of the workpiece 536 is machined by means of the tool 529. After this machining, the spindle stock 503 is properly moved in the direction as shown by the arrow WA in FIG. 103 to remove the tool 529 from the inside diameter portion of the workpiece 536. The rotation of the chuck 503b in the direction as shown by the arrow WC is then stopped, and the tool rest 536 is moved in the direction as shown by the arrow WG to be retracted from the workpiece 536 in preparation for a milling machining operation. The tool 529 for milling, installed in the tool rest 536, is positioned to face the workpiece 536.

When the inside diameter portion of the workpiece 536 has been machined as shown in FIG. 103, the milling machining, with C-axis control, is performed on the workpiece 536. That is, the main control portion 512 as shown in FIG. 100 commands the C-axis control portion 512 to return the spindle 503a to its origin. Then the C-axis control portion 521 makes the spindle driving motor 503c rotate at a low speed in the direction as shown by the arrow WC or in the direction as shown by the arrow WD.

Figure 110:
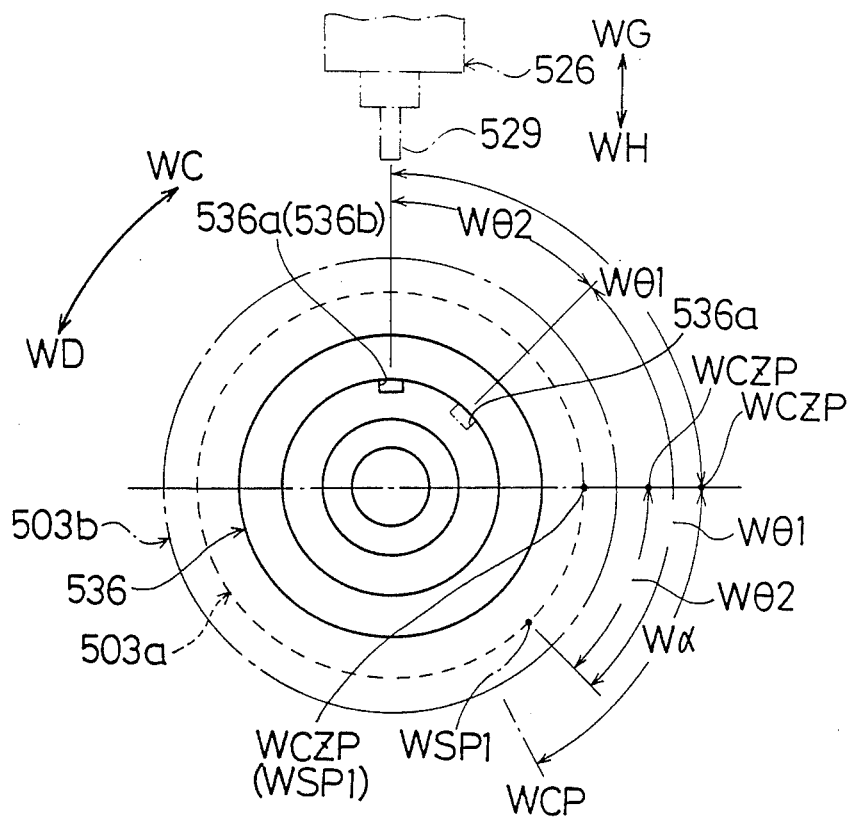
FIG. 110 is a view seen by the arrow WQ toward a workpiece in FIG. 104.

When the spindle 503a reaches a predetermined position an origin detecting signal OS1 is outputted for the C-axis control portion 521 from the transducer 503d. The C-axis control portion 521, on the basis of the signal, immediately stops the rotational driving of the spindle driving motor 503c in the direction as shown by the arrow WC or in the direction as shown by the arrow WD. Then the spindle 503a stops its rotation in the direction as shown by the arrow WC or in the direction as shown by the arrow WD, and a predetermined standard position WSP1 of the spindle 503a is positioned at the C-axis origin WCZP, as shown in FIG. 110.

Figure 104:
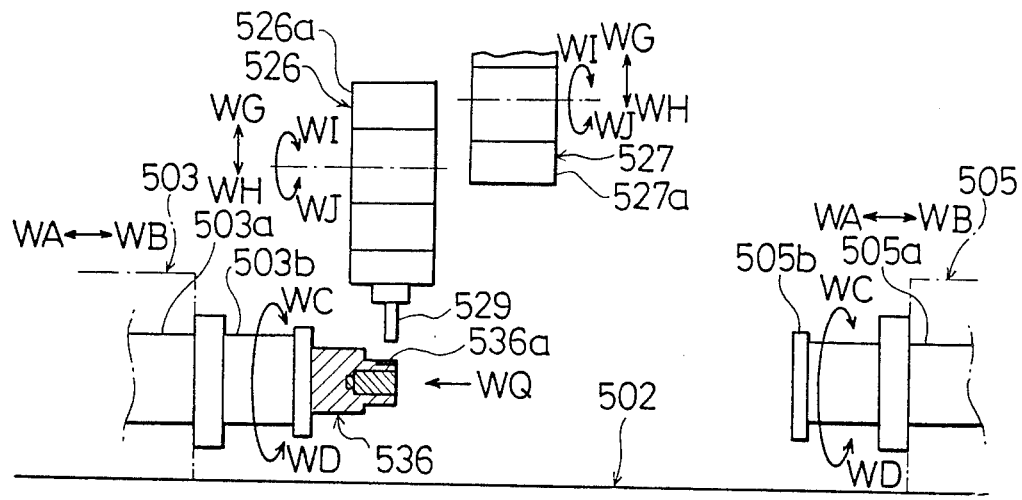

Next, the main portion 512 drives the tool rest control portion 539, and the tool rest 526 as shown in FIG. 104 is moved a predetermined distance in the direction as shown by the arrow WH, with the tool 529 for milling rotating. Furthermore, the spindle stock 503 is properly moved and driven in the direction as shown by the arrow WB. A channel 536a is then formed on the outside surrounding portion of the workpiece 536 by means of the tool 529, spaced a predetermined angle WO1 from the C-axis origin WCZP in the direction as shown by the arrow WD as shown in FIG. 110. When the channel 536a has been formed, the tool rest 526 is properly moved in the direction as shown by the arrow WG to make the tool 529 retract from the workpiece 536. Next, the main control portion 512 outputs a C-axis control signal CS1 to the C-axis control portion 521, as shown in FIG. 100. Then the C-axis control portion 521 makes the spindle driving motor 503c rotate together with the spindle 503a at a low speed in the direction as shown by the arrow WC. A rotation signal RS3 is outputted to the C-axis control portion 521 from the transducer 503d every predetermined rotation angle of the spindle motor 503c. The C-axis control portion 521 counts the input number of the rotation signal RS3 to detect the amount of angular rotation of the spindle 503a. The C-axis control portion 521 stops the rotation of the spindle driving motor 503c in the direction as shown by the arrow WC when the amount of angular rotation reaches a predetermined angular rotation quantity WO2. Then the spindle 503a stops its rotation in the direction as shown by the arrow WC, together with the workpiece 536 and the spindle 503a (that is, the workpiece 536) is positioned at a position rotated the predetermined angle WΘ2 in one direction as shown by the arrow WC from the C-axis origin WCZP.

Thereafter the tool rest 526, being retracted, is moved a predetermined distance together with the tool 529 for milling toward the workpiece 536 in the direction as shown by the arrow WH in FIG. 104. Furthermore, the spindle stock 503 is properly moved and driven in the direction as shown by the arrow WB. Then a channel 536b is formed on the outside surrounding portion of the workpiece 536, separated from the channel 536a formed before with the predetermined angle WΘ2 in the direction as shown by the arrow WD in FIG. 110.

When the first routine of the machining is finished after the milling of the workpiece 536, the main control portion 512 calls a workpiece delivery program WTP from the system program memory 516 as shown in FIG. 100, and the workpiece delivery program WTP is executed. That is, the main control portion 512 commands the C-axis control portion 521 to position the spindle 503a at a delivery position WCP (see FIG. 110). Then the C-axis control portion 521, on the basis of the command, drives the spindle driving motor 503c. The spindle 503a is then slowly rotated together with the workpiece 536 in the direction as shown by the arrow WC or in the direction as shown by the arrow WD. The transducer 503d, being installed on the spindle driving motor 503c, outputs a rotation signal RS4 to the C-axis control portion 521 every predetermined rotation angle of the spindle driving motor 503c in the direction as shown as shown by the arrow WC or in the direction as shown by the arrow WD.

Then the C-axis control portion 521 counts the input number of the rotation signal RS4, and obtains the position of the spindle driving motor 503c relative to the C-axis origin WCZP of the spindle 503a (see FIG. 110). When the standard position WSP1 of the spindle 503a is positioned at the delivery position WCP, spaced from the C-axis origin WCZP with a predetermined angle Wα in the direction as shown by the arrow WC, a group signal ST1 is outputted to the spindle driving motor 503c, as shown in FIG. 100. Then the spindle driving motor 503c, on the basis of the signal, stops the rotation the direction as shown by the arrow WC or in the direction as shown by the arrow WD. As a result, the spindle 503a stops the rotation in the direction as shown by the arrow WC or in the direction as shown by the arrow WD together with the workpiece 536, and the spindle 53a is positioned at the delivery position WCP. Incidentally the C-axis origin (Wα=0) can also be selected as the delivery position WCP.

Figure 111:
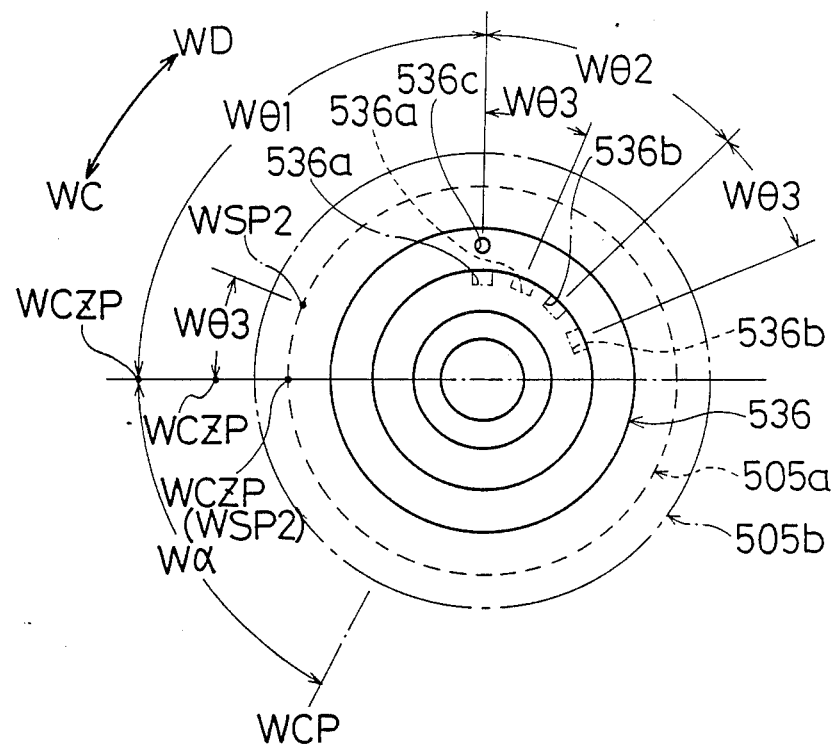
FIG. 111 is a view seen by the arrow WR toward a workpiece in FIG. 109.

The main control 512 as shown in FIG. 100 also commands the C-axis control portion 522 to position the spindle 505a at the delivery position WCP (see FIG. 111). Then the C-axis control portion 522 as shown in FIG. 100 makes the spindle driving motor 505c rotate together with spindle 505a at a low speed in the direction as shown by the arrow WC or in the direction as shown by the arrow WD, and detects the amount of angular rotation with the transducer 505d. The position, in the directions as shown by the arrows WC and WD, relative to the C-axis origin WCP of the spindle 505a as shown in FIG. 111 is obtained on the basis of the detected rotation angular quantity. When a standard position WXP2 of the spindle 505a is positioned at the delivery position WCP, spaced from the C-axis origin WCZP a predetermined angle W2 in the direction as shown by the arrow WC, the rotation of the spindle driving motor 505c is stopped. Then the spindle 505a stops its rotation in the direction as shown by the arrow WC or in the direction as shown by the arrow WD to be positioned at the delivery position WCP.

When the standard positions WSP1 and WSP2 of the spindles 503a and 505a are positioned at the delivery position WCP, the chuck 505b of the spindle 505a as shown in FIG. 104 is loosened. The spindle stock 505 is then moved together with the spindle 505a in the direction as shown by the arrow WA in FIG. 104. There the spindle 505a approaches the spindle 503a. The chuck 505b is then fastened to hold the workpiece 536 with the chucks 503b and 505b.

Figure 105:
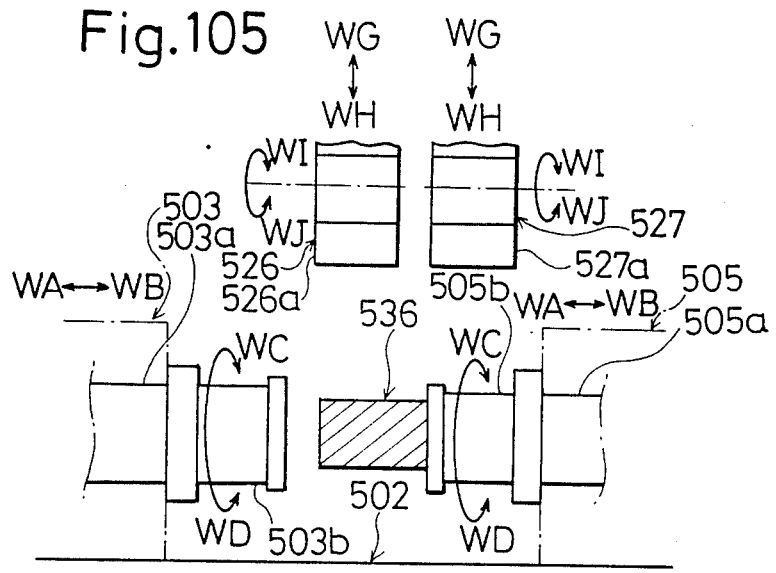

When the workpiece 536 is held by the chucks 503b and 505b, the holding relation between the workpiece 536 and the chuck 503b is released. The spindle stock 505 is then moved a predetermined distance in the direction as shown by the arrow WB, that is, in the direction going away from the spindle stock 503, with the workpiece 536 held by the chuck 505b. Thus the spindle 530a is separated from the spindle 505a, as shown in FIG. 105. The workpiece 536 has then been transferred to the side of the spindle 505b. This transfer movement of the workpiece 536 is performed in such a manner that the spindles 503a and 505a are both positioned at the predetermined delivery position WCP, and the workpiece 536 is directly held by the chuck 505b of the spindle 505a. Therefore there is no phase shift of the workpiece 536 toward the C-axis origin WCZP from the transfer movement.

When the workpiece 536, after the first routine, has been transferred to the side of the spindle 505a, a second routine of the machining is performed on the workpiece 536 on the basis of the machining program PRO corresponding to the workpiece 536. At the same time, a raw workpiece 536 is installed on the side of the spindle 503a on the chuck 503b, and the first routine of the machining as described before is performed on a new a new workpiece 536.

That is, the mean control portion 512 as shown in FIG. 100 commands the rotation number control portion 525 to rotate the spindle 505a a predetermined rotation number NB in the direction as shown by the arrow WC. Then the rotation control portion 525 makes the spindle driving motor 505c rotate together with the spindle 505a in the direction as shown by the arrow WC. The rotation number control portion 525 detects the rotation number of the spindle driving motor 505c through the transducer 505d, and controls the spindle driving motor 505c to have the detected rotation number equal the predetermined rotation number NB.

The main control portion 512, as shown in FIG. 110, drives the feed driving motor control portion 520 to make the driving screw 511 rotate in the direction as shown by the arrow WE or in the direction as shown by the arrow WF. The spindle stock 505 is then moved in the direction as shown by the arrow WA or in the direction as shown by the arrow WB (the Z axis direction) with the nut 505e. The feed driving motor control portion 520 detects the movement quantity of the spindle stock 505 with the transducer 509a, and controls the driving motor 509 on the basis of the detected movement quantity. Moreover, turning is performed on the outside cylindrical portion of the workpiece 536 in a predetermined manner by means of the tool 529 such that the main control portion 512 drives the tool rest control portion 540 to make the tool rest 527, as shown in FIG. 106, properly move and drive together with the tool 529 for turning in the directions as shown by the arrows WG and WH.

Figure 106:
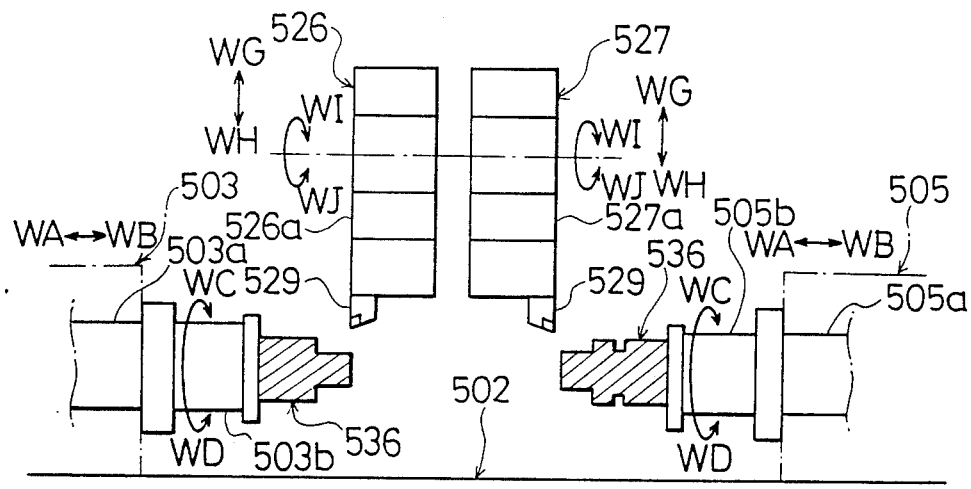
Figure 107:
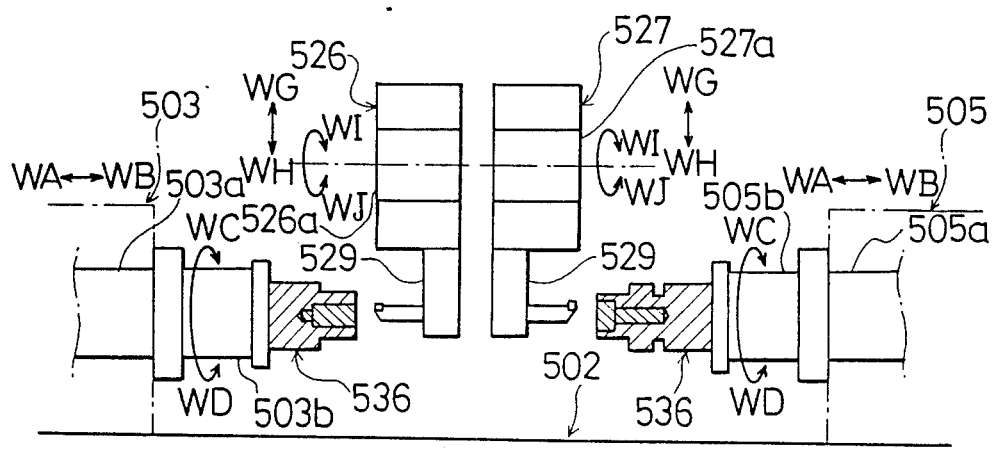

The predetermined machining for turning is performed on the raw workpiece 536 being held by the chuck 503b as shown in FIG. 106 by the spindle stock 503 being properly moved together with with workpiece 536 in the direction as shown by the arrow WA or in the direction as shown by the arrow WB (the Z axis direction). The tool rest 526 is properly moved and driven together with the tool 529 for turning in the directions as shown by the arrows WG and WH (the Z axis direction), as described before.

When the turning has been performed on each outside cylindrical portion of the workpieces 536 as shown in FIG. 106, respectively, the tool rests 526 and 527 are moved and retracted from the workpieces 536 in the direction as shown by the arrow WG. The tools 529 installed on the tool rests 526 and 527 for turning the inside diameter are positioned to face their respective workpieces 536. Thereafter the tool rests 526 and 527 are fed a predetermined distance in the direction as shown by the arrow WH in FIG. 107, and the tools 529 for turning the inside diameter face the right end surface of the raw workpiece 536 and the left end surface of the workpiece 536 after the first routine, respectively. Each inside diameter portion of the raw workpiece 536 and the workpiece 536 after the first routine is machined in a predetermined manner with the spindle stocks 503 and 505 moved in the directions as shown by the arrows WB and in the shown by the arrow WA (the Z axis direction), respectively. After the machining, the spindle stock 503 is properly moved in the direction as shown by the arrow WA, and the spindle stock 505 is properly moved in the direction as shown by the arrow WB. Thus each tool 529 is removed from each inside diameter portion. Then the tool rests 526 and 527 are moved in the direction as shown by the arrow WG to be retracted from the workpieces 526. Furthermore, the rotation of the chucks 503b and 505b in the direction as shown by the arrow WC is stopped.

Figure 108:
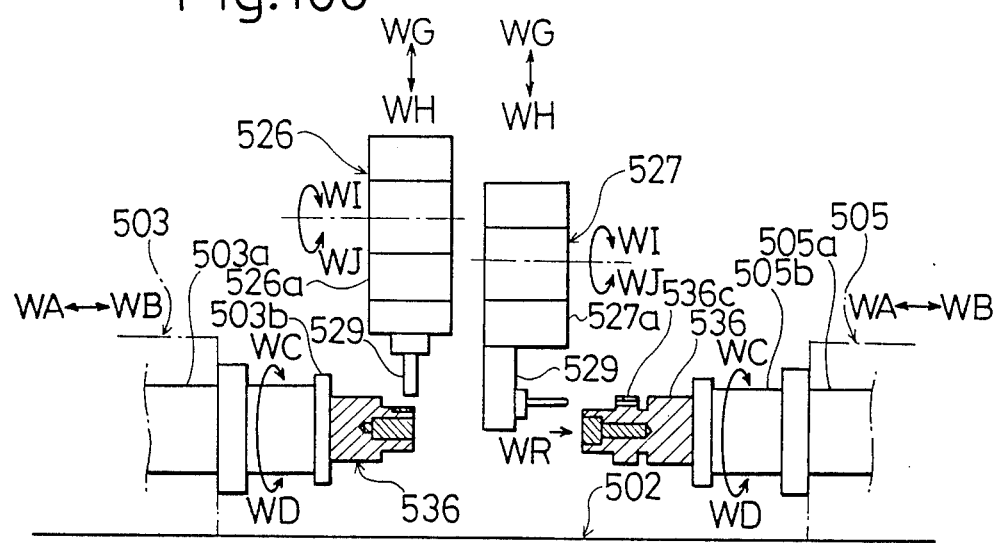
Figure 109:
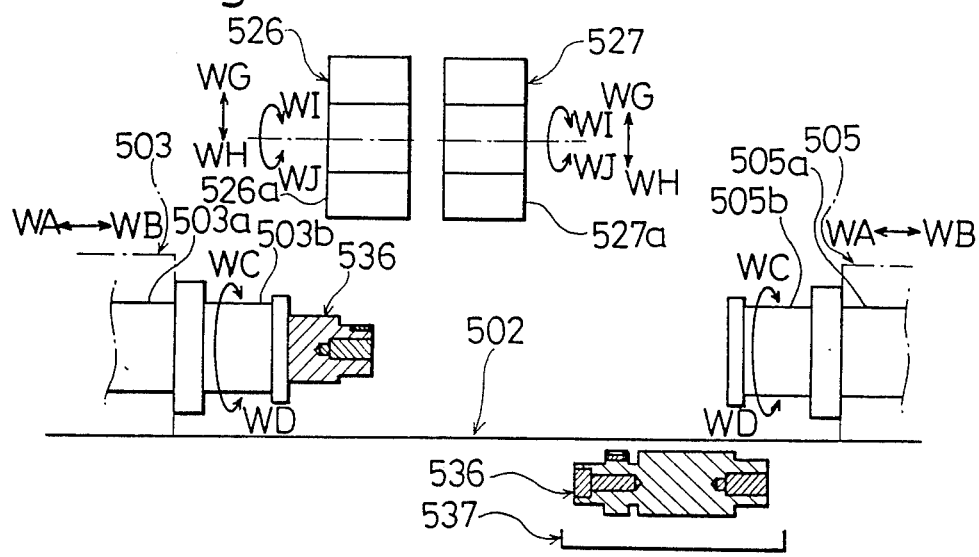

Next, a drill machining with C-axis control is performed, by means of the same method as the above-described method of FIG. 104, on the workpiece 536 held by the chuck 505b, as shown in FIG. 108. That is, the main control portion 512 as shown in FIG. 100 commands the C-axis control portion 522 to rotate the spindle driving motor 505c together with the spindle 505a at a low speed in the direction as shown by the arrow WD. Then the standard position WSP2 of the spindle 505a as shown in FIG. 111 is also rotated in the direction as shown by the arrow WD. When the standard position WSP2 corresponds with the C-axis origin WCZP, an origin detecting signal OS2 is outputted to the C axis control portion 522 from the transducer 505d, as shown in FIG. 100. While the standard position WSP2 of the spindle 505a coincides with the C-axis origin WCZP, as shown in FIG. 111, the channels 536a and 536b, formed on the workpiece 536 during the first routine of the machining, are positioned at positions space from the C-axis origin WCZP by angles WΘ1 and (WΘ1+WΘ2), respectively in the direction as shown by the arrow WD. Furthermore, the C-axis control portion 522 stops the spindle driving motor 505c when the rotation angular quantity of the spindle 505a in the direction as shown by the arrow WD, detected through the transducer 550d, becomes equal to a predetermined angle WΘ3.

Then the standard position WSP2 of the spindle 505a is positioned at a position spaced from the C-axis origin WCZP by the predetermined angle WΘ3 in the direction as shown by the arrow WD in FIG. 111.

Thereafter, the tool rest 527, as shown in FIG. 108, is moved a predetermined distance toward the workpiece 536 in the direction as shown by the arrow WH, with the tool 529 for drilling being rotated. The spindle stock 505 is properly moved and driven in the direction as shown by the arrow WA. The workpiece 536 has been delivered to the side of the spindle 505a without a phase shift after the first routine of the machining on the spindle 503a, as described before. Therefore, The hole 536c is formed and penetrated in the workpiece 536 exactly spaced from the channels 536a and 536b, formed during the first routine, and as shown by the broken line in FIG. 111, with the predetermined angles WΘ3 and (WΘ2+WΘ3) in the direction as shown by the arrow WC respectively.

When the second routine of the machining has been performed on the workpiece 536, the chuck 505b is loosened and the machined workpiece 536 is detached from the chuck 505b. The workpiece 536 is thrown into the workpiece catcher 537, disposed at the lower portion of FIG. 109. In parallel with this is performed the milling machining with C-axis control on the workpiece 536 being held by the chuck 503b and as shown in FIG. 108 by means of the method as described before. A tool 529, such as an end mill, installed on the tool rest 526, is used to form the channels 536a and 536b, as shown in FIG. 110, on the workpiece 536. In this way the first routine is performed in parallel with the second routine, so that the successive machining is performed on the workpiece 536.

In the above-described embodiment, there was mentioned the method of delivery wherein when the workpiece 536 was delivered to the side of the spindle 505a from the side of the spindle 503a, the workpiece 536 was delivered in such a manner that the spindle stock 505 was moved, together with the spindle 505a, to the spindle 503a of the spindle stock 503 in the direction as shown by the arrow WA. However, this method of delivery is not critical. Any method is available if the workpiece 536 can be delivered such that he spindle stocks 503 and 505 are relatively moved in the direction as shown by the arrow WA and in the direction as shown by the arrow WB (the Z axis direction) to become close to each other. For example, the spindle stock 503 can be moved together with the spindle 503a toward the spindle 505a in the direction as shown by the arrow WB, so that the workpiece 536 may be delivered to the side of the spindle 505a from the side of the spindle 503a. The spindles 503a and 505a can also approach each other in such a manner that the spindle stock 503 is moved in the direction as shown by the arrow WB and the spindle stock 505 is moved in the direction as shown by the arrow WA to deliver the workpiece 536.

The spindles 503a and 505a of the spindle stocks 503 and 505 are rotated in the direction as shown by the arrow WC and in the direction as shown by the arrow WD, respectively, to position each of the standard positions WSP1 and WSP2 of the spindles 503a and 505a at the delivery positions WCP, as shown in FIG. 110 and FIG. 111. In this state the workpiece 536 is delivered between the spindle stocks 503 and 505. However, the C-axis coordinate values W2 of the delivery positions WCP are changeable with respect to the C-axis origin WCZP, respectively. So, when each of the standard positions WSP1 and WSP2 of the spindles 503a and 505a is positioned at each delivery position WCP, the C-axis coordinate values W2 of the delivery positions WCP is preset so that the C-axis coordinate values of the clamps (not shown) of the chucks 503b and 505b do not coincide with each other. Accordingly, the delivery can be smoothly performed without interfering the clamps of the chucks 503b and 505b with each other, even if the workpiece 536 delivered between the spindle stocks 503 and 505 is short in the directions as shown by the arrows WA and WB in FIG. 100.

In the above-described embodiment, the workpiece was delivered between the spindles 503a and 505a on the basis of the workpiece delivery program WTP being stored in the system program memory 516. However, in the command of the delivery of the workpiece, any method is available if the workpiece 536 can be directly delivered between the spindles 503a and 505a. For example, the delivery of the workpiece may be performed on the basis of the machining program PRO, with the machining program PRO including the contents of the workpiece delivery program WTP stored in the machining program memory 515.

Another example of the complex machine tool will be described in FIG. 112.

Figure 112:
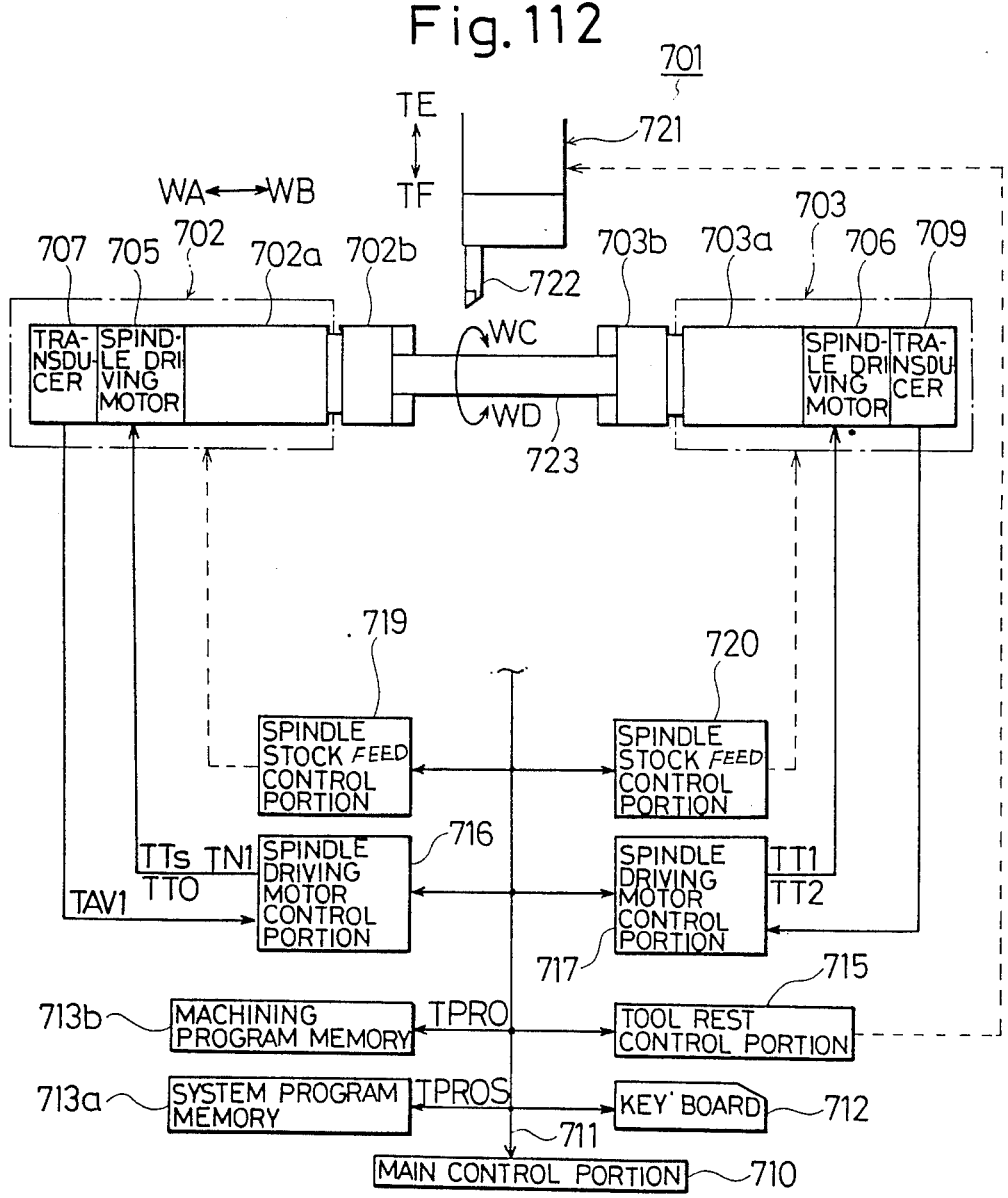
FIG. 112 is a control block diagram showing an example of a complex machine tool.

A complex machine tool 701 has spindle stocks 702 and 703 as shown in FIG. 112. The spindle stocks 702 and 703 face each other, and are provided to be free to move and drive in the directions as shown by the arrows WA and WB (the Z axis direction). Spindles 702a and 703a are rotatably and drivably provided with the spindle stocks 702 and 703 in the directions as shown by the arrows WC and WD. Chucks 702b and 703b are installed on the spindles 702a and 703a. A workpiece 723 is held by the chucks 702b and 703b motor between the spindles 702a and 703a. Spindle driving 705 and 706, each of which has the same rating torque TTs, are directly connected with the spindles 702a and 703a. Two transducers 707 and 709 are connected with the spindle driving motors 705 and 706.

Furthermore, the complex machining machine tool 701 has a main control portion 710, as shown in FIG. 112. A keyboard 712, a system program memory 713a, a machining program memory 713b, a tool rest control portion 715, spindle driving motor control portions 716 and 717, spindle stock feed control portions 719 and 720, etc. are connected with the main control portion 710 through a bus line 711. The tool rest control portion 715 connects with the tool rest 721 as described hereafter. The transducer 707 and 709 connect with the spindle driving motor control portions 716 and 717. Moreover, the spindle stock feed control portions 719 and 720 connect with the spindle stocks 702 and 703.

In the upper portion in FIG. 112 the tool rest 721 of the complex machining machine tool 701 is movably and drivably provided in the directions as shown by arrows TE and TF (that is, the X axis direction), perpendicular to the directions as shown by the arrows WA and WB (the Z axis direction). Plural tools 722 are installed on the tool rest 721.

With the above-described constitution of the complex machining machine tool 701, if a predetermined machining for cutting is performed on the workpiece 723, the workpiece 723 is held between the spindles 702a and 703a with the chucks 702b and 703b. Next, the machining of the workpiece 723 is commanded to the main control portion 710 through the keyboard 712. Then the main control portion 710, on the basis of the command, reads out a machining program memory 713b, and machines the workpiece 723 on the basis of the machining program TPRO.

That is, the main control portion 710 directs the spindle stock feed control portions 719 and 720, on the basis of the machining program TPRO, to make the spindle stocks 702 and 703 synchronously move and drive in the directions as shown by the arrows WA and WB (the Z axis direction) to position them at a predetermined machining start position. At the same time, the main control portion 710 directs the tool rest control portion 715 to position a tool 722 for turning, such as a cutting tool, on tool rest 721 at a position facing the workpiece 723.

Thereafter, the main control portion 710 reads out and executes a start control program TPROS stored in the system program memory 713a, so that the workpiece 723 as shown in FIG. 112 is rotated in the direction as shown by the arrow WC by energizing each of the spindle motors 705 and 706. That is, the main control portion 710 drives the spindle driving motor control portion 717 on the basis of the start control program TPRO to drive the spindle driving motor 706 with a torque TT1 that is less than the rating torque TTs of the motor. At the same time, the main control portion 710 commands the spindle driving motor control portion 716 to maintain the current position of the spindle driving motor 705 in the directions as shown by the arrows WC and WD, executing a self-hold function of the spindle driving motor 705. The torque TT1 is then applied to the workpiece 723 held between the spindles 702a and 703 through the spindle 703a and the chuck 703b connected with the spindle driving motor 706.

Thereafter, the main control portion 710, as shown in FIG. 112, directs the spindle driving motor control portion 716 on the basis of the start control program TPROS to release the self-hold of the spindle driving motor 705 and generate a start torque TT0 to the motor 705. When the spindle driving motor 705 starts to rotate together with the spindle 702a in the direction as shown by the arrow WC. The workpiece 723 being held between the spindles 702a and 703a also starts to rotate together with the spindles 702a and 703a in the direction a shown by the arrow WC, synchronously. The torque TT1 is already acting on the spindle 703a and the chuck 703b by means of the spindle driving motor 706. Therefore, the spindle 703a and the chuck 703b start to rotate in the direction as shown by the arrow WC by the torque TT1 when the self-hold of the spindle driving motor 705 is released. Accordingly, it is enough that the spindle driving motor 705 drives the rotating portion on the side of the spindle stock 702, such as the spindle 702a and the chuck 702b. It is not necessary to start the rotating portion on the side of the spindle stock 703, such as the spindle 703a. As a result it is not necessary that the workpiece 723 transmit the start torque of the motor 705 to the side of the spindle stock 703 from the side of the spindle stock 702, and the inertia of the rotating portion of the side of the spindle stock 703, such as the spindle 703a, the chuck 703b etc., does not operate on the workpiece 723 so that the torsional torque acting on the workpiece 723 is restrained and kept to a minimum.

In this way, when each of the spindle driving motors 705 and 706, as shown in FIG. 112, is energized, and the spindles 702a and 703a are rotated together with the workpiece 723 in the direction as shown by the arrow WC, the main control portion 710 directs the spindle driving motor control portion 716, on the basis of the machining program TPRO, to rotate the spindle driving motor 705 together with the spindle 702a with the rating torque TTs of the motor 705 and with a predetermined rotation number TN1 in the direction as shown by the arrow WC. An angular rotation velocity quantity TAV1 of the spindle driving motor 705 in the direction as shown by the arrow WC is detected through the transducer 707, as shown in FIG. 112. The spindle driving motor control portion 716 controls the driving motor 705 on the basis of the detected angular rotation velocity quantity TAV1 so that the spindle driving motor 705 is rotated in the direction as shown by the arrow WC with the predetermined rotation number TN1.

At the same time, the main control portion 710 directs the spindle driving motor control portion 717 to rotate the spindle driving motor 706 together with the spindle 703a with a driving torque TT2 (for example, a torque corresponding to 50% of the rating torque TTs), which is smaller than the rating torque TTs of the spindle motor 705, in the direction as shown by the arrow WC.

The torque acting on the spindle 703a through the spindle driving motor 706 is smaller than the torque acting on the spindle 702a due to the spindle driving motor 705. Therefore the spindle 703a is rotated with the same rotation number TN1 as the spindle 702a in the direction as shown by the arrow WC, by the chucks 702b and 703b and the workpiece 723.

That is, the rotation of the spindle 702a in the direction as shown by the arrow WC is the main rotation. The spindle 703a is rotated in the direction as shown by the arrow WC so as to follow the spindle 702a. Therefore, even if the rotation angular velocity quantity of the spindle 702a in the direction as shown by the arrow WC changes according to the command of the spindle driving motor control portion 716, through the spindle driving motor 705, so as to keep the predetermined rotation number TN1, the driving motor 706 can not oppose the rating torque TTs of the spindle 702a, because motor 706 is driven with the driving torque TT2, smaller than the rating torque TTs. Accordingly, the angular rotation velocity of the spindle 703a is made to coincide with the angular rotation velocity of the side of the spindle 702a. As a result, the angular rotation velocity of the spindle 703a is controlled by the spindle 702a, that is, the spindle driving motor 705, so that the spindle driving motor 706 cannot positively change the angular velocity of the spindle 703a.

Therefore, the spindles 702a and 703a are always synchronously rotated in the directions as shown by the arrow WC, with the rotation of the spindle 702a being the main rotation, and the rotation of the spindle 703a is being secondary, so that the torsional torque acting on the workpiece 723 is kept restrained to a minimum.

In this way, when the workpiece 723 held between the spindles 702a and 703a is rotated in the direction as shown by the arrow WC in FIG. 112 with the predetermined rotation number TN1, the main control portion 710, on the basis of the machining program TPRO, directs the spindle stock feed control portions 719 and 720 to synchronously drive and move the spindle stocks 702 and 703 in the directions as shown by the arrows WA and WB (the Z axis direction), and directs the tool rest control portion 715 to drive and move the tool rest 721, together with a tool 722 for turning, in the directions as shown by the arrows TE and TF. In this way, a predetermined machining for turning is performed on the outside cylindrical portion of the workpiece 723 by means of the tool 722.

An example of a control for a spindle being provided with each spindle stock in a complex machine tool will be described in FIGS. 113 and 114.

Figure 114:
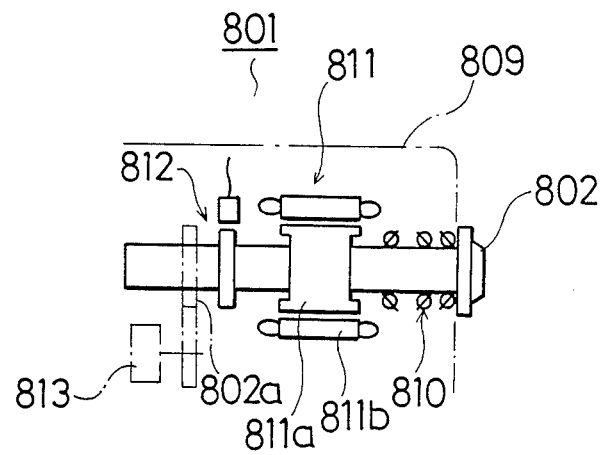
FIG. 114 is a schematic view of a part of a spindle stock.

A complex machine tool 801 has a spindle stock 809 as shown in FIG. 114. A spindle 802 is rotatably supported on the spindle stock 809 by a bearing 810. A rotor 811a of a spindle driving motor 811 is disposed at the spindle 802. The spindle 802 is a so-called built-in type spindle. A stator 811b is disposed to surround and cover the rotor 811a. Moreover, a pulse generator 812 is disposed at the left side of the spindle 802 as seen in the figure. A gear wheel 802 is fixed to the left of the pulse generator 812. An encoder 813 is meshed with the gear wheel 802a.

Figure 113:
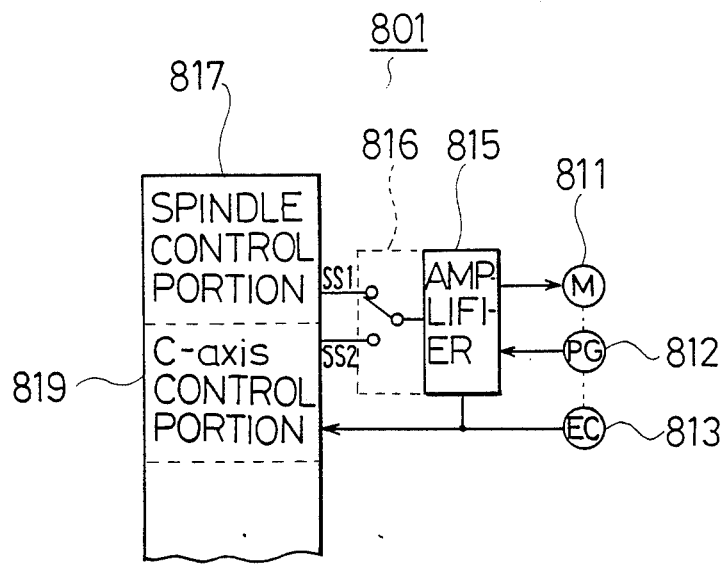
FIG. 113 is a control block diagram showing an example of a control circuit of a spindle driving motor.

An amplifier 815 connects with the spindle driving motor 811 and the pulse generator 812, as shown in FIG. 113. A transfer switch 816 is connected with the amplifier 815. A spindle control portion 817, which controls the spindle driving motor 811 at the time of turning, and a C-axis control portion 819, which controls the spindle driving motor 811 at the time of C-axis control, are connected with the transfer switch 816. The encoder 813 connects with the C-axis control portion 819.

With the above-described constitution of the complex machine tool 801, when turning, the transfer switch 816 is pushed up at the side of the spindle control portion 317, and the spindle control portion 817 connects with the amplifier 815, as shown in FIG. 113. Then a control signal SS1 is inputted to the amplifier 815 through the transfer switch 816 from the side of the spindle control portion 817. Moreover, the signal SS2, amplified by means of the amplifier 815, is inputted to the spindle driving motor 811, and the spindle driving motor 811 is rotated with a predetermined rotation number. Thus the machining for turning is performed. The rotation number of the spindle 802 is detected from the pulse generator 812, and the rotation number is fed back to the amplifier 815. Moreover, the amplifier 815 controls the spindle driving motor 811 on the basis of the output of the pulse generator 812, so that the spindle driving motor 811 is exactly rotated with the rotation number corresponding to the signal SS1.

Next, in the case of the machining with C-axis control, the transfer switch 816 is transferred to the side of the C-axis control portion 819 from the side of the spindle control portion 817, at which point the transfer switch was until now, and the C-axis control portion 819 is connected with the amplifier 815 through the transfer switch 816. In this state, a control signal SS2 for C-axis control is outputted to the amplifier 815 from the C-axis control portion 819 through the transfer switch 816, and the amplifier 815 makes the spindle driving motor 811 rotate at the predetermined speed. In this way, the machining, such as a predetermined milling machining, is performed.

In the above-described embodiment, it was mentioned that the present invention was applied to a so-called built-in type machine tool, of which the spindle driving motor 811 is built into the spindle 302. But the machine tool is not restricted to the built-in type. The present invention can naturally apply to a machine tool arranged so that the spindle driving motor 811 and the spindle 802 are provided separately, and the torque is transmitted to the spindle 802 by means of a gear, a belt or the like.

An example of a coordinate system control method in a complex machine tool will be described in FIG. 115 and FIG. 116.

Figure 115:
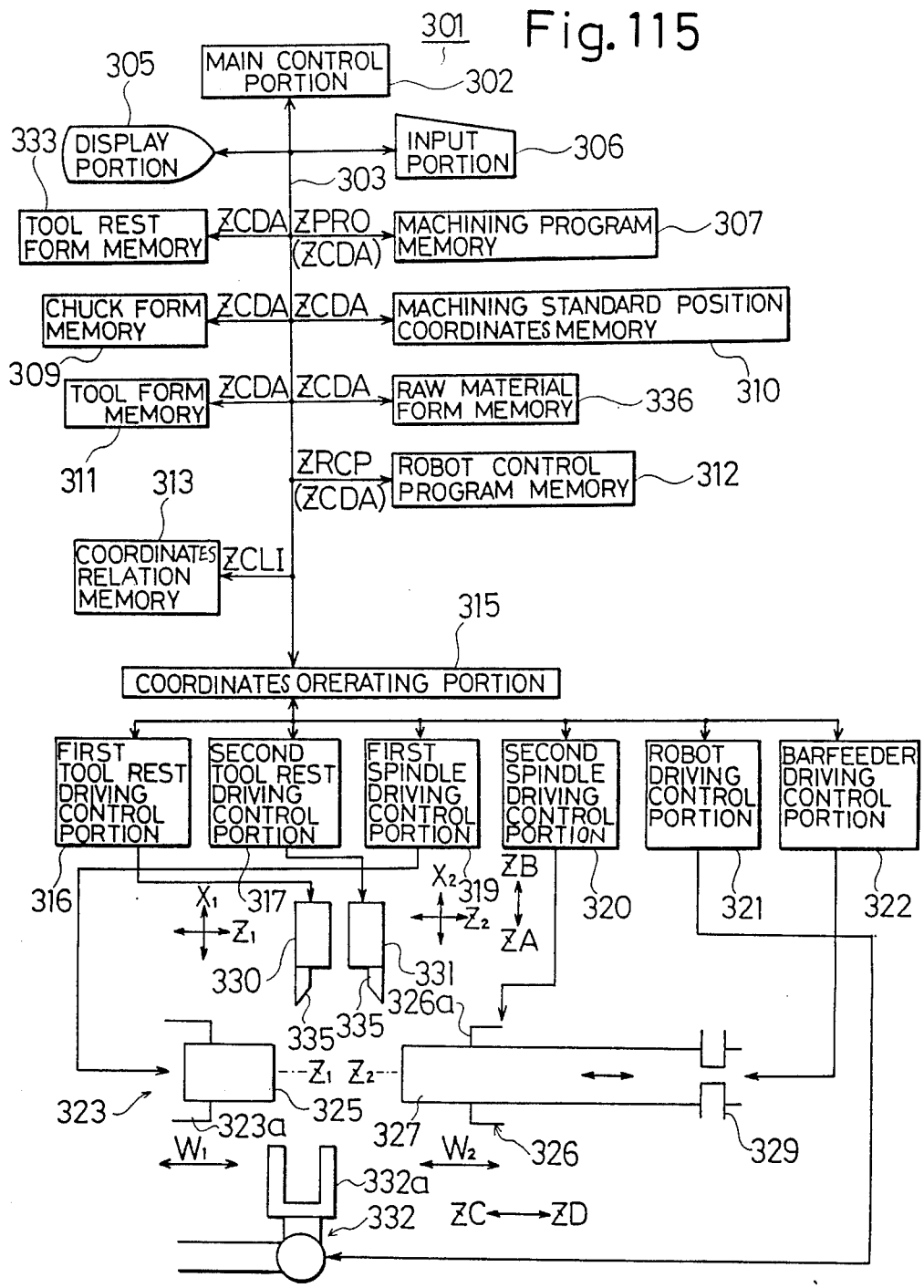
FIG. 115 is a control block diagram showing an example of a machine tool for which a coordinate system control method is applied.

A machine tool 301 has a main control portion 302 as shown in FIG. 115. A display portion 305 such as a display, an input portion 306 such as a keyboard, a tool rest form memory 333, a machining program memory 307, a chuck form memory 309, a machining standard position coordinates memory 310, a tool form memory 311, a raw material form memory 336, a robot control program memory 312, a coordinates relation memory 313, a coordinates operating portion 315, and the like are connected with the main control portion 302 through a bus line 303. A first tool rest driving control portion 316, a second tool rest driving control portion 317, a first spindle driving control portion 319, a second spindle driving control portion 320, a robot driving control portion 321, a barfeeder driving control portion 322, and the like are connected with the coordinates operating portion 315.

The machine tool 301 has a first spindle 323. The first spindle 323 is rotatably and drivably supported with a $Z_1$ axis as its center. A workpiece 325 is held by the first spindle 323 through a chuck 323a. A second spindle 326 is provided at a position facing the first spindle 323, and is supported to be free to rotate and drive on a $Z_2$ axis as its center, which coincides with the $Z_1$ axis. The positive and negative directions of the $Z_2$ axis are provided conversely. A workpiece 327 is held by the second spindle 326 with a chuck 326a. The workpiece 327 is a bar shaped workpiece. barfeeder 329 is disposed on the right side of the workpiece 327 in FIG. 115. A first tool rest 330 and a second tool rest 331 are provided between the first spindle 323 and the second spindle 326. The first tool rest 330 and the second tool rest 331 are movably and drivably provided in the direction as shown by the arrow ZA and in the direction as shown by the arrow ZB, along the $X_1$ and $X_2$ axis, perpendicular to the $Z_1$ and $Z_2$ axis. A handling robot 332 is movably disposed in the direction of a $W_1$ and $W_2$ axis, parallel to the Z axis direction, at the lower side of the tool rests 330 and 331 in FIG. 115.

The first spindle 323 is connected with the first spindle driving control portion 319. The second spindle 326 is connected with the spindle driving control portion 320. The first tool rest 330 is connected with the first tool rest driving control portion 316. The second tool rest 331 is connected with the second tool rest driving control portion 317. Moreover, the handling robot 332 is connected with the robot driving control portion 321. The barfeeder 329 is connected with the barfeeder driving control portion 322.

With the above-described constitution of the machine tool 301, when machining the workpieces 325 and 327, the main control portion 302 reads out a machining program ZPRO of the workpieces 324 and 327 from the machining program memory 307, and the barfeeder driving control portion 322 is driven on the basis of the machining program ZPRO to push out the workpiece 327 in the direction as shown by an arrow ZC. Thereafter, the second spindle 326 is rotated by the second spindle driving control portion 320 at a predetermined speed indicated by the machining program ZPRO, and is moved in the directions as shown by the arrows ZC and ZD along the $Z_2$ axis. Then the second tool rest 331 is moved by the second tool rest driving control portion 317 in the directions as shown by the arrows ZA and ZB along the axis to perform the predetermined machining on the workpiece 327.

When the predetermined machining is performed on the workpiece 327, the second spindle 326 is moved in the direction as shown by the arrow ZC to make the first spindle 323 hold the end portion of the workpiece 327. The workpiece 327 is then cut off. The cut-off workpiece 325 is held by the chuck 323a of the first spindle 323. Then the predetermined machining on the basis of the machining program ZPRO is performed on the workpiece 325 held by the first spindle 323. While the machining of the workpiece 325 is performed by means of the first spindle 323, the barfeeder 329 is driven, a new workpiece 327 is supplied to the chuck 326a, and the predetermined machining on the basis of the machining program ZPRO is performed on the supplied workpiece 327. The workpiece 325 on which the machining is finished at the first spindle 323 is detached from the chuck 323a by means of the handling robot 332, controlled on the basis of a robot control program ZRCP which is read out from the robot control program memory 312, to be thrown into a parts catcher.

Figure 116:
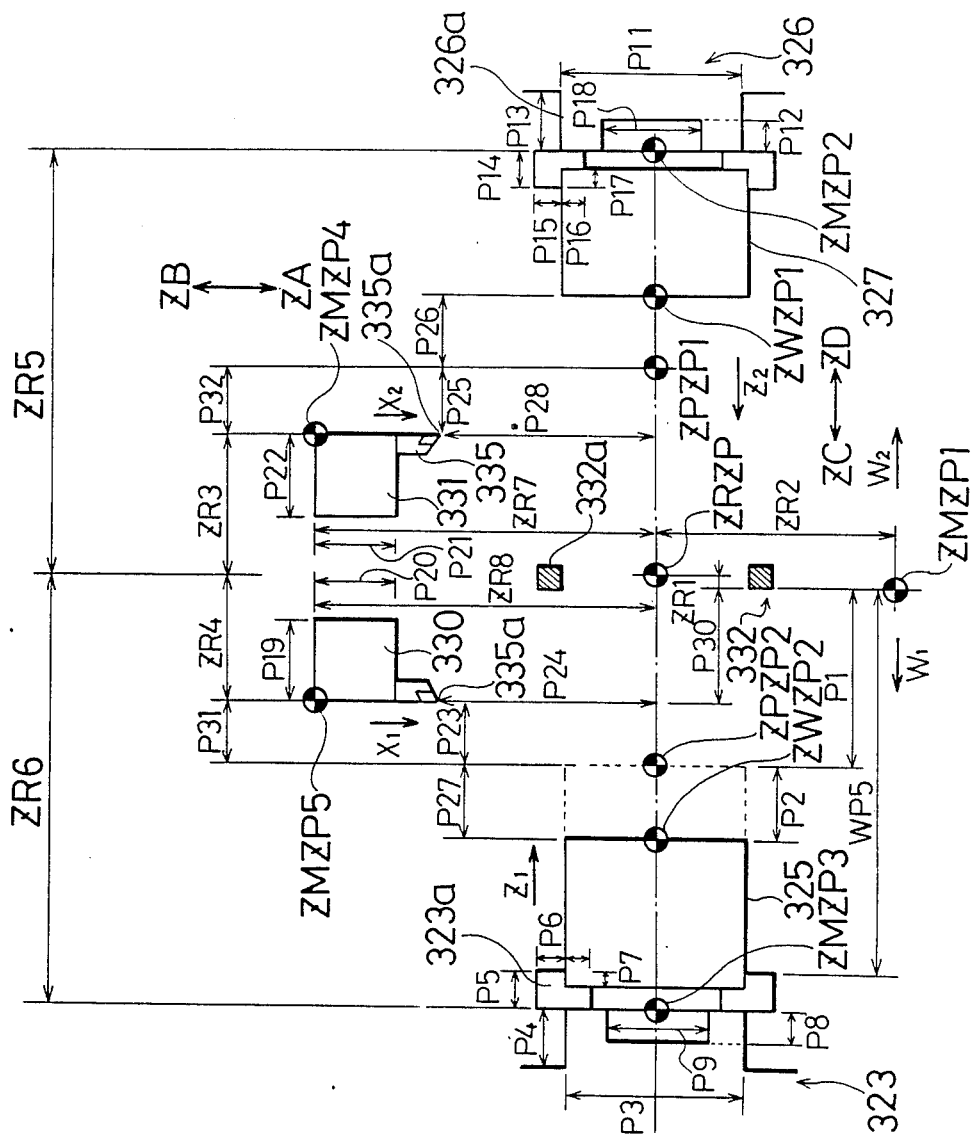
FIG. 116 illustrates the relationship of each of the coordinate system.

At the time of machining, various kinds of coordinate systems to be controlled, and coordinate system data relating to the coordinate systems, such as the machining program and parameters, are set in the machine tool 301 as shown in FIG. 116. That is, the coordinate systems are set as follows:

(a) $X_1$-$Z_1$ axis coordinate system standardizing the mechanical origins ZMZP3 and ZMZP5 used when the first spindle 323 is driven and controlled in the directions as shown by the arrows ZC and ZD and the first tool rest 330 is driven and controlled in the directions as shown by the arrows ZA and ZB. (The right and upper sides in FIG. 116 are positive.)

(b) $X_2$-$Z_2$ axis coordinate system standardizing the mechanical origins ZMZP2 and ZMZP4 used when the second spindle 326 is driven and controlled in the directions as shown by the arrows ZC and ZD and the second tool rest 331 is driven and controlled in the directions as shown by the arrows ZA and ZB. (The left hand and upper hand in FIG. 116 are positive.)

(c) $W_1$-$W_2$ axis coordinate system, used when the hand 332a of the handling robot 332 is driven and controlled in the directions as shown by the arrows ZC and ZD. (The right and left directions from the mechanical origin ZMZP1 are positive.)

Furthermore, the coordinate system data set at each coordinate system is, for example in the coordinate system of the $X_1$-$Z_1$ axes, dimension data P3-P9 showing the dimension form of the chuck 323a, and is a machining program $ZPRO_1$ for machining the workpiece 325. In the coordinate system of the $X_2$-$X_2$ axes, the coordinate system data is dimension data P11-P18 showing the dimension form of the chuck 326a, and is a machining program $ZPRO_2$ for machining the workpiece 327. These coordinate system data, labelled ZCDA, are stored in the chuck form memory 309 and and the machining program memory 307. In the coordinate system of the $X_1$-$Z_1$ axes dimension data P19 and P20 show the dimension form of the first tool rest 330. In the coordinate system of the $X_2$-$Z_2$ axes dimension data P21 and P22 show the dimension form of the second tool rest 331. Those coordinate system data ZCDA are stored in the tool rest form memory 333. Cutting edge data relating to each tool 335 installed on the first tool rest 330, that is, position data P23 and P24 at $X_1$-$Z_1$ coordinate between a cutting edge 335a and a machining program origin ZPZP2, and cutting edge data relating to each tool 335 being installed on the second tool rest 331, that is, position data P25 and P28, at the $X_2$-$Z_2$ coordinate system between a cutting edge 335a and a machining program origin ZPZP1, are stored in the tool form memory 311 as coordinate system data ZCDA. Moreover, offset values P26 and P27 between workpiece origins ZWZP1 and ZWZP2 of the workpieces 324 and 327 and each machining program origin ZPZP1 and ZPZP2, and position data P31 and P32 indicating the distance in the direction of the Z axis between the machining program origins ZPZP2 and ZPZP1 and the origins ZMZP5 and ZMZP4 of each of the tool rests 330 and 331 are stored in the machining standard position coordinates memory 310 as coordinate system data ZCDA.

Accordingly, each control object belonging to each coordinate system is usually controlled by means of the coordinate system data ZCDA corresponding to that coordinate system. However, due to the content of the machining program, there may be a case where the control must be performed by means of the coordinate system data ZCDA set on another coordinate system. For example, if the handling robot 332 is driven in the directions as shown by the arrows ZC and ZD on the basis of the coordinate system $W_1$-$W_2$, it is necessary that the form of the chucks 323a and 326a is acknowledged so as to prevent interference between the handling robot 332 and the chucks 323a and 326a. The robot driving control portion 321 controls its movement conditions so that the handling robot 332 is not excessively driven in the directions as shown by the arrows ZC and ZD. The coordinate system data ZCDA relating to the dimension of the chucks 323a and 326a is stored in the chuck form memory 309. However, all the data ZCDA depend on the coordinate systems $X_1$—$XZ_1$ and $X_2$-$Z_2$ to which the chucks 323a and 326a belong, and do not depend on the coordinate system $W_1$-$W_2$ for controlling the handling robot 323. Accordingly, since the handling robot 332 cannot be controlled on the basis of the coordinate system data ZCDA as it is, the robot driving control portion 321 requires the coordinates operating portion 315 to convert the coordinate system data ZCDA relating to the dimension of the chucks 323a and 326a, stored in the chuck form memory 309, into the coordinate system $W_1$-$W_2$.

The coordinates operating portion 315 then reads out the coordinate system data ZCDA relating to the dimension of the chucks 323a and 326a from the chuck form memory 309 immediately, and reads out coordinate position relating information ZCLI showing the correlation between the coordinate system $W_1$-$W_2$ and the coordinate systems $X_1$-$Z_1$ and $X_2$-$Z_2$ from the coordinates relation memory 313. Thus the conversion process is performed so that the coordinate system data ZCDA relating to the dimension of the chucks 323a and 326a, created on the basis of the coordinate systems $X_1$-$Z_1$ and $X_2$-$Z_2$ is converted to the coordinate system $W_1$-$W_2$ on the basis of the coordinate position relating information ZCLI read out. Since the coordinate position relating information ZCLI, for example the distances ZR1-ZR8 in the directions as shown by the arrows ZC and ZD and in the directions as shown by the arrows ZA and AB (corresponding to the X axis direction and the Z axis direction) from the total standard point ZRZP, which is standard for all the coordinate systems on the machine tool 301, to the standard point of each coordinate system, that is, to each origin ZMZP1-ZMZP5, are displayed, the coordinates operating portion 315 can immediately acknowledge the position relation between the mutual coordinate systems from the coordinate position relating information ZCLI. Thus the form of the chucks 323a and 326a is converted on the coordinate system $W_1-W_2$ on the basis of the position relation. Since the coordinate system $W_1-W_2$ is set only in the directions as shown by the arrows ZC and ZD, the coordinate system data ZCDA relating to the coordinate systems $X_1-Z_1$ and $X_2-Z_2$ is converted only for the portion relating to the Z axis, and is outputted to the robot driving control portion 321. However, if the coordinate system data ZCDA of the coordinate system $X_1-Z_1$ is converted to the $X_2-Z_2$, the conversion process is performed for both the X axis and the Z axis. Therefore the robot driving control portion 321, for example, can receive the dimension of the chuck 323a of the first spindle 323 in the directions as shown by the arrows ZC and ZD such that the data P5, on the basis of the $Z_1$ axis, is converted into the dimension data WP5 on the basis of the $W_1$ axis on which the technical origin ZMZP1 has its origin. Thus the robot driving control portion 321 can control the handling robot 333 so that it does not interfere with the chuck 323a.

The coordinate system data ZCDA relating to the coordinate systems $X_1-Z_1$ and $X_2-Z_2$ can also be applicable in the same way. If the first spindle 232 is moved along the $Z_1$ axis directions as shown by the arrows ZC and ZD, in order that the tool 335 of the second tool rest 331 does not interfere with the workpiece 325, the coordinate operating portion 315 always computes the position of the cutting edge of the tool 335 on the basis of the coordinate system $X_1-Z_1$, making use of the coordinate position relating information ZCLI. Thus the position of the cutting edge can be monitored. Therefore interference between the workpiece 325 and the tool 335 of the second tool rest 331 can be easily prevented. The form of the workpiece 325 can be easily determined from the raw material dimension data inputted to the raw material form memory 326 through the input portion 306 on the coordinate system $X_1-Z_1$, if the workpiece 325 is a raw material. During the machining, the machining program $ZPRO_1$ is analyzed to obtain tool pass data being executed at the time. Thus the form of the workpiece 325 is easily obtained.

The above-described embodiment explained that the distance ZR1-ZR8 from the total standard point ZRZP, being standardized toward all the coordinate systems on the machine tool 301 to the standard point of each coordinate system, were displayed as the position relating information ZCLI, as shown in FIG. 116. However, the distances between the standard points of the coordinate systems are displayed as the coordinate position relating information ZCLI without providing the total standard point ZRZP. Thereafter, the coordinate operating portion 315 can naturally compute on the basis of the distances.

The method of measuring the position relation between the mechanical origin ZMZP1 of the handling robot 333 and the other coordinate systems as the coordinate position relating information ZCLI is as follows: the standard surface of the robot hand 332a comes into contact with the cutting edge of the tool 335a and a tool length measuring means, of which the position data is known on the $X_1-Z_1$ coordinate system. The position relation can then be gotten from the position of the cutting edge 335a on the $X_1-Z_1$ coordinate system and the position of the hand 332a and the $W_1-W_2$ coordinate system at that time. The other position relation data is also obtained by this method. For example, the tool rest 330 is moved in the $X_1$ direction and the hand 332a is moved in the $W_1$ direction to bring the cutting edge 335a of the tool into contact with the hand standard surface. Then the distance ZR1 between the origin ZMZP1 of the robot 332 and the total standard point ZRZP becomes immediately clear from the equation P30+ZR1=ZR4+P31−P23. That is, the distance ZR1 is found making use of the distance ZR4 between the origin ZMZP5 of the tool rest 330 and the total standard position ZRZP at the time, the position data P23 between the cutting edge 335a and the program origin ZPZP2, the position data P31 between the program origin ZPZP2 and the mechanical origin ZMZP5, and the coordinate position P30 of the hand 332a on the $W_1-W_2$ coordinate system.

The coordinate system control method according to the present invention can be, of course, used for any purpose, as long as the coordinate system data ZCDA belonging to the different coordinate systems (All of the dimension information belonging to one coordinate system can be the coordinate system data ZCDA. Accordingly, the machining program ZPRO and the robot control program ZRCP are also regarded as the coordinate system data ZCDA if created on the basis of a specific coordinate system.) is converted into the coordinate system of one object to be controlled on the coordinate system, on the basis of the coordinate position relating information ZCLI in the machine tool. The coordinate system control method can be also applied for various kinds of barriers and the prevention of interference, the teaching of the handling robot, and when machining the workpiece 327 installed in the second spindle 326 by means of a tool 335 installed on the first tool rest 330 (In this case, the command of the tool path relating to the machining of the workpiece 327 is converted into the coordinate system $X_1-Z_1$ from the coordinate system $X_2-Z_2$ to make the first tool rest 330 machine.), and the like.

We claim:

1. A machining method for a complex machine tool having a frame, first and second spindle stocks provided on said frame so as to face each other, first and second workpiece spindles rotatably supported by respective said spindle stocks, and workpiece holding means on each said workpiece spindle, said method comprising:

providing said first and second spindle stocks on said frame such that at least one of said spindle stocks is drivable and movable relative to the other only in the direction of a central axis of said workpiece spindles;

providing first and second tool rests on said frame on one side of said central axis such that each said tool rest corresponds to a respective workpiece spindle, and such that each said tool rest is free to be driven and moved in at least a direction perpendicular to said direction of said central axis of said first and second workpiece spindles;

providing tool holding means on each of said first and said second tool rests free to be driven and rotated on an axis parallel to said direction of said central axis of said first and second workpieces;

providing a plurality of tools on each of said tool holding means, whereby said tools are free to be selectively positioned facing their respective corresponding workpiece spindle;

holding a workpiece with a said workpiece holding means;

performing a first machining on said workpiece with one of said plurality of tools on one of said tool holding means;

executing a first step after said first machining, said first step comprising relatively moving said second spindle stock a predetermined distance toward said first spindle stock and holding said workpiece between said first and second workpiece spindles;

executing a second step after said first step, said second step comprising rotating said first and second workpiece spindles at the same speed and cutting off and detaching a portion of said workpiece held by said second workpiece spindle from the remainder of said workpiece;

executing a third step, said third step comprising moving said second spindle stock together with said portion of said workpiece relative to and a predetermined distance away from said first spindle stock;

executing a fourth step, said fourth step comprising performing said first machining on said workpiece held by said first workpiece spindle;

executing a fifth step, said fifth step comprising performing a second machining on said portion held by said second workpiece spindle; and feeding said workpiece a predetermined length during at least one of said first through said fourth steps.

2. A machining method for a complex machine tool having a frame, first and second spindle stocks provided on said frame so as to face each other, first and second workpiece spindles rotatably supported by respective said spindle stocks, and workpiece holding means on each said workpiece spindle, said method comprising:

providing said first and second spindle stocks on said frame such that at least one of said spindle stocks is drivable and movable relative to the other only in the direction of a central axis of said workpiece spindles;

providing first and second tool rests on said frame on one side of said central axis such that each said tool rest corresponds to a respective workpiece spindle, and such that each said tool rest is free to be driven and moved in at least a direction perpendicular to said direction of said central axis of said first and second workpiece spindles;

providing tool holding means on each of said first and said second tool rests free to be driven and rotated on an axis parallel to said direction of said central axis of said first and second workpieces;

providing a plurality of tool on each of said tool holding means, whereby said tools are free to be selectively positioned facing their respective corresponding workpiece spindle;

holding a workpiece with a said workpiece holding means;

performing a first machining on said workpiece with one of said plurality of tools on one of said tool holding means;

moving said second spindle stock relative to said first spindle stock a predetermined distance and holding said workpiece between said first and second workpiece spindles;

releasing the holding relation between said first workpiece spindle and said workpiece such that said workpiece is held by said second workpiece spindle;

pulling said workpiece a predetermined length out of said first workpiece spindle by relative movement of said second workpiece spindle away from said first workpiece spindle a distance equal to said predetermined length, and holding said workpiece with and between said first and second workpiece spindles after said workpiece has been pulled out;

rotating said first and second workpiece spindles at the same rotational speed and cutting off a portion of said workpiece held by said second workpiece spindle from the remainder of said workpiece;

relatively moving said second spindle stock, together with said portion of said workpiece, to a position a predetermined distance away from said first spindle stock; and performing said first machining on said remainder of said workpiece held by said first workpiece spindle and performing a second machining on said portion held by said second workpiece spindle.

* * * * *

UNITED STATES PATENT AND TRADEMARK OFFICE
CERTIFICATE OF CORRECTION

PATENT NO. : 4,949,444

DATED : August 21, 1990

INVENTOR(S) : Hiroshi KOJIMA, Keikichi SAKATA, Seigo WATANABE, Yukio MITSUKUCHI, Shuichi HASHIMOTO, Choji KATO, Mikiro TESHIGAWARA, Ryoichi FURUHAS Shoji MOMOI, Toshihiko INOUE, Kazuki UEMURA and Katsushi OSHIMA It is certified that error appears in the above-identified patent and that said Letters Patent is hereby corrected as shown below:

ON TITLE PAGE: Item [75]

Please delete the following inventors:

Hiroshi KOJIMA, Keikichi SAKATA, Seigo WATANABE, Choji KATO, Mikiro TESHIGAWARA, Ryoichi FURUHASHI, Toshihiko INOUE, Kazuki UEMURA and Katsushi OSHIMA.

Please amend the priority to claim from the following priority applications:

62-105439, 62-105441, 62-105442, 62-105443 and 62-105444 filed April 28, 1987.

In column 68, line 66, change "workpieces" to -- workpiece spindles --.

Signed and Sealed this

Twenty-ninth Day of September, 1992

Attest:

DOUGLAS B. COMER

Attesting Officer   Acting Commissioner of Patents and Trademarks